United States Patent
Minelli et al.

(10) Patent No.: US 12,196,133 B1
(45) Date of Patent: Jan. 14, 2025

(54) OPERATING A GAS TURBINE ENGINE

(71) Applicant: ROLLS-ROYCE plc, London (GB)

(72) Inventors: Andrea Minelli, Derby (GB); Craig W Bemment, Derby (GB); Benjamin J Keeler, Chesterfield (GB); Kevin R McNally, Derby (GB); Martin K Yates, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/753,092

(22) Filed: Jun. 25, 2024

(30) Foreign Application Priority Data

Dec. 14, 2023 (GB) .................................... 2319125

(51) Int. Cl.
*F02C 7/14* (2006.01)
*F02C 7/06* (2006.01)
*F02C 7/36* (2006.01)

(52) U.S. Cl.
CPC .................. *F02C 7/14* (2013.01); *F02C 7/06* (2013.01); *F02C 7/36* (2013.01); *F05D 2260/213* (2013.01); *F05D 2260/98* (2013.01)

(58) Field of Classification Search
CPC ......... F05D 2260/213; F05D 2220/323; F05D 2260/98; F02C 7/224; F02C 7/14; F02C 7/06; F02C 7/18; F02C 9/28; F02C 9/26; F02C 7/16; F02C 7/10
See application file for complete search history.

(56) References Cited

U.S. PATENT DOCUMENTS

| | | | | |
|---|---|---|---|---|
| 5,241,814 A | * | 9/1993 | Butler | F02C 7/14 60/39.08 |
| 8,261,527 B1 | * | 9/2012 | Stearns | F02C 7/06 60/39.83 |
| 10,752,374 B1 | * | 8/2020 | Lui | B64D 13/08 |
| 11,994,072 B1 | * | 5/2024 | Bemment | F02C 7/14 |
| 2023/0332543 A1 | * | 10/2023 | Bemment | F02C 7/224 |
| 2024/0209784 A1 | * | 6/2024 | Bemment | F02C 7/18 |
| 2024/0254929 A1 | * | 8/2024 | Immordino | B64D 31/14 |

FOREIGN PATENT DOCUMENTS

| | | | |
|---|---|---|---|
| DE | 102023135099 A1 | * 6/2024 | |
| EP | 4390094 A1 | * 6/2024 | F01D 15/10 |

* cited by examiner

*Primary Examiner* — Craig Kim
(74) *Attorney, Agent, or Firm* — Oliff PLC

(57) ABSTRACT

A method of operating an aircraft gas turbine engine including: a core including a turbine, a compressor, a combustor to combust fuel, and a core shaft connecting the turbine to the compressor; a fan upstream of the core; a fan shaft; a bearing supporting the fan shaft; an oil loop system supplying oil to the bearing; and a heat exchange system including: an air-oil heat exchanger through which oil in the oil loop system flows; and a fuel-oil heat exchanger through which oil in the oil loop system and fuel flow to transfer heat between the oil and the fuel; and a bypass pipe to allow a proportion of the oil to flow past one of the air-oil and the fuel-oil heat exchanger; and a bypass valve to allow the proportion of the oil sent through the bypass pipe to be varied.

20 Claims, 17 Drawing Sheets

OPERATING A GAS TURBINE ENGINE

CROSS-REFERENCE TO RELATED APPLICATIONS

This specification is based upon and claims the benefit of priority from UK Patent Application Number 2319123.2 filed on 14th December 2023, the entire contents of which are incorporated herein by reference.

BACKGROUND

Field of the Disclosure

The present disclosure relates to aircraft propulsions systems, and to methods of operating aircraft involving the management of different fluids and heat transfer therebetween, and in particular to management of a heat exchange system of an aircraft engine.

Description of the Related Art

There is an expectation in the aviation industry of a trend towards the use of fuels different from the traditional kerosene-based jet fuels generally used at present. The fuels may have differing fuel characteristics relative to petroleum-based hydrocarbon fuels. Thus, there is a need to take account of fuel properties for these new fuels, and to adjust both the gas turbine engines themselves and the methods of operating gas turbine engines.

SUMMARY

According to a first aspect there is provided a method of operating a gas turbine engine of an aircraft, the gas turbine engine comprising:
an engine core comprising a turbine, a compressor, a combustor arranged to combust a fuel, and a core shaft connecting the turbine to the compressor;
a fan located upstream of the engine core;
a fan shaft;
at least one bearing arranged to support the fan shaft;
an oil loop system arranged to supply oil to the at least one bearing; and
a heat exchange system comprising:
an air-oil heat exchanger through which the oil in the oil loop system flows; and
a fuel-oil heat exchanger through which the oil in the oil loop system and the fuel flow such that heat is transferred between the oil and the fuel;
a bypass pipe arranged to allow a proportion of the oil to flow past one of the air-oil heat exchanger and the fuel-oil heat exchanger; and
a bypass valve arranged to allow the proportion of the oil sent through the bypass pipe to be varied,
the method comprising:
determining at least one fuel characteristic of the fuel arranged to be combusted by the combustor; and
controlling the bypass valve based on the at least one fuel characteristic so as to adjust the proportion of the oil sent via each heat exchanger at cruise conditions.

The inventors have appreciated that the use of fuels different from the traditional kerosene-based jet fuels, such as sustainable aviation fuels, may result in different fuel properties, and that parameters at cruise conditions may be adjusted to make use of the different fuel properties. In particular, some fuels may be heated to higher temperatures in one or more fuel-oil heat exchangers than traditional fuels, without significantly increasing fuel breakdown products, including increasing coking and/or lacquering. This may improve combustion efficiency of the fuel, and/or may improve overall thermodynamic efficiency of the engine, with less heat being lost to the environment (e.g. via the air-oil heat exchanger). Higher fuel temperatures on entry to the combustor may allow for a method providing improved oil cooling (as the fuel is able to take more heat). For example, fuel thermal stability affects how much heat the fuel can accept/to what temperature the fuel can be raised without forming deposits within pipes, burners, and/or a hydromechanical unit or other engine component. Taking the fuel thermal stability into account, and transferring more or less heat from the oil to the fuel depending on the thermal stability of the fuel, may therefore provide more efficient oil cooling whilst avoiding coking or other fuel breakdown product deposition pathways (e.g. lacquering)., so improving aircraft performance.

Using the fuel to take more heat from the oil, rather than relying on heat transfer from the oil to the environment/air (e.g. in the air-oil heat exchanger) may also provide a more thermodynamically efficient engine. This may improve the cooling of the oil before it is returned to the rest of the turbine engine. Additionally, the improved cooling of the oil may in turn improve the cooling effect of the oil on the components of the engine through which it flows, for example allowing a lower flow rate of oil to provide the same cooling effect.

In a transitional period, with available aviation fuels changing with time during the lifespan of a gas turbine engine, as well as depending on geographical location of a refuelling point, among other variables, it is important for a relevant fuel characteristic to be determined and control of the heat exchange system to be performed based on the specific fuel in use. As such, gas turbine operation can be tailored to get the best out of a wide variety of fuels. The controllable modulation valve arranged to adjust oil flow through each heat exchanger has a key role to play in heat exchange system control.

The fuel characteristic may be or comprise calorific value, thermal stability, or the percentage of sustainable aviation fuel (SAF) in the fuel.

The air-oil heat exchanger may assist in removing excess heat from the oil of the oil loop system that is not transferred to the fuel. This may allow further cooling of the oil beyond the transfer of heat from the oil to the fuel in the fuel-oil heat exchanger.

The air-oil heat exchanger and fuel-oil heat exchanger may be arranged in series along the path of the oil loop system. The bypass pipe may be arranged such that the oil passes through the fuel-oil heat exchanger whilst flowing past the air-oil heat exchanger or vice-versa.

The bypass valve allows variation of the amount of heat transferred from the oil by the air-oil and fuel-oil heat exchangers. The level of oil flow (and so heat transfer from the oil to the air or fuel) may be modified based on the temperature of the fuel leaving the fuel-oil heat exchanger, or entering the combustor, and so may allow for the control of the fuel temperature within a defined upper and lower bound. Similarly, the control of oil flow may allow the oil temperature to be maintained within an appropriate range. This control may assist in ensuring improved efficiency of the turbine engine (e.g. by raising the fuel temperature) without risking unnecessary damage to a fuel pump or other components downstream of the fuel-oil heat exchanger by using a temperature that is too high for the durability of said component. The bypass valve may be arranged to allow up to 100% of the oil to be sent via the fuel-oil heat exchanger. The bypass valve may be arranged to ensure that no less than 70%, 80%, or 90% of the oil is sent via the fuel-oil heat exchanger at cruise.

The bypass valve may be arranged to divert a fixed portion of the oil through the bypass pipe to bypass one of the fuel-oil heat exchanger and the air-oil heat exchanger during operation of the engine, the fixed portion optionally being determined at or before start-up of the engine, or when or before reaching cruise altitude, based on the at least one determined fuel characteristic. Alternatively, the bypass valve may be arranged to divert a variable portion of the flow of oil through the bypass pipe to bypass one of the fuel-oil heat exchanger and the air-oil heat exchanger during operation of the engine. The modulation valve may therefore be actively controlled to vary the proportion of oil sent via each heat exchanger, especially in implementations in which the aircraft carries multiple different fuels in different tanks, and may change which fuel (or fuel mixture) is in use in flight. Active control of the modulation valve may be automated and implemented by a controller of the heat exchange system.

Alternatively, the oil loop system, which may also be referred to as a recirculating oil system, may branch such that a proportion of the oil can flow along each branch. The air-oil and fuel-oil heat exchangers may be arranged in a parallel configuration on different branches of the oil loop system. The heat exchange system may therefore further include a modulation valve arranged to allow the proportion of the oil sent via each branch to be varied, and the controlling the modulation valve may therefore adjust the proportion of the oil sent via each branch at cruise conditions. More than two heat exchangers, and/or more than two branches, may be provided in some examples. The two or more branches of the primary oil loop system may re-join after the heat exchanger system, such that the oil recombines after heat is transferred from the oil.

The heat exchange system may further comprise a secondary fuel-oil heat exchanger. The secondary fuel-oil heat exchanger may be a servo fuel-oil heat exchanger. A portion, but not all, of the fuel leaving the main fuel-oil heat exchanger may be directed to the servo fuel-oil heat exchanger. The servo fuel-oil heat exchanger may increase the temperature of the fuel further, before providing the fuel for use in servo mechanisms of the gas turbine engine (e.g. for fueldraulic actuation and/or heating). These servo mechanisms may include a nacelle anti-icing system. The servo mechanisms may include engine actuators. The servo mechanisms may include a Turbine Case Cooling (TCC) servo valve. Only fuel which has passed through the secondary fuel-oil heat exchanger may be used in these auxiliary systems. The fuel used in these auxiliary systems may be returned to a fuel tank for later re-circulation, or may be recombined with other fuel leaving the main fuel-oil heat exchanger and enter the combustor. The fuel which passes through the secondary fuel-oil heat exchanger therefore may not be provided to the combustor in some implementations, but instead returned to an aircraft fuel tank, optionally after use in auxiliary systems such as fueldraulic actuators. The servo fuel-oil heat exchanger may be structurally similar to, or the same as, the primary fuel-oil heat exchanger. The servo fuel-oil heat exchanger may be smaller than the primary fuel-oil heat exchanger. At least a portion of the fuel may not pass through the secondary fuel-oil heat exchanger.

The heat exchange system may further comprise an additional bypass pipe arranged to allow oil (or fuel) to bypass a heat exchanger, or multiple heat exchangers, of the heat exchange system. A bypass pipe may effectively form an additional branch in a parallel branching oil system, in some implementations—the bypass valve, or another oil valve, may be arranged to adjust the amount of oil sent through the or each bypass pipe for oil, based on the one or more determined fuel characteristics, and optionally on one or more temperature measurements.

The heat exchange system may further comprise a refrigeration cycle apparatus, and the method may comprise using the refrigeration cycle apparatus to provide thermal lift by transferring further heat from the oil to the fuel, optionally such that the fuel temperature is raised above the oil temperature. The modulation valve, or another oil valve, may control how much oil flows through the refrigeration cycle apparatus.

The heat exchange system may further comprise branching fuel return pathways and at least one valve controlling a split of fuel flow. The branching pathways may be arranged to return fuel from the heat exchange system to at least two different places along a main fuel path from where fuel enters the gas turbine engine to the combustor. For example, fuel leaving a fuel-oil heat exchanger may be split into two or more branches, each branch re-joining the main fuel flow path at a different point. In some implementations, at least the majority of the fuel may flow through the fuel-oil heat exchanger, such that a branch of the branching fuel path leaving that heat exchanger is itself the "main" fuel path-one or more smaller branches may be split off and re-join the main flow at a different location for example further downstream, e.g. after one or more engine components located downstream of the fuel-oil heat exchanger in question, or indeed further upstream (so acting as a recirculation pipe).

Subject to suitability of the at least one determined fuel characteristic, the method may comprise sending all of the oil via the fuel-oil heat exchanger for at least one or more continuous periods of at least 30 minutes at cruise, such that no heat is lost to the environment via the air-oil heat exchanger for at least some periods of operation at cruise. Subject to suitability of the at least one determined fuel characteristic, the method may comprise sending at least 95% of the oil via the fuel-oil heat exchanger for at least 90% of time spent at cruise, such that very little heat, if any, is lost to the environment via the air-oil heat exchanger for at least 90% of operation at cruise. Subject to suitability of the at least one determined fuel characteristic, the method may comprise transferring at least 80% of the heat transferred away from the oil at cruise to the fuel. All of the heat transferred away from the oil at cruise may be transferred to the fuel over at least 90% of time spent at cruise in some implementations.

The at least one fuel characteristic may be or comprise thermal stability. At least 80% of the heat transferred away from the oil at cruise may be transferred to the fuel provided that the fuel is stable in operation at temperatures above 140° C.

The at least one fuel characteristic may be or comprise aromatic hydrocarbon content of the fuel. At least 80% of the heat transferred away from the oil at cruise may be transferred to the fuel provided that the fuel has a molar percentage of aromatic hydrocarbons below 12%.

The at least one fuel characteristic may be or comprise percentage of sustainable aviation fuel—% SAF—in the fuel. The SAF proportion (X %) may be volumetric. At least 80% of the heat transferred away from the oil at cruise may be transferred to the fuel provided that the fuel has a SAF content above 50%.

The at least one fuel characteristic may be or comprise calorific value of the fuel. At least 80% of the heat transferred away from the oil at cruise may be transferred to the fuel provided that the fuel has a calorific value of at least 43.5 MJ/kg.

The at least one fuel characteristic of the fuel may comprise at least one of:
 i. percentage of sustainable aviation fuel in the fuel;
 ii. heteroatomic species concentration of the fuel;
 iii. aromatic hydrocarbon content of the fuel;
 iv. multi-aromatic hydrocarbon content of the fuel;
 v. percentage of nitrogen-containing species in the fuel;
 vi. presence or percentage of a tracer species or trace element in the fuel;
 vii. hydrogen to carbon ratio of the fuel;
 viii. hydrocarbon distribution of the fuel;
 ix. level of non-volatile particulate matter emissions on combustion;
 x. naphthalene content of the fuel;
 xi. sulphur content of the fuel;
 xii. cycloparaffin content of the fuel;
 xiii. oxygen content of the fuel;
 xiv. thermal stability of the fuel;
 xv. level of coking of the fuel;
 xvi. an indication that the fuel is a fossil fuel;
 xvii. at least one of density, viscosity, calorific value, and heat capacity.

The method may further comprise chemically or physically detecting one or more parameters relevant to the fuel in a fuel tank after refuelling (the fuel tank being configured to supply fuel to the combustor via the heat exchange system). The detected parameters may be fuel characteristics, or may be used to calculate or infer fuel characteristics—for example, the detected parameters may be one or more of shaft speed, Turbofan Power Ratio (TPR) and/or Engine Pressure Ratio (EPR) and mass flow rate of fuel, from which calorific value (a fuel characteristic) may be determined, or the detected parameters may be fuel density and/or the presence of a tracer, both of which are themselves fuel characteristics. The determining at least one fuel characteristic may comprise obtaining stored fuel characteristic data. The chemically and/or physically determining one or more parameters of the fuel in the fuel tank may be performed by extracting a sample of the embarked fuel from the fuel tank for off-wing testing. Extracting a sample of the embarked fuel from the fuel tank may comprise taking a sample of the fuel prior to refuelling.

The determining the at least one fuel characteristic of the fuel may comprise obtaining at least one fuel characteristic of any fuel already present in the fuel tank prior to refuelling; determining at least one fuel characteristic of a fuel added to the fuel tank on refuelling; and calculating at least one fuel characteristic of the resultant fuel in the fuel tank after refuelling (based on that information).

The determining the at least one fuel characteristic may be performed based on detection of at least one fuel property. The fuel property may be the fuel characteristic, or may be used to calculate or otherwise determine (e.g. by retrieval from a look-up table) the fuel characteristic The detection may be performed on-wing.

The determining the at least one fuel characteristic may be performed based on received fuel composition data. The fuel composition data may be provided to the aircraft on refuelling. The fuel composition data may be manually entered.

According to a second aspect there is provided gas turbine engine for an aircraft comprising:
 an engine core comprising a turbine, a compressor, and a core shaft connecting the turbine to the compressor;
 a fan located upstream of the engine core; and
 a gearbox that receives an input from the core shaft and outputs drive to the fan so as to drive the fan at a lower rotational speed than the core shaft;
 an oil loop system arranged to supply oil to the gearbox; and
 a heat exchange system comprising:
  an air-oil heat exchanger through which the oil in the oil loop system flows; and
  a fuel-oil heat exchanger through which the oil in the oil loop system and the fuel flow such that heat is transferred between the oil and the fuel;
  a bypass pipe arranged to allow a proportion of the oil to flow past one of the air-oil heat exchanger and the fuel-oil heat exchanger;
  a bypass valve arranged to allow the proportion of the oil sent through the bypass pipe to be varied; and
  a fuel composition determination module arranged to determine at least one fuel characteristic of the fuel arranged to be combusted by the combustor,
 wherein the bypass valve is arranged to be controlled based on the at least one fuel characteristic so as to adjust the proportion of the oil sent via each heat exchanger at cruise conditions.

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

The core shaft may output drive to the fan directly, so as to drive the fan at the same rotational speed as the core shaft, such that the engine is a direct drive turbine engine.

The engine of the second aspect may be arranged to perform the method of the first aspect, and may have any of the features described with respect to the first aspect.

According to a third aspect there is provided, there is provided a method of operating a gas turbine engine, the gas turbine engine comprising:
 an engine core comprising a turbine, a compressor, a combustor arranged to combust a fuel, and a core shaft connecting the turbine to the compressor;
 a fan located upstream of the engine core;
 a fan shaft;
 at least one bearing arranged to support the fan shaft;
 an oil loop system arranged to supply oil to the at least one bearing; and
 a heat exchange system comprising:
  an air-oil heat exchanger through which the oil in the oil loop system flows; and
  a fuel-oil heat exchanger through which the oil in the oil loop system and the fuel flow such that heat is transferred between the oil and the fuel; and
  a bypass pipe arranged to allow a proportion of the oil to flow past one of the air-oil heat exchanger or the fuel-oil heat exchanger; and
  a bypass valve arranged to allow the proportion of the oil sent through the bypass pipe to be varied,
 the method comprising controlling the heat exchange system such that, under cruise conditions, a heat transfer ratio of:

$$\frac{\text{rate of heat transfer from oil to air} \left(\text{kJ kg}^{-1}\right)}{\text{rate of heat transfer from oil to fuel} \left(\text{kJ kg}^{-1}\right)}$$

is in the range from 0 to 0.67.

The inventors have appreciated that the use of fuels different from the traditional kerosene-based jet fuels, such as sustainable aviation fuels, may result in different fuel properties, and that parameters at cruise conditions may be adjusted to make use of the different fuel properties. In particular, some fuels may be heated to higher temperatures in one or more fuel-oil heat exchangers than traditional fuels, without significantly increasing coking or other fuel breakdown product deposition pathways (e.g. lacquering). This may allow for a method providing improved oil cooling (as the fuel is able to take more heat) and may also improve the overall thermodynamic efficiency of the engine, with less heat being lost to the surroundings. The controllable heat exchange system has a key role to play in managing the heat transfer ratio.

Whilst it will be appreciated that the ratio is dimensionless, heat transfer is measured by mass of fuel in the examples described herein, so providing a heat transfer rate normalised for fuel flow rate variations at cruise. For the heat transfer from oil to air, the definition of "per unit volume of fuel" can be equated to "per a set time period depending on fuel flow rate" to similarly provide normalisation for fuel flow rate. It will be appreciated that the heat transfer using the heat exchanger must be completed before the fuel reaches the combustor. Any additional temperature rise in the combustor itself is due to the combustion, not to the heat exchange system. It will be appreciated that the heat transfer is noted with respect to mass (kg) of fuel reaching the combustor so as to adjust for fuel flow rate and any recirculation through one or more heat exchangers or bypass of one or more heat exchangers as described elsewhere herein. The amount of heat transferred to the fuel may therefore be calculated based on a temperature of fuel on approach or entry to the combustor as compared to a temperature of fuel in a fuel tank of the aircraft. For the purposes of comparison, the amount of heat transferred from the oil to the air may be determined from a temperature drop of the oil across the air-oil heat exchanger(s), or by comparing the heat gained by the fuel to an overall heat loss from the oil, and assuming that the difference is due to heat loss from the oil to the air (with any other sources of loss or generation being factored in, such as fuel recirculation).

The method may comprise controlling the heat exchange system such that, under cruise conditions, the heat transfer ratio is in the range from 0 to 0.60, from 0 to 0.50, from 0 to 0.40, from 0 to 0.30, from 0 to 0.20, or from 0 to 0.10.

The controlling the heat exchange system so as to adjust heat transfer ratio may comprise decreasing the amount of oil sent via the at least one air-oil heat exchanger when the heat transfer ratio is too high.

The at least one bypass pipe may be arranged to allow oil to bypass the air-oil heat exchanger, such that oil flowing through the bypass pipe flows through the fuel-oil heat exchanger without flowing through the air-oil heat exchanger. Controlling the heat exchange system so as to adjust the heat transfer ratio may comprise increasing the amount of oil flowing through the bypass pipe when the heat transfer ratio is too high.

The heat exchange system may comprise at least one recirculation pipe arranged to allow a fluid (oil or fuel) to pass through a heat exchanger multiple times, and the controlling the heat exchange system so as to adjust the heat transfer ratio may comprise modulating the amount of the fluid sent via the recirculation pipe.

The heat exchange system may further comprise a secondary fuel-oil heat exchanger. The secondary fuel-oil heat exchanger may be a servo fuel-oil heat exchanger. A portion, but not all, of the fuel leaving the main fuel-oil heat exchanger may be directed to the servo fuel-oil heat exchanger. The servo fuel-oil heat exchanger may increase the temperature of the fuel further, before providing the fuel for use in servo mechanisms of the gas turbine engine (e.g. for fueldraulic actuation and/or heating). These servo mechanisms may include a nacelle anti-icing system. The servo mechanisms may include engine actuators. The servo mechanisms may include a Turbine Case Cooling (TCC) servo valve. Only fuel which has passed through the secondary fuel-oil heat exchanger may be used in these auxiliary systems. The fuel used in these auxiliary systems may be returned to a fuel tank for later re-circulation, or may be recombined with other fuel leaving the main fuel-oil heat exchanger and enter the combustor. The fuel which passes through the secondary fuel-oil heat exchanger therefore may not be provided to the combustor in some implementations, but instead returned to an aircraft fuel tank, optionally after use in auxiliary systems such as fueldraulic actuators. The servo fuel-oil heat exchanger may be structurally similar to, or the same as, the primary fuel-oil heat exchanger. The servo fuel-oil heat exchanger may be smaller than the primary fuel-oil heat exchanger. At least a portion of the fuel may not pass through the secondary fuel-oil heat exchanger.

The heat exchange system may comprise a refrigeration cycle apparatus. The method may comprise using the refrigeration cycle apparatus to provide thermal lift by transferring further heat from the oil to the fuel, optionally such that the fuel temperature is raised above the oil temperature. The heat transfer ratio of examples using a refrigeration cycle apparatus may be in the range from 0 to 0.40.

In implementations in which no refrigeration cycle apparatus is used/in which the heat exchange system is not arranged to provide thermal lift, the heat transfer ratio may be in the range from 0.38 to 0.67.

The method may comprise controlling the heat exchange system under cruise conditions such that the heat transfer ratio is in the range from 0 to 0.2 provided that the fuel temperature on entry to the combustor is at least 160° C.

The method may comprise controlling the heat exchange system under cruise conditions such that the heat transfer ratio is in the range from 0 to 0.1 provided that the fuel temperature on entry to the combustor is at least 180° C.

The method may comprise controlling the heat exchange system under cruise conditions such that the heat transfer ratio is in the range from 0 to 0.45 provided that the fuel temperature on entry to the combustor is at least 140° C.

The method may comprise controlling the heat exchange system under cruise conditions such that the heat transfer ratio is in the range from 0 to 0.2 provided that the fuel is at least 70% sustainable aviation fuel.

The method may comprise controlling the heat exchange system under cruise conditions such that the heat transfer ratio is in the range from 0 to 0.1 provided that the fuel is at least 80% sustainable aviation fuel.

The method may comprise keeping the rate of heat transfer from oil to air at cruise in the range from 0 to 100 kJ per kilogram of fuel at cruise conditions, and optionally 0 to 35 KJ/kg, with no more than 20% of the heat transferred away from the oil at cruise being transferred to the air.

The method may comprise keeping the rate of heat transfer from oil to fuel at cruise in the range from 110 to 200 kJ per kilogram of fuel at cruise conditions, and optionally 150 to 200 KJ/kg, with at least 80% of the heat transferred away from the oil at cruise being transferred to the fuel.

The method of the first and third aspect may be complementary, and they may be performed together in various implementations. The method of the third aspect may be performed using the engine of the second aspect.

According to a fourth aspect, there is provided a gas turbine engine for an aircraft, the engine comprising:
an engine core comprising a turbine a compressor, and a core shaft connecting the turbine to the compressor;
a fan located upstream of the engine core;
a fan shaft;
at least one bearing arranged to support the fan shaft;
an oil loop system arranged to supply oil to the gearbox; and
a heat exchange system comprising:
an air-oil heat exchanger through which the oil in the oil loop system flows;
a fuel-oil heat exchanger through which the oil in the oil loop system and the fuel flow such that heat is transferred between the oil and the fuel;
a bypass pipe arranged to allow a proportion of the oil to flow past one of the air-oil heat exchanger or the fuel-oil heat exchanger; and
a bypass valve arranged to allow the proportion of the oil sent through the bypass pipe to be varied,
and wherein the heat exchange system is arranged to be controlled such that, under cruise conditions, a heat transfer ratio of:

$$\frac{\text{rate of heat transfer from oil to air } (kJkg^{-1})}{\text{rate of heat transfer from oil to fuel } (kJkg^{-1})}$$

is in the range from 0 to 0.67.

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

The heat exchange system may further comprise branching fuel return pathways and at least one valve controlling a split of fuel flow. The branching pathways may be arranged to return fuel from the heat exchange system to at least two different places along a main fuel path from where fuel enters the gas turbine engine to the combustor.

The bypass pipe may arranged to allow a proportion of the oil to flow past the air-oil heat exchanger, such that oil flowing through the bypass pipe flows through the fuel-oil heat exchanger without flowing through the air-oil heat exchanger.

The core shaft may output drive to the fan directly, so as to drive the fan at the same rotational speed as the core shaft, such that the engine is a direct drive turbine engine.

The air-oil heat exchanger and fuel-oil heat exchanger may be arranged in series configuration on the oil loop system.

Alternatively, the oil loop system, which may also be referred to as a recirculating oil system, may branch such that a proportion of the oil can flow along each branch. The air-oil and fuel-oil heat exchangers may be arranged in a parallel configuration on different branches of the oil loop system.

The engine of the fourth aspect may be arranged to perform the method of the first and/or third aspect, and may have any of the features described with respect to any preceding aspect.

According to a fifth aspect there is provided a method of operating a gas turbine engine, the gas turbine engine comprising:
an engine core comprising a turbine, a compressor, a combustor arranged to combust a fuel, and
a core shaft connecting the turbine to the compressor;
a fan located upstream of the engine core;
a fan shaft;
at least one bearing arranged to support the fan shaft;
an oil loop system arranged to supply oil to the at least one bearing; and
a heat exchange system comprising:
an air-oil heat exchanger through which the oil in the oil loop system flows; and
a fuel-oil heat exchanger through which the oil in the oil loop system and the fuel flow such that heat is transferred between the oil and the fuel; and
a bypass pipe arranged to allow a proportion of the oil to flow past one of the air-oil heat exchanger or the fuel-oil heat exchanger; and
a bypass valve arranged to allow the proportion of the oil sent through the bypass pipe to be varied,
the method comprising controlling the heat exchange system such that, under idle conditions, a heat transfer ratio of:

$$\frac{\text{rate of heat transfer from oil to air } (kJkg^{-1})}{\text{rate of heat transfer from oil to fuel } (kJkg^{-1})}$$

is in the range from 0 to 1.5.

The inventors have appreciated that the use of fuels different from the traditional kerosene-based jet fuels, such as sustainable aviation fuels, may result in different fuel properties, and that parameters at idle conditions may be adjusted to make use of the different fuel properties. In particular, some fuels may be heated to higher temperatures in one or more fuel-oil heat exchangers than traditional fuels, without significantly increasing coking or other fuel breakdown product deposition pathways (e.g. lacquering). This may allow for a method providing improved oil cooling (as the fuel is able to take more heat) and may also improve the overall thermodynamic efficiency of the engine, with less heat being lost to the surroundings. The controllable heat exchange system has a key role to play in managing the heat transfer ratio.

Further, whilst cruise conditions generally make up a much larger proportion of an aircraft engine's time in operation, the inventors appreciated that operation at idle is also significant—as the fuel mass flow rate is much lower at idle than at cruise, even a relatively small heat load to the fuel can result in a high temperature increase—the use of non-traditional fuels may therefore have an even greater effect on optimal approaches to heat management under idle conditions—e.g. whilst the aircraft is starting up, running whilst stationary during boarding, taxiing (towards a runway or hangar, or between other ground-based locations), or during 'flight idle' conditions such as during descent. As the operating conditions are very different between cruise and idle—at least in terms of desired thrust output from the engine-different control of the heat exchange system is appropriate.

Whilst it will be appreciated that the ratio is dimensionless, heat transfer is measured per unit mass of fuel in the examples described herein, so providing a heat transfer rate normalised for fuel flow rate variations at idle. For the heat transfer from oil to air, the definition of "per unit mass of fuel" can be equated to "per a set time period depending on fuel flow rate" to similarly provide normalisation for fuel flow rate. It will be appreciated that the heat transfer using the heat exchanger must be completed before the fuel reaches the combustor. Any additional temperature rise in the combustor itself is due to the combustion, not to the heat exchange system. It will be appreciated that the heat transfer is noted per unit mass (kg) of fuel reaching the combustor so as to adjust for fuel flow rate and any recirculation through one or more heat exchangers or bypass of one or more heat exchangers as described elsewhere herein. The amount of heat transferred to the fuel may therefore be calculated based on a temperature of fuel on approach or entry to the combustor as compared to a temperature of fuel in a fuel tank of the aircraft. For the purposes of comparison, the amount of heat transferred from the oil to the air may be determined from a temperature drop of the oil across the air-oil heat exchanger(s), or by comparing the heat gained by the fuel to an overall heat loss from the oil, and assuming that the difference is due to heat loss from the oil to the air (after factoring any other sources of loss or generation being factored in, such as fuel recirculation or the fuel pump).

The method may comprise controlling the heat exchange system such that, under idle conditions, the heat transfer ratio is below 1.0, in the range from 0 to 0.60, from 0 to 0.50, from 0 to 0.40, from 0 to 0.30, from 0 to 0.20, or from 0 to 0.10.

The controlling the heat exchange system so as to adjust heat transfer ratio may comprise decreasing the amount of oil sent via the at least one air-oil heat exchanger when the heat transfer ratio is too high.

The at least one bypass pipe may be arranged to allow oil to bypass the air-oil heat exchanger, such that oil flowing through the bypass pipe flows through the fuel-oil heat exchanger without flowing through the air-oil heat exchanger. Controlling the heat exchange system so as to adjust the heat transfer ratio may comprise increasing the amount of oil flowing through the bypass pipe when the heat transfer ratio is too high.

The heat exchange system may comprise at least one recirculation pipe arranged to allow a fluid (oil or fuel) to pass through a heat exchanger multiple times, and the controlling the heat exchange system so as to adjust the heat transfer ratio may comprise modulating the amount of the fluid sent via the recirculation pipe.

The heat exchange system may further comprise a secondary fuel-oil heat exchanger. The secondary fuel-oil heat exchanger may be a servo fuel-oil heat exchanger. A portion, but not all, of the fuel leaving the main fuel-oil heat exchanger may be directed to the servo fuel-oil heat exchanger. The servo fuel-oil heat exchanger may increase the temperature of the fuel further, before providing the fuel for use in servo mechanisms of the gas turbine engine (e.g. for fueldraulic actuation and/or heating). These servo mechanisms may include a nacelle anti-icing system. The servo mechanisms may include engine actuators. The servo mechanisms may include a Turbine Case Cooling (TCC) servo valve. Only fuel which has passed through the secondary fuel-oil heat exchanger may be used in these auxiliary systems. The fuel used in these auxiliary systems may be returned to a fuel tank for later re-circulation, or may be recombined with other fuel leaving the main fuel-oil heat exchanger and enter the combustor. The fuel which passes through the secondary fuel-oil heat exchanger therefore may not be provided to the combustor in some implementations, but instead returned to an aircraft fuel tank, optionally after use in auxiliary systems such as fueldraulic actuators. The servo fuel-oil heat exchanger may be structurally similar to, or the same as, the primary fuel-oil heat exchanger. The servo fuel-oil heat exchanger may be smaller than the primary fuel-oil heat exchanger. At least a portion of the fuel may not pass through the secondary fuel-oil heat exchanger.

The heat exchange system may comprise a refrigeration cycle apparatus. The method may comprise using the refrigeration cycle apparatus to provide thermal lift by transferring further heat from the oil to the fuel, optionally such that the fuel temperature is raised above the oil temperature. The heat transfer ratio of examples using a refrigeration cycle apparatus may be in the range from 0 to 0.40.

Where the heat exchange system is not arranged to provide thermal lift, the heat exchange system may be controlled such that the heat transfer ratio is in the range from 0.38 to 1.2.

The method may comprise controlling the heat exchange system under idle conditions such that the heat transfer ratio is in the range from 0.3 to 1.5 provided that the fuel temperature on entry to the combustor is below 180° C.

The method may comprise controlling the heat exchange system under idle conditions such that the heat transfer ratio is in the range from 0 to 0.3 provided that the fuel temperature on entry to the combustor is at above 180° C.

Under idle conditions, the method may comprise controlling the heat exchange system such that the heat transfer ratio is in the range from 0 to 0.2 provided that the fuel is at least 70% sustainable aviation fuel.

The method may comprise keeping the rate of heat transfer from oil to air at idle in the range from 0 to 180 KJ per kilogram of fuel at idle conditions, and optionally 0 to 60 KJ/kg, with no more than 20% of the heat transferred away from the oil at idle being transferred to the air.

The method may comprise keeping the rate of heat transfer from oil to fuel at idle in the range from 100 to 300 KJ per kilogram of fuel at idle conditions, and optionally 200 to 300 KJ/kg, with at least 80% of the heat transferred away from the oil at idle being transferred to the fuel.

The air-oil heat exchanger and the fuel-oil heat exchanger may be arranged in series in the oil loop system.

Alternatively, the oil loop system, which may also be referred to as a recirculating oil system, may branch such that a proportion of the oil can flow along each branch. The air-oil and fuel-oil heat exchangers may be arranged in a parallel configuration on different branches of the oil loop system. The heat exchange system may therefore further include a modulation valve arranged to allow the proportion of the oil sent via each branch to be varied, and the controlling the modulation valve may therefore adjust the proportion of the oil sent via each branch at cruise conditions. More than two heat exchangers, and/or more than two branches, may be provided in some examples. The two or more branches of the primary oil loop system may re-join after the heat exchanger system, such that the oil recombines after heat is transferred from the oil.

The heat exchange system further may comprise branching fuel return pathways and at least one valve controlling a split of fuel flow, the branching pathways being arranged to return fuel from the heat exchange system to at least two different places along a main fuel path from where fuel enters the gas turbine engine to the combustor.

The method of the first, third and fifth aspect may be complementary, and they may be performed together in various implementations. The method of the fifth aspect may be performed using the engine of the second or fourth aspect.

According to a sixth aspect, there is provided a gas turbine engine for an aircraft, the engine comprising:
an engine core comprising a turbine a compressor, and a core shaft connecting the turbine to the compressor;
a fan located upstream of the engine core;
a fan shaft;
at least one bearing arranged to support the fan shaft;
an oil loop system arranged to supply oil to the gearbox; and
a heat exchange system comprising:
an air-oil heat exchanger through which the oil in the oil loop system flows;
a fuel-oil heat exchanger through which the oil in the oil loop system and the fuel flow such that heat is transferred between the oil and the fuel;
a bypass pipe arranged to allow a proportion of the oil to flow past one of the air-oil heat exchanger or the fuel-oil heat exchanger; and
a bypass valve arranged to allow the proportion of the oil sent through the bypass pipe to be varied,
and wherein the heat exchange system is arranged to be controlled such that, under idle conditions, a heat transfer ratio of:

$$\frac{\text{rate of heat transfer from oil to air } (kJkg^{-1})}{\text{rate of heat transfer from oil to fuel } (kJkg^{-1})}$$

is in the range from 0 to 1.5.

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

The heat exchange system may further comprise branching fuel return pathways and at least one valve controlling a split of fuel flow. The branching pathways may be arranged to return fuel from the heat exchange system to at least two different places along a main fuel path from where fuel enters the gas turbine engine to the combustor.

The bypass pipe may arranged to allow a proportion of the oil to flow past the air-oil heat exchanger, such that oil flowing through the bypass pipe flows through the fuel-oil heat exchanger without flowing through the air-oil heat exchanger.

The core shaft may output drive to the fan directly, so as to drive the fan at the same rotational speed as the core shaft, such that the engine is a direct drive turbine engine.

The air-oil heat exchanger and fuel-oil heat exchanger may be arranged in series configuration in the oil loop system.

Alternatively, the oil loop system, which may also be referred to as a recirculating oil system, may branch such that a proportion of the oil can flow along each branch. The air-oil and fuel-oil heat exchangers may be arranged in a parallel configuration on different branches of the oil loop system.

The engine of the sixth aspect may be arranged to perform the method of the first, third and/or fifth aspect, and may have any of the features described with respect to any preceding aspect.

According to a seventh aspect there is provided a method of operating a gas turbine engine of an aircraft, the gas turbine engine comprising:
an engine core comprising a turbine, a compressor, a combustor arranged to combust a fuel, and a core shaft connecting the turbine to the compressor;
a fan located upstream of the engine core;
a fan shaft;
at least one bearing arranged to support the fan shaft;
at least one auxiliary system arranged to use some of the fuel;
an oil loop system arranged to supply oil to the at least one bearing; and
a heat exchange system comprising:
a primary fuel-oil heat exchanger through which the oil in the oil loop system and at least substantially all the fuel flow such that heat is transferred between the oil and the fuel; and
a secondary fuel-oil heat exchanger through which the oil in the oil loop system and a portion of the fuel flow, such that heat is transferred between the oil and the fuel, the secondary fuel-oil heat exchanger being arranged to supply fuel to the at least one auxiliary system; and
a fuel pump arranged to pump the fuel, wherein the fuel pump is located downstream of the primary fuel-oil heat exchanger and upstream of the secondary fuel-oil heat exchanger along a fuel flow path;
the method further comprises controlling the heat exchange system such that, under cruise conditions, the fuel temperature on leaving the secondary heat exchanger is in the range from 120° C. to 200° C.

The inventors have appreciated that the use of fuels different from the traditional kerosene-based jet fuels, such as sustainable aviation fuels, may result in different fuel properties, and that parameters at idle conditions may be adjusted to make use of the different fuel properties. In particular, some fuels may be heated to higher temperatures in one or more fuel-oil heat exchangers than traditional fuels, without significantly increasing coking or other fuel breakdown product deposition pathways (e.g. lacquering). This may allow for a method providing improved oil cooling (as the fuel is able to take more heat) and may also improve the overall thermal efficiency of the engine, with less heat being lost to the surroundings. The controllable heat exchange system has a key role to play in managing the heat transfer ratio.

The secondary fuel-oil heat exchanger may be a servo fuel-oil heat exchanger. A portion, but not all, of the fuel leaving the main fuel-oil heat exchanger may be directed to the servo fuel-oil heat exchanger. The servo fuel-oil heat exchanger may increase the temperature of the fuel further, before providing the fuel for use in servo mechanisms of the gas turbine engine (e.g. for fueldraulic actuation and/or heating). These servo mechanisms may include a nacelle anti-icing system. The servo mechanisms may include engine actuators. The servo mechanisms may include a Turbine Case Cooling (TCC) servo valve. Only fuel which has passed through the secondary fuel-oil heat exchanger may be used in these auxiliary systems. The fuel used in these auxiliary systems may be returned to a fuel tank for later re-circulation, or may be recombined with other fuel leaving the main fuel-oil heat exchanger and enter the combustor. The fuel which passes through the secondary fuel-oil heat exchanger therefore may not be provided to the combustor in some implementations, but instead returned to an aircraft fuel tank, optionally after use in auxiliary systems such as fueldraulic actuators. The servo fuel-oil heat exchanger may be structurally similar to, or the same as, the primary fuel-oil heat exchanger. The servo fuel-oil heat exchanger may be smaller than the primary fuel-oil heat exchanger. At least a portion of the fuel may not pass through the secondary fuel-oil heat exchanger.

The method may comprise controlling the heat exchange system such that, under cruise conditions, the fuel temperature on leaving the secondary heat exchanger is in the range from 120° C. to 180° C.

The method may comprise controlling the heat exchange system such that, under cruise conditions, the fuel temperature on leaving the secondary heat exchanger is in the range from 135° C. to 200° C.

The method may comprise controlling the heat exchange system such that, under cruise conditions, the fuel temperature on leaving the secondary heat exchanger is in the range from 135° C. to 180° C.

The method may comprise controlling the heat exchange system such that, under cruise conditions, the fuel temperature on leaving the secondary heat exchanger is in the range from 150° C. to 200° C., 150° C. to 180° C., 150° C. to 170° C. The fuel temperature on leaving the secondary heat exchanger may be approximately 120° C., 130° C., 140° C., 150° C., 160° C. or up to 200° C.

The heat exchange system may further comprise a fuel bypass pipe arranged to allow a proportion of the fuel to bypass at least one of the primary fuel-oil heat exchanger and the secondary fuel-oil heat exchanger; and a fuel bypass valve arranged to allow the proportion of the fuel sent through the fuel bypass pipe to be varied. Controlling the heat exchange system may comprise controlling the fuel bypass valve so as to adjust the proportion of the fuel sent via each of the primary and secondary fuel-oil heat exchangers at cruise conditions.

The heat exchange system may further comprise an oil bypass pipe arranged to allow a proportion of the oil to bypass at least one of the primary fuel-oil heat exchanger and the secondary fuel-oil heat exchanger; and an oil bypass valve arranged to allow the proportion of the fuel sent through the oil bypass pipe to be varied. Controlling the heat exchange system may comprise controlling the oil bypass valve so as to adjust the proportion of the oil sent via each of the primary and secondary fuel-oil heat exchangers at cruise conditions.

Under cruise conditions, the ratio of $$\frac{\text{fuel flow through the secondary fuel-oil heat exchanger } (m^3 s^{-1})}{\text{fuel flow to the combustor } (m^3 s^{-1})}$$

may be at least 0.3.

This ratio may be referred to as the secondary heat changer fuel flow ratio, for brevity.

The secondary heat changer fuel flow ratio may be at least 0.35, 0.4, 0.45, 0.5, 0.55. The secondary heat exchanger fuel flow ratio may be approximately 0.6.

The heat exchange system may further comprise a refrigeration cycle apparatus, and the method may comprise using the refrigeration cycle apparatus to provide thermal lift by transferring further heat from the oil to the fuel optionally such that the fuel temperature is raised above the oil temperature. An oil valve may control how much oil flows through the refrigeration cycle apparatus.

The heat exchange system may further comprise branching fuel return pathways and at least one valve controlling a split of fuel flow, the branching pathways being arranged to return fuel from the heat exchange system to at least two different places along a main fuel flow path. For example, fuel leaving a fuel-oil heat exchanger may be split into two or more branches, each branch re-joining the main fuel flow path at a different point. In some implementations, at least the majority of the fuel may flow through the fuel-oil heat exchanger, such that a branch of the branching fuel path leaving that heat exchanger is itself the "main" fuel path-one or more smaller branches may be split off and re-join the main flow at a different location for example further downstream, e.g. after one or more engine components located downstream of the fuel-oil heat exchanger in question, or indeed further upstream (so acting as a recirculation pipe).

The primary fuel-oil heat exchanger and the secondary fuel-oil heat exchanger may be arranged in series along the oil loop system.

The heat exchange system may further comprise at least one air-oil heat exchanger through which the oil of the oil loop system flows.

According to an eighth aspect of the invention, there is provided a gas turbine engine for an aircraft comprising:
  an engine core comprising a turbine, a compressor, and a core shaft connecting the turbine to the compressor;
  a fan located upstream of the engine core; and
  a gearbox that receives an input from the core shaft and outputs drive to the fan so as to drive the fan at a lower rotational speed than the core shaft;
  an oil loop system arranged to supply oil to the gearbox; and
  a heat exchange system comprising:
    a primary fuel-oil heat exchanger through which the oil in the oil loop system and at least substantially all the fuel flow such that heat is transferred between the oil and the fuel; and
    a secondary fuel-oil heat exchanger through which the oil in the oil loop system and a portion of the fuel flow such that heat is transferred between the oil and the fuel, the secondary fuel-oil heat exchanger being arranged to supply fuel to the at least one auxiliary system; and
    a fuel pump arranged to pump the fuel, wherein the fuel pump is located downstream of the primary fuel-oil heat exchanger and upstream of the secondary fuel-oil heat exchanger along a fuel flow path;
  wherein the heat exchange system is arranged to be controlled such that, under cruise conditions, the fuel temperature on leaving the second heat exchanger is in the range from 120° C. to 200° C.

The heat exchange system may be arranged to be controlled such that, under cruise conditions, the fuel temperature on leaving the second heat exchanger is in the range from 120° C. to 180° C.

The turbine may be a first turbine, the compressor may be a first compressor, and the core shaft may be a first core shaft. The engine core may further comprise a second turbine, a second compressor, and a second core shaft connecting the second turbine to the second compressor; and the second turbine, second compressor, and second core shaft may arranged to rotate at a higher rotational speed than the first core shaft.

The core shaft may output drive to the fan directly, so as to drive the fan at the same rotational speed as the core shaft, such that the engine is a direct drive turbine engine.

The engine of the eighth aspect may be arranged to perform the method of the first, third, fifth and/or seventh aspect, and may have any of the features described with respect to any preceding aspect. According to a ninth aspect there is provided method of operating a gas turbine engine of an aircraft, the gas turbine engine comprising:
- an engine core comprising a turbine, a compressor, a combustor arranged to combust a fuel, and a core shaft connecting the turbine to the compressor;
- a fan located upstream of the engine core;
- a fan shaft;
- at least one bearing arranged to support the fan shaft;
- an oil loop system arranged to supply oil to the at least one bearing;
- a heat exchange system comprising:
  - an air-oil heat exchanger through which the oil in the oil loop system flows;
  - a fuel-oil heat exchanger through which the oil in the oil loop system and the fuel flow such that heat is transferred between the oil and the fuel; and
- at least one valve arranged to allow at least one of oil flow rate and air flow rate through at least one of the fuel-oil heat exchanger and the air-oil heat exchanger to be varied; and
- a temperature sensor arranged to provide an indication of fuel temperature downstream of the fuel-oil heat exchanger (optionally on entry to the combustor), the method comprising:
- determining if the fuel temperature has increased above a set threshold at cruise conditions, based on an output from the temperature sensor; and
- in response to determining that the fuel temperature has increased above the set threshold at cruise conditions, controlling the at least one valve so as to change the at least one flow rate through the at least one heat exchanger.

For example, the at least one valve may be or comprise a valve arranged to allow a proportion of the oil sent via the fuel-oil heat exchanger to be varied, and the method may comprise, in response to determining that the fuel temperature has increased above a set threshold at cruise conditions, controlling the at least one valve so as to send less oil through the fuel-oil heat exchanger.

The inventors appreciated that it is important for the oil temperature to remain in a desired range as well as for the fuel temperature not to exceed a limit, so in some implementations the focus for flow rate adjustment may be the air-oil heat exchanger. The at least one valve may therefore be or comprise a valve arranged to allow a proportion of the oil sent via the air-oil heat exchanger to be varied, and the method may comprise, in response to determining that the fuel temperature has increased above a set threshold at cruise conditions, controlling the at least one valve so as to send more oil through the air-oil heat exchanger.

A lack of an oil bypass on the air-oil heat exchanger could result in over-cooling of the oil (e.g. congealing) in some conditions. A bypass pipe may therefore be provided for both heat exchangers. At least a portion of the oil may bypass both heat exchangers in some implementations.

The at least one valve may be or comprise a valve arranged to control air flow rate through the air-oil heat exchanger. The method may comprise sending more air through the air-oil heat exchanger in response to determining that the fuel temperature has increased above the set threshold at cruise conditions.

The method may comprise controlling multiple valves in some implementations, for example:
- controlling oil flow through each of the fuel-oil heat exchanger and the air-oil heat exchanger separately; and/or
- controlling both air flow and oil flow.

As described for the preceding aspects, the inventors have appreciated that the use of fuels different from the traditional kerosene-based jet fuels, such as sustainable aviation fuels, may result in different fuel properties, and that parameters at may be adjusted to make use of the different fuel properties. In particular, some fuels may be heated to higher temperatures in one or more fuel-oil heat exchangers than traditional fuels, without significantly increasing the deposition of fuel breakdown products, e.g. by coking or lacquering, allowing the fuel to take more heat and so reducing a need for air-cooling of oil and improving engine efficiency. However, allowing unsuitable fuels to reach these higher temperatures could be deleterious to engine performance, and even cause blockages of fuel injection nozzles in some cases. Checks and balances are therefore desired to ensure that engine performance is optimised for a given fuel. The method of this seventh aspect involves monitoring fuel temperature to check for any excessively high fuel temperatures, and taking action to reduce heating of the fuel when appropriate. The fuel temperatures downstream of the fuel-oil heat exchanger (e.g. on entry to the combustor) at cruise conditions may be defined as an average over at least 1, 2, 3 4, or 5 minutes, and optionally over ten minutes, twenty minutes, or thirty minutes, under steady state cruise conditions. These average temperatures do not include transient spikes in temperature, which may be defined as fluctuations in temperature of the fuel during operation, often elevation of the temperature. A transient spike—for example a spike lasting only a few seconds—to a higher temperature may therefore not be sufficient to trigger a change in oil flow.

In a transitional period, with available aviation fuels changing with time during the lifespan of a gas turbine engine, as well as depending on geographical location of a refuelling point (among other variables) it is important for the level of heating of the fuel to be decided based on the specific fuel in use. Sending less oil through the fuel-oil heat exchanger results in less heat being transferred to the fuel, so providing a lower fuel temperature on approach to the combustor. As such, gas turbine operation can be tailored to get the best out of a wide variety of fuels. The controllable oil flow valve arranged to adjust the rate of oil flow through the fuel-oil heat exchanger has a key role to play in this tailoring of engine performance.

The inventors appreciated that these principles can be applied to both engines with branching oil loop pathways with different heat exchangers on different branches (parallel arrangements) and to engines with substantially linear, series, arrangements of heat exchangers and in which use of one or more bypass pipes may be made as an alternative to a branched main pathway.

The oil loop system may branch such that a proportion of the oil can flow along each branch, and the air-oil and fuel-oil heat exchangers may be arranged in a parallel configuration on different branches of the oil loop system. In such implementations, the at least one valve arranged to allow the proportion of the oil sent via the fuel-oil heat exchanger to be varied may be or comprise a modulation valve arranged to allow the proportion of the oil sent via each branch to be varied.

The oil loop system may comprise at least one bypass pipe arranged to allow a proportion of the oil to bypass at least one of the fuel-oil heat exchanger and the air-oil heat exchanger. In such implementations, the at least one valve may be or comprise at least one bypass valve arranged to allow a proportion of the oil to bypass the respective heat exchanger/to control the proportion of oil sent via the bypass pipe. In such implementations, the air-oil and fuel-oil heat exchangers may be arranged in series in the oil loop system, or in parallel. In implementations in which the air-oil and fuel-oil heat exchangers are arranged in parallel, on different branches of the oil loop system, and in which there is additionally at least one bypass pipe, the method may comprise controlling both the bypass valve and a modulation valve arranged to allow the proportion of the oil sent via each branch to be varied.

In implementations in which the method is arranged to adjust the flow rate of oil through the fuel-oil heat exchanger, at least some of the oil diverted away from the fuel-oil heat exchanger may be sent to the air-oil heat exchanger. In some such implementations, air flow through the air-oil heat exchanger may be increased when more oil is sent via the air-oil heat exchanger.

In implementations in which the method is arranged to adjust the flow rate of oil through the fuel-oil heat exchanger or the air-oil heat exchanger, at least some of the oil diverted away from the respective heat exchanger may be sent via a bypass pipe around the respective heat exchanger.

The method may further comprise determining the set threshold based on at least one fuel characteristic of the fuel. In such implementations, the at least one fuel characteristic of the fuel may be or comprise at least one of: thermal stability of the fuel, nitrogen content of the fuel, sulphur content of the fuel, and sustainable aviation fuel-SAF-content of the fuel.

The step of determining the set threshold may comprise increasing the set threshold, optionally linearly, with increasing thermal stability of the fuel.

The step of determining the set threshold may comprise increasing the set threshold, optionally linearly, with increasing SAF content of the fuel, for fuels with a SAF content of above 70%.

The method may further comprise determining the at least one fuel characteristic of the fuel, optionally by any of the methods described below.

The heat exchange system may comprise an air valve arranged to control air flow rate through the air-oil heat exchanger. The method may further comprise, in response to determining that the fuel temperature has increased above a set threshold at cruise conditions, controlling the air valve so as to send more air through the air-oil heat exchanger.

The heat exchange system may comprise a refrigeration cycle apparatus arranged to provide thermal lift by transferring additional heat from the oil to the fuel beyond that transferred by the fuel-oil heat exchanger. The method may further comprise controlling the refrigeration cycle apparatus so as to reduce the amount of additional heat transferred to the fuel in response to determining that the fuel temperature has increased above a set threshold at cruise conditions. For example, the refrigeration cycle apparatus may be turned off/deactivated.

The heat exchange system may comprise at least one bypass pipe, and the at least one valve may be or comprise a bypass valve arranged to control flow rate through that bypass pipe. The heat exchange system may comprise multiple bypass pipes each arranged to allow oil to bypass one heat exchanger (e.g. the fuel-oil heat exchanger or air-oil heat exchanger described above, or a secondary fuel-oil heat exchanger, an oil-oil heat exchanger arranged to transfer heat between two separate oil loops of the heat exchange system, or any other appropriate heat exchanger). The method may comprise controlling at least two bypass valves—for example, a bypass valve for the air-oil heat exchanger may be adjusted to send more oil to the air-oil heat exchanger when the bypass valve for the fuel-oil heat exchanger is adjusted to send less oil to the fuel-oil heat exchanger. The same valve (e.g. a three-way valve) may adjust oil flow to both heat exchangers in some implementations.

The set threshold may be in the range from 140° C. to 300° C., and optionally from 250° C. to 300° C. The set threshold may be 140° C., 180° C., 200° C., 210° C., 220° C., 230° C., 240° C., 250° C., 260° C., 270° C., 275° C., 280° C., 290° C., or 300° C. The determining step may be performed at regular intervals during aircraft operation at cruise.

The methods of the first, third, fifth and seventh aspects may be complementary, and any two or more of them may be performed together in various implementations. The method of the seventh aspect may be performed using the engine of the second, fourth or sixth aspect.

According to an eighth aspect, there is provided a gas turbine engine for an aircraft, the gas turbine engine comprising:
  an engine core comprising a turbine, a compressor, and a core shaft connecting the turbine to the compressor;
  a fan located upstream of the engine core;
  a fan shaft;
  at least one bearing arranged to support the fan shaft;
  an oil loop system arranged to supply oil to the at least one bearing;
  a heat exchange system comprising:
    an air-oil heat exchanger through which the oil in the oil loop system flows;
    a fuel-oil heat exchanger through which the oil in the oil loop system and the fuel flow such that heat is transferred between the oil and the fuel; and
    at least one valve arranged to allow at least one of oil flow rate and air flow rate through at least one of the fuel-oil heat exchanger and the air-oil heat exchanger to be varied;
  a temperature sensor arranged to provide an indication of fuel temperature downstream of the fuel-oil heat exchanger (optionally on entry to the combustor); and
  a controller arranged to receive an output from the temperature sensor at cruise conditions, determine if the fuel temperature has increased above a set threshold based on that output, and in response to determining that the fuel temperature has increased above a set threshold at cruise conditions, control the at least one valve so as to change the at least one flow rate through the at least one heat exchanger.

For example, the at least one valve may be arranged to allow a proportion of the oil sent via the fuel-oil heat exchanger to be varied; and the controller may be arranged to:
  receive an output from the temperature sensor at cruise conditions;
  determine if the fuel temperature has increased above a set threshold based on that output; and
  in response to determining that the fuel temperature has increased above a set threshold at cruise conditions, control the at least one valve so as to send less oil through the fuel-oil heat exchanger.

The controller, or another processing module, may be arranged to determine the set threshold based on one or more fuel characteristics of the fuel.

The heat exchange system may comprise a refrigeration cycle apparatus arranged to provide thermal lift by transferring further heat from the oil to the fuel, beyond that transferred by the fuel-oil heat exchanger. Optionally, the refrigeration apparatus may allow the fuel temperature to be raised above the oil temperature. The controller may be arranged to deactivate the refrigeration cycle apparatus in response to determining that the fuel temperature has increased above a set threshold at cruise conditions.

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

The heat exchange system may further comprise branching fuel return pathways and at least one valve controlling a split of fuel flow, the branching pathways being arranged to return fuel from the heat exchange system to at least two different places along a main fuel path from where fuel enters the gas turbine engine to the combustor.

The core shaft may output drive to the fan directly, so as to drive the fan at the same rotational speed as the core shaft, such that the engine is a direct drive turbine engine.

The air-oil and fuel-oil heat exchangers may be arranged in series in the oil loop system.

The engine of the tenth aspect may be arranged to perform the method of the first, third, fifth, seventh and/or ninth aspect, and may have any of the features described with respect to any preceding aspect.

As noted elsewhere herein, the present disclosure may apply to any relevant configuration of gas turbine engine. Such a gas turbine engine may be, for example, a turbofan gas turbine engine, an open rotor gas turbine engine (in which the propeller is not surrounded by a nacelle), a turboprop engine or a turbojet engine. Any such engine may or may not be provided with an afterburner. Such a gas turbine engine may be, for example, configured for land or marine-based power generation applications.

A gas turbine engine in accordance with any aspect of the present disclosure may comprise an engine core comprising a turbine, a combustor, a compressor, and a core shaft connecting the turbine to the compressor. Such a gas turbine engine may comprise a fan (having fan blades). Such a fan may be located upstream of the engine core. Alternatively, in some examples, the gas turbine engine may comprise a fan located downstream of the engine core, for example where the gas turbine engine is an open rotor or a turboprop engine (in which case the fan may be referred to as a propeller).

Where the gas turbine engine is an open rotor or a turboprop engine, the gas turbine engine may comprise two contra-rotating propeller stages attached to and driven by a free power turbine via a shaft. The propellers may rotate in opposite senses so that one rotates clockwise and the other anti-clockwise around the engine's rotational axis. Alternatively, the gas turbine engine may comprise a propeller stage and a guide vane stage configured downstream of the propeller stage. The guide vane stage may be of variable pitch. Accordingly, high pressure, intermediate pressure, and free power turbines respectively may drive high and intermediate pressure compressors and propellers by suitable interconnecting shafts. Thus, the propellers may provide the majority of the propulsive thrust.

Where the gas turbine engine is an open rotor or a turboprop engine, one or more of the propellor stages may be driven by a gearbox. The gearbox may be of the type described herein.

An engine according to the present disclosure may be a turbofan engine. Such an engine may be a direct-drive turbofan engine in which the fan is directly connected to the fan-drive turbine, for example without a gearbox, via a core shaft. In such a direct-drive turbofan engine, the fan may be said to rotate at the same rotational speed as the fan-drive turbine. Purely by way of example, the fan-drive turbine may be a first turbine, the core shaft may be a first core shaft, and the gas turbine engine may further comprise a second turbine and a second core shaft connecting the second turbine to the compressor.

The second turbine, the compressor, and second core shaft may be arranged to rotate at a higher rotational speed than the first core shaft. In such an arrangement, the second turbine may be positioned axially upstream of the first turbine.

An engine according to the present disclosure may be a geared turbofan engine. In such an arrangement, the engine has a fan that is driven via a gearbox. Accordingly, such a gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. Such a gearbox may be a single stage. Alternatively, such a gearbox may be a compound gearbox, for example a compound planetary gearbox (which may have the input on the sun gear and the output on the ring gear, and thus be referred to as a "compound star" gearbox), for example having two stages of reduction.

The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a reduction ratio in the range of from 3.1 or 3.2 to 3.8. Purely by way of further example, the gearbox may be a "star" gearbox having a reduction ratio in the range 3.0 to 3.1. Purely by way of further example, the gearbox may be a "planetary" gearbox having a reduction ratio in the range 3.6 to 4.2. In some arrangements, the gear ratio may be outside these ranges.

In any gas turbine engine as described and/or claimed herein, fuel of a given composition or blend is provided to a combustor, which may be provided downstream of the fan and compressor(s) with respect to the flowpath (for example axially downstream). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other. For example, the gas turbine engine may be a direct-drive turbofan gas turbine engine comprising 13 or 14 compressor stages (in addition to the fan). Such an engine may, for example, comprise 3 stages in the first (or "low pressure") compressor and either 10 or 11 stages in the second (or "high pressure") compressor. By way of further example, the gas turbine engine may be a "geared" gas turbine engine (in which the fan is driven by a first core shaft via a reduction gearbox) comprising 11, 12 or 13 compressor stages (in addition to the fan). Such an engine may comprise 3 or 4 stages in the first (or "low pressure") compressor and 8 or 9 stages in the second (or "high pressure") compressor. By way of further example, the gas turbine engine may be a "geared" gas turbine engine having 4 stages in the first (or "low pressure") compressor and 10 stages in the second (or "high pressure") compressor.

The or each turbine (for example the first turbine and second turbine as described above) may comprise any number of stages, for example multiple stages. Each stage may comprise a row of rotor blades and a row of stator vanes, or vice versa, as required. The respective rows of rotor blades and stator vanes may be axially offset from each other. The second (or "high pressure") turbine may comprise 2 stages in any arrangement (for example regardless of whether it is a geared or direct-drive engine). The gas turbine engine may be a direct-drive gas turbine engine comprising a first (or "low pressure") turbine having 5, 6 or 7 stages. Alternatively, the gas turbine engine may be a "geared" gas turbine engine comprising a first (or "low pressure") turbine having 3 or 4 stages.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32 or 0.29 to 0.30. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 140 cm, 170 cm, 180 cm, 190 cm, 200 cm, 210 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches), 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 210 cm to 240 cm, or 250 cm to 280 cm, or 320 cm to 380 cm. Purely by way of non-limitative example, the fan diameter may be in the range of from 170 cm to 180 cm, 190 cm to 200 cm, 200 cm to 210 cm, 210 cm to 230 cm, 290 cm to 300 cm or 340 cm to 360 cm.

The rotational speed of the fan may vary in use. Generally, the rotational speed is lower for fans with a higher diameter. Purely by way of non-limitative example, the rotational speed of the fan at cruise conditions may be less than 3500 rpm, for example less than 2600 rpm, or less than 2500 rpm, or less than 2300 rpm. Purely by way of further non-limitative example, the rotational speed of the fan at cruise conditions for a "geared" gas turbine engine having a fan diameter in the range of from 200 cm to 210 cm may be in the range of from 2750 to 2900 rpm. Purely by way of further non-limitative example, the rotational speed of the fan at cruise conditions for a "geared" gas turbine engine having a fan diameter in the range of from 210 cm to 230 cm may be in the range of from 2500 to 2800 rpm. Purely by way of further non-limitative example, the rotational speed of the fan at cruise conditions for a "geared" gas turbine engine having a fan diameter in the range of from 340 cm to 360 cm may be in the range of from 1500 to 1800 rpm. Purely by way of further non-limitative example, the rotational speed of the fan at cruise conditions for a direct drive engine having a fan diameter in the range of from 190 cm to 200 cm may be in the range of from 3600 to 3900 rpm. Purely by way of further non-limitative example, the rotational speed of the fan at cruise conditions for a direct drive engine having a fan diameter in the range of from 300 cm to 340 cm may be in the range of from 2000 to 2800 rpm.

In use of the gas turbine engine, the fan (with associated fan blades) rotates about a rotational axis. This rotation results in the tip of the fan blade moving with a velocity Utip. The work done by the fan blades on the flow results in an enthalpy rise dH of the flow. A fan tip loading may be defined as dH/Utip2, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3 (for example for a geared gas turbine engine).

Gas turbine engines in accordance with the present disclosure may have any desired bypass ratio (BPR), where the bypass ratio is defined as the ratio of the mass flow rate of the flow through the bypass duct to the mass flow rate of the flow through the core. In some arrangements the bypass ratio at cruise conditions may be greater than (or on the order of) any of the following: 9. 9.5, 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio at cruise conditions may be in an inclusive range bounded by any two of the values in the previous sentence (i.e. the values may form upper or lower bounds), for example in the range of from 12 to 16, 13 to 15, or 13 to 14. Purely by way of non-limitative example, the bypass ratio at cruise conditions of a direct-drive gas turbine engine according to the present disclosure may be in the range of from 9:1 to 11:1. Purely by way of further non-limitative example, the bypass ratio at cruise conditions of a geared gas turbine engine according to the present disclosure may be in the range of from 12:1 to 15:1 The bypass duct may be at least substantially annular. The bypass duct may be radially outside the core engine. The radially outer surface of the bypass duct may be defined by a nacelle and/or a fan case.

The overall pressure ratio (OPR) of a gas turbine engine as described and/or claimed herein may be defined as the ratio of the stagnation pressure at the exit of the highest pressure compressor (before entry into the combustor) to the stagnation pressure upstream of the fan. By way of non-limitative example, the overall pressure ratio of a gas turbine engine as described and/or claimed herein at cruise conditions may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70. Purely by way of non-limitative example, the overall pressure ratio at cruise conditions of a geared gas turbine engine having a fan diameter in the range of from 200 cm to 210 cm may be in the range of from 40 to 45. Purely by way of non-limitative example, the overall pressure ratio at cruise conditions of a geared gas turbine engine having a fan diameter in the range of from 210 cm to 230 cm may be in the range of from 45 to 55. Purely by way of non-limitative example, the overall pressure ratio at cruise conditions of a geared gas turbine engine having a fan diameter in the range of from 340 cm to 360 cm may be in the range of from 50 to 60. Purely by way of non-limitative example, the overall pressure ratio at cruise conditions of a direct-drive gas turbine engine having a fan diameter in the range of from 300 cm to 340 cm may be in the range of from 50 to 60.

Specific thrust of an engine may be defined as the net thrust of the engine divided by the total mass flow through the engine. In some examples, specific thrust may depend, for a given thrust condition, upon the specific composition of fuel provided to the combustor. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines. Purely by way of non-limitative example, the specific thrust of a geared gas turbine engine having a fan diameter in the range of from 200 cm to 210 cm may be in the range of from 90 $Nkg^{-1}$ s to 95 $Nkg^{-1}$ s. Purely by way of non-limitative example, the specific thrust of a geared gas turbine engine having a fan diameter in the range of from 210 cm to 230 cm may be in the range of from 80 $Nkg^{-1}$ s to 90 $Nkg^{-1}$ s. Purely by way of non-limitative example, the specific thrust of a geared gas turbine engine having a fan diameter in the range of from 340 cm to 360 cm may be in the range of from 70 $Nkg^{-1}$ s to 90 $Nkg^{-1}$ s. Purely by way of non-limitative example, the specific thrust of a direct drive gas turbine engine having a fan diameter in the range of from 300 cm to 340 cm may be in the range of from 90 $Nkg^{-1}$ s to 120 $Nkg^{-1}$ s.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 100 kN, 110 kN, 120 KN, 130 kN, 135 kN, 140 kN, 145 kN, 150 KN, 155 kN, 160 KN, 170 KN, 180 KN, 190 KN, 200 kN, 250 kN, 300 KN, 350 KN, 400 KN, 450 kN, 500 kN, or 550 kN. The maximum thrust may be in an inclusive range bounded by any two of the values in the previous sentence (i.e. the values may form upper or lower bounds). Purely by way of non-limitative example, a gas turbine as described and/or claimed herein may be capable of producing a maximum thrust in the range of from 155 kN to 170 kN, 330 kN to 420 kN, or 350 kN to 400 kN. Purely by way of non-limitative example, the maximum thrust of a geared gas turbine engine having a fan diameter in the range of from 200 cm to 210 cm may be in the range of from 140 kN to 160 kN. Purely by way of non-limitative example, the maximum thrust of a geared gas turbine engine having a fan diameter in the range of from 210 cm to 230 cm may be in the range of from 150 kN to 200 kN. Purely by way of non-limitative example, the maximum thrust of a geared gas turbine engine having a fan diameter in the range of from 340 cm to 360 cm may be in the range of from 370 kN to 500 kN. Purely by way of non-limitative example, the maximum thrust of a direct drive gas turbine engine having a fan diameter in the range of from 300 cm to 340 cm may be in the range of from 370 kN to 500 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. In some examples, TET may depend, for a given thrust condition, upon the specific composition of fuel provided to the combustor. At cruise conditions, the TET may be at least (or on the order of) any of the following: 1400K, 1450K, 1500K, 1520K, 1530K, 1540K, 1550K, 1600K or 1650K. Thus, purely by way of non-limitative example, the TET at cruise conditions of a geared gas turbine engine having a fan diameter in the range of from 200 cm to 210 cm may be in the range of from 1540K to 1600K. Purely by way of non-limitative example, the TET at cruise conditions of a geared gas turbine engine having a fan diameter in the range of from 210 cm to 230 cm may be in the range of from 1590K to 1650K. Purely by way of non-limitative example, the TET at cruise conditions of a geared gas turbine engine having a fan diameter in the range of from 340 cm to 360 cm may be in the range of from 1600K to 1660K. Purely by way of non-limitative example, the TET at cruise conditions of a direct drive gas turbine engine having a fan diameter in the range of from 300 cm to 340 cm may be in the range of from 1590K to 1650K. Purely by way of non-limitative example, the TET at cruise conditions of a direct drive gas turbine engine having a fan diameter in the range of from 300 cm to 340 cm may be in the range of from 1570K to 1630K.

The TET at cruise conditions may be in an inclusive range bounded by any two of the values in the previous sentence (i.e. the values may form upper or lower bounds), for example 1530K to 1600K. The maximum TET in use of the engine may be, for example, at least (or on the order of) any of the following: 1700K, 1750K, 1800K, 1850K, 1900K, 1950K, 2000K, 2050K, or 2100K. Thus, purely by way of non-limitative example, the maximum TET of a geared gas turbine engine having a fan diameter in the range of from 200 cm to 210 cm may be in the range of from 1890K to 1960K. Purely by way of non-limitative example, the maximum TET of a geared gas turbine engine having a fan diameter in the range of from 210 cm to 230 cm may be in the range of from 1890K to 1960K. Purely by way of non-limitative example, the maximum TET of a geared gas turbine engine having a fan diameter in the range of from 340 cm to 360 cm may be in the range of from 1890K to 1960K. Purely by way of non-limitative example, the maximum TET of a direct drive gas turbine engine having a fan diameter in the range of from 300 cm to 340 cm may be in the range of from 1935K to 1995K. Purely by way of non-limitative example, the maximum TET of a direct drive gas turbine engine having a fan diameter in the range of from 300 cm to 340 cm may be in the range of from 1890K to 1950K. The maximum TET may be in an inclusive range bounded by any two of the values in the previous sentence (i.e. the values may form upper or lower bounds), for example in the range of from 1800K to 1950K, or 1900K to 2000K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre composite. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades. Where the fan blades have a carbon fibre composite body, there may be 16 or 18 fan blades. Where the fan blades have a metallic body (for example aluminium-lithium or titanium-alloy), there may be 18, 20 or 22 fan blades.

As used herein, the terms idle, taxi, take-off, climb, cruise, descent, approach, and landing (or one or more portions thereof) have the conventional meaning and would be readily understood by the skilled person. Thus, for a given gas turbine engine for an aircraft, the skilled person would immediately recognise each term to refer to the entirety, or one or more portions, of an operating phase of the engine within a given mission of an aircraft to which the gas turbine engine is designed to be attached.

In this regard, ground idle may refer to an operating phase of the engine where the aircraft is stationary and in contact with the ground, but where there is a requirement for the engine to be running. During idle, the engine may be producing between 3% and 9% of the available thrust of the engine. In further non-limitative examples, the engine may be producing between 5% and 8% of available thrust. In further non-limitative examples, the engine may be producing between 6% and 7% of available thrust. Taxi may refer to an operating phase of the engine where the aircraft is being propelled along the ground by the thrust produced by the engine. During taxi, the engine may be producing between 5% and 15% of available thrust. In further non-limitative examples, the engine may be producing between 6% and 12% of available thrust. In further non-limitative examples, the engine may be producing between 7% and 10% of available thrust. Take-off may refer to an operating phase of the engine where the aircraft is being propelled by the thrust produced by the engine. At an initial stage within the take-off phase, the aircraft may be propelled whilst the aircraft is in contact with the ground. At a later stage within the take-off phase, the aircraft may be propelled whilst the aircraft is not in contact with the ground. During take-off, the engine may be producing between 90% and 100% of available thrust. In further non-limitative examples, the engine may be producing between 95% and 100% of available thrust. In further non-limitative examples, the engine may be producing 100% of available thrust.

Climb may refer to an operating phase of the engine where the aircraft is being propelled by the thrust produced by the engine. During climb, the engine may be producing between 75% and 100% of available thrust. In further non-limitative examples, the engine may be producing between 80% and 95% of available thrust. In further non-limitative examples, the engine may be producing between 85% and 90% of available thrust. In this regard, climb may refer to an operating phase within an aircraft flight cycle between take-off and the arrival at cruise conditions, the arrival at cruise conditions thus defining the onset of the cruise phase, or a portion thereof, of the aircraft flight. Additionally or alternatively, climb may refer to a nominal point in, or one or more nominal periods during, an aircraft flight cycle between take-off and landing, where a relative increase in altitude is required, which may require an additional thrust demand of the engine.

As used herein, cruise conditions, which may define the cruise phase (or a portion thereof) of the aircraft flight, have the conventional meaning and would be readily understood by the skilled person. In some examples, for a given gas turbine engine for an aircraft, cruise conditions may refer to an the operating point of the engine at mid-cruise of a given mission (which may be referred to in the industry as the "economic mission") of an aircraft to which the gas turbine engine is designed to be attached. In this regard, mid-cruise may be regarded as the point in an aircraft flight cycle at which 50% of the total fuel that is burned between top of climb and start of descent has been burned (which may be approximated by the midpoint—in terms of time and/or distance-between top of climb and start of descent). Cruise conditions may thus define an operating point, phase, or portion thereof, of the flight that provides a thrust that would ensure steady state operation (i.e. maintaining a constant altitude and/or a constant Mach Number), or at least a substantially steady state operation (i.e. maintaining an at least substantially constant altitude and/or an at least substantially constant Mach Number) of an aircraft to which it is designed to be attached, taking into account the number of engines provided to that aircraft. For example, where an engine is designed to be attached to an aircraft that has two engines of the same type, at cruise conditions the engine may provide half of the total thrust that would be required for steady state operation, or at least a substantially steady state operation, of that aircraft at mid-cruise.

In other words, for a given gas turbine engine for an aircraft, cruise conditions may be defined as the operating point of the engine that provides a specified thrust (required to provide—in combination with any other engines on the aircraft—a steady state operation, or at least a substantially steady state operation, of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions may be clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to a forward Mach number of 0.8 and standard atmospheric conditions (according to the International Standard Atmosphere) at an altitude of 35000 ft (10668 m). At such cruise conditions, the engine may provide a known required net thrust level. The known required net thrust level is, of course, dependent on the engine and its intended application and may be, for example, a value in the range of from 20 kN to 40 kN.

Purely by way of further example, the cruise conditions may correspond to a forward Mach number of 0.85 and standard atmospheric conditions (according to the International Standard Atmosphere) at an altitude of 38000 ft (11582 m). At such cruise conditions, the engine may provide a known required net thrust level. The known required net thrust level is, of course, dependent on the engine and its intended application and may be, for example, a value in the range of from 35 kN to 65 kN.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

Furthermore, the skilled person would immediately recognise either or both of descent and approach to refer to an operating phase within an aircraft flight cycle between cruise and landing of the aircraft, with approach in particular forming part of the landing and take-off (LTO) phase. During either or both of descent and approach, the engine may be producing between 0% and 50% of available thrust. In further non-limitative examples, the engine may be producing between 25% and 40% of available thrust. In further non-limitative examples, the engine may be producing between 30% and 35% of available thrust. Additionally or alternatively, descent may refer to a nominal point in an aircraft flight cycle between take-off and landing, where a relative decrease in altitude is required, and which may require a reduced thrust demand of the engine.

According to an aspect, there is provided an aircraft comprising a gas turbine engine as described and/or claimed herein. The aircraft according to this aspect is the aircraft for which the gas turbine engine has been designed to be attached. Accordingly, cruise conditions according to this aspect may correspond to an operating point, phase, or portion thereof, of the aircraft flight, as defined elsewhere herein.

According to an aspect, there is provided a method of operating a gas turbine engine as described and/or claimed herein. The operation may be at any suitable condition, which may be as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at any suitable condition, for example the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter contained or described herein may be applied to any aspect and/or combined with any other feature or parameter contained or described herein.

Except where mutually exclusive, any parameter or value contained or described herein may be applied to and/or combined with any one or more further parameters and/or or values contained or described herein. For example, a first parameter or value contained or described herein (for example, parameter A) may be applied to and/or combined with any one or more further parameters and/or values contained or described herein (for example, any one or more of parameter B; parameter C; and parameter D, and so on) to express a product of their relationship. For example, the Skilled Person would understand that where parameter A is disclosed in separation to parameter B, a product of their relationship may be expressed as, for example, A/B, B/A, B*A, or any such further application, combination, or function of parameter A relative to parameter B, as required.

BRIEF DESCRIPTION OF THE DRAWINGS

Embodiments will now be described by way of example only, with reference to the Figures, in which.

DETAILED DESCRIPTION OF THE DISCLOSURE

Figure 1:
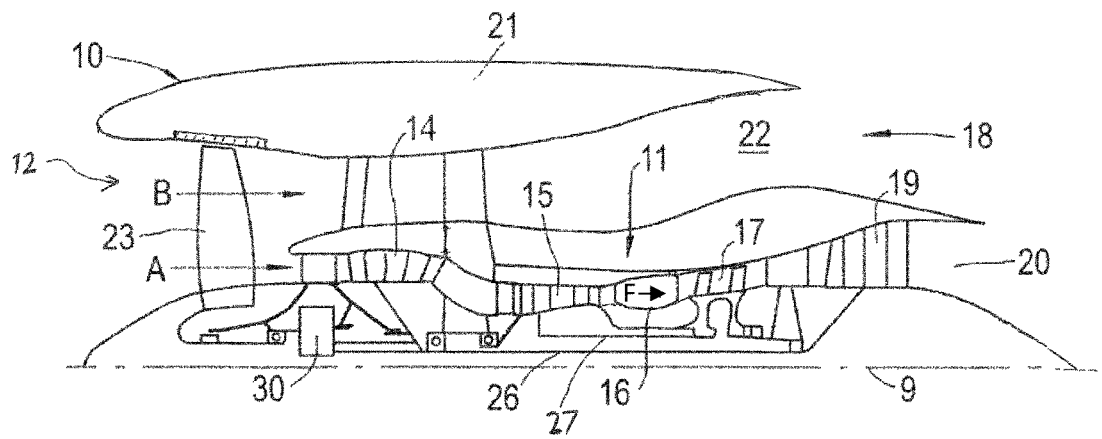
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally acts to impart increased pressure to the bypass airflow B flowing through the bypass duct 22, such that the bypass airflow B is exhausted through the bypass exhaust nozzle 18 to generally provide the majority of the propulsive thrust. The epicyclic gearbox 30 is a reduction gearbox.

Figure 2:
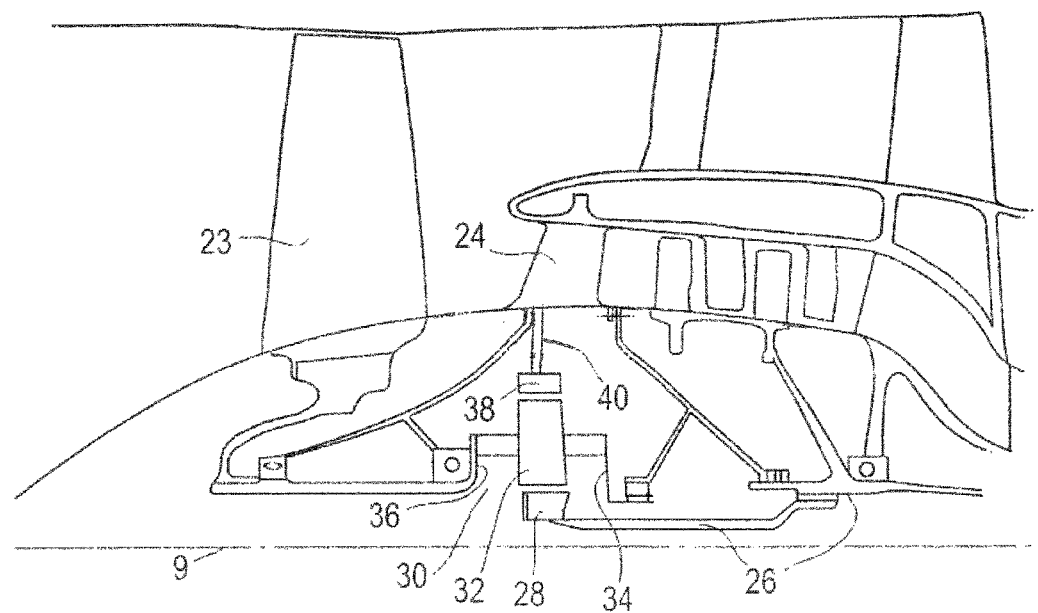
FIG. 2 is a close up sectional side view of an upstream portion of a geared gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
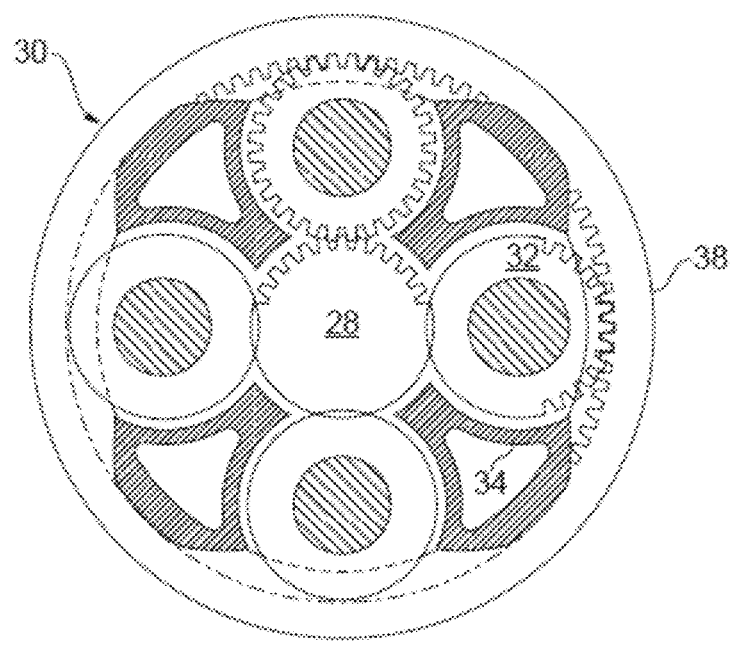
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

By way of further example, other gas turbine engines to which the present disclosure may be applied may have no gearbox for the main shaft(s), instead being direct drive engines. A cross-sectional view of one such engine is shown in FIG. 3B.

With reference to FIG. 3B, a gas turbine engine is generally indicated at 10, having a principal rotational axis 9. The engine 10 comprises, in axial flow series, an air intake 12, a propulsive fan 23, an intermediate pressure compressor 14, a high pressure compressor 15, combustion equipment 16, a high pressure turbine 17, an intermediate pressure turbine 19a, a low-pressure turbine 19 and an exhaust nozzle 20. A nacelle 21 surrounds the engine 10 and defines both the intake 12 and the exhaust nozzle 20.

In use, air entering the intake 12 is accelerated by the fan 23 to produce two air flows: a core airflow A and a bypass airflow B. The core airflow A flows into the intermediate pressure compressor 14, and the bypass air flow B passes through a bypass duct 22 to provide propulsive thrust. The intermediate pressure compressor 14 compresses the airflow A before delivering that air to the high pressure compressor 15 where further compression takes place.

The compressed air exhausted from the high-pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high, intermediate, and low-pressure turbines 17, 19a, 19 before being exhausted through the nozzle 20 to provide additional propulsive thrust. The high 17, intermediate 19a and low 19 pressure turbines drive respectively the high pressure compressor 15, intermediate pressure compressor 14 and fan 23, each by a suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The fuel F provided to the combustion equipment 16 may comprise a fossil-based hydrocarbon fuel, such as Kerosene. Thus, the fuel F may comprise molecules from one or more of the chemical families of n-alkanes, iso-alkanes, cycloalkanes, and aromatics. Additionally or alternatively, when blended with, mixed with, or replaced by an alternative fuel, the fuel F may comprise renewable hydrocarbons produced from biological or non-biological resources, otherwise known as sustainable aviation fuel (SAF). In each of the provided examples, the fuel F may comprise one or more trace elements including, for example, sulphur, nitrogen, oxygen, inorganics, and metals.

SAF is understood by the Skilled Person to refer to, for example, a biofuel, renewable aviation fuel, renewable jet fuel, alternative fuel or biojet fuel, produced from biological or non-biological resources. SAF is understood to be commonly synthesised from carbon-containing gasses drawn out of the atmosphere and/or captured from industrial processes; or from a wide range of sustainable feedstocks such as, for example, waste oil and fats; municipal solid waste; cellulosic waste (such as corn stalks); cover crops such as camelina, carinata, and pennycress; non-biogenic alternative fuels; jatropha; halophytes and algae, rather than from fossil-based hydrocarbons. SAF is understood as not encompassing fossil fuels.

Functional performance of a given fuel composition, or blend of fuel F for use in a given mission, may be defined, at least in part, by the ability of the fuel to service the Brayton cycle of the gas turbine engine 10. Parameters defining functional performance may include, for example, specific energy; energy density; thermal stability; and, emissions including gaseous and/or particulate matter. In this regard, particulate matter emissions may include soot particles created by the combustion of said fuel F, also known as non-volatile particulate matter (nvPM). Any reference herein to soot or smoke may apply equally to other types of particulate matter emissions known within the art. Gaseous emissions may include any one or more of nitrogen oxides (NOx); carbon monoxide (CO); carbon dioxide ($CO_2$); unburned hydrocarbons (UHC); sulphur oxides (SO) including, for example, sulphur dioxide ($SO_2$) and/or sulphur trioxide ($SO_3$); and, volatile organic compounds (VOC) created by the combustion of said fuel F. Any reference herein to gaseous emissions may apply equally to other types of gaseous emissions known within the art.

A relatively higher specific energy (i.e. energy per unit mass), expressed as MJ/kg, may at least partially reduce take-off weight, thus potentially providing a relative improvement in fuel efficiency. A relatively higher energy density (i.e. energy per unit volume), expressed as MJ/L, may at least partially reduce take-off fuel volume, which may be particularly important for volume-limited missions or military operations involving refuelling. A relatively higher thermal stability (i.e. inhibition of fuel to degrade or coke under thermal stress) may permit the fuel to sustain elevated temperatures in the engine and fuel injectors, thus potentially providing relative improvements in combustion efficiency. Reduced emissions, including particulate matter, may permit reduced contrail formation, whilst reducing the environmental impact of a given mission. Other properties of the fuel may also be key to functional performance. For example, a relatively lower freeze point (° C.) may allow long-range missions to optimise flight profiles; minimum aromatic concentrations (%) may ensure sufficient swelling of certain materials used in the construction of o-rings and seals that have been previously exposed to fuels with high aromatic contents; and, a maximum surface tension (mN/m) may ensure sufficient spray break-up and atomisation of the fuel.

The ratio of the number of hydrogen atoms to the number of carbon atoms in a molecule may influence the specific energy of a given composition, or blend of fuel. Fuels with higher ratios of hydrogen atoms to carbon atoms may have higher specific energies in the absence of bond strain. For example, fossil-based hydrocarbon fuels may comprise molecules with approximately 7 to 18 carbons, with a significant portion of a given composition stemming from molecules with 9 to 15 carbons, with an average of 12 carbons.

A number of sustainable aviation fuel blends have been approved for use. For example, some approved blends comprise blend ratios of up to 10% sustainable aviation fuel, whilst other approved blends comprise blend ratios of between 10% and 50% sustainable aviation fuel (the remainder comprising one or more fossil-based hydrocarbon fuels, such as Kerosene), with further compositions awaiting approval. However, there is an anticipation in the aviation industry that sustainable aviation fuel blends comprising up to (and including) 100% sustainable aviation fuel (SAF) will be eventually approved for use.

Sustainable aviation fuels may comprise one or more of n-alkanes, iso-alkanes, cyclo-alkanes, and aromatics, and may be produced, for example, from one or more of synthesis gas (syngas); lipids (e.g. fats, oils, and greases); sugars; and alcohols. Thus, sustainable aviation fuels may comprise either or both of a lower aromatic and sulphur content, relative to fossil-based hydrocarbon fuels. Additionally or alternatively, sustainable aviation fuels may comprise either or both of a higher iso-alkane and cyclo-alkane content, relative to fossil-based hydrocarbon fuels. In some examples, sustainable aviation fuels may comprise either or both of a density of between 90% and 98% that of kerosene and a calorific value of between 101% and 105% that of kerosene.

In some examples, the sustainable aviation fuel(s), or blend(s) provided to the combustion equipment 16 may be relatively lower in aromatic and/or other non-paraffinic content than that of kerosene. The sustainable aviation fuel may comprise an aromatic content of e.g. 30%, 20%, 15%, 10%, 8%, 5%, or less than 5%; e.g. 4%, 3%, 2%, 1%, or less than 1%; e.g. 0.75%, 0.5%, 0.25%, or less than 0.25%; e.g. 0.2%, 0.1%, or less than 0.1%; e.g. 0.01%, 0.001%, or 0%. The aromatic content of the sustainable aviation fuel may be in an inclusive figure or range bounded by or within any two of the values in the previous sentence (i.e. the values may form upper or lower bounds), e.g. 13.5%, 8.5%, 2.5%, 0.35%, 0.15%, 0.05%, 0.005%, or 0%; or 0% to 0.75%, 0% to 0.5%, or 0.1% to 0.25%; or 0.15% to 0.65%, 0.35% to 0.55%, or 0.035% to 0.055%; according to one or more of preference, fuel stock or supplier, and compositional variation therein.

Owing at least in part to the molecular structure of sustainable aviation fuels, sustainable aviation fuels may provide benefits including, for example, one or more of a higher specific energy (despite, in some examples, a lower energy density); higher specific heat capacity; higher thermal stability; higher lubricity; lower viscosity; lower surface tension; lower freeze point; lower soot emissions; lower NOx; and, lower $CO_2$ emissions, relative to fossil-based hydrocarbon fuels (e.g. when combusted in the combustion equipment 16). Accordingly, relative to fossil-based hydrocarbon fuels, such as Kerosene, sustainable aviation fuels may lead to either or both of a relative decrease in specific fuel consumption, and a relative decrease in maintenance costs.

Figure 5:
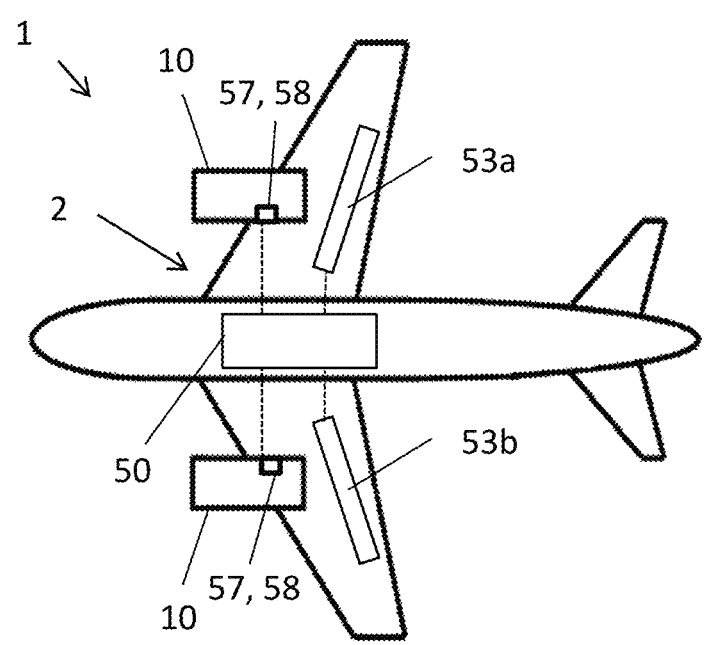
FIG. 5 is a representation of an aircraft with a propulsion system including two gas turbine engines.

As depicted in FIG. 5, an aircraft 1 may comprise multiple fuel tanks 50, 53; for example a larger, primary fuel tank 50 located in the aircraft fuselage, and a smaller fuel tank 53a, 53b located in each wing. In other examples, an aircraft 1 may have only a single fuel tank 50, and/or the wing fuel tanks 53 may be larger than the central fuel tank 50, or no central fuel tank may be provided (with all fuel instead being stored in the aircraft's wings)—it will be appreciated that many different tank layouts are envisaged and that the examples pictured are provided for ease of description and not intended to be limiting.

FIG. 5 shows an aircraft 1 with a propulsion system 2 comprising two gas turbine engines 10. The gas turbine engines 10 are supplied with fuel from a fuel supply system onboard the aircraft 1. The fuel supply system of the example pictured comprises a single fuel source. For the purposes of the present application the term "fuel source" means either 1) a single fuel tank or 2) a plurality of fuel tanks which are fluidly interconnected. Each fuel source is arranged to provide a separate source of fuel i.e. a first fuel source may contain a first fuel having a different characteristic or characteristics from a second fuel contained in a second fuel source. First and second fuel sources are therefore not fluidly coupled to each other so as to separate the different fuels (at least under normal running conditions). The use of multiple fuel sources allows an aircraft 1 to carry multiple different fuels, and to change which fuel is being used during operation, and optionally even whilst at cruise or when changing between different stages of operation in flight.

In the present example, the first (and, in these examples, only) fuel source comprises a centre fuel tank 50, located primarily in the fuselage of the aircraft 1 and a plurality of wing fuel tanks 53a, 53b, where at least one wing fuel tank is located in the port wing and at least one wing fuel tank is located in the starboard wing for balancing. All of the tanks 50, 53 are fluidly interconnected in the example shown, so forming a single fuel source. Each of the centre fuel tank 50 and the wing fuel tanks 53 may comprise a plurality of fluidly interconnected fuel tanks.

In another example, the wing fuel tanks 53a, 53b may not be fluidly connected to the central tank 50, so forming a separate, second fuel source. For balancing purposes, one or more fuel tanks in the port wing may be fluidly connected to one or more fuel tanks in the starboard wing. This may be done either via a centre fuel tank (if that tank does not form part of the other fuel source), or bypassing the centre fuel tank(s), or both (for maximum flexibility and safety). In another example, the first fuel source comprises wing fuel tanks 53 and a centre fuel tank 50, while a second fuel source comprises a further separate centre fuel tank. Fluid interconnection between wing fuel tanks and the centre fuel tank of the first fuel source may be provided for balancing of the aircraft 1. In aircraft 1 with multiple fuel sources, two or more of the fuel sources may therefore contain different fuels from each other, such that the aircraft 1 can change fuel in flight. Being able to determine which fuel is being provided to the combustor 16 may therefore be more complex than simply recording a single identity of a fuel onboard the aircraft 1, or checking once at start-up.

In some examples, the allocation of fuel tanks 50, 53 available on the aircraft 1 may be constrained such that the first fuel source and the second fuel source are each substantially symmetrical with respect to the aircraft centre line. In cases where an asymmetric fuel tank allocation is permitted, a suitable means of fuel transfer is generally provided between fuel tanks of the first fuel source and/or between fuel tanks of the second fuel source such that the position of the aircraft's centre of mass can be maintained within acceptable lateral limits throughout the flight.

Aircraft generally refuel at multiple different airports, for example at the beginning and end of a long-distance flight. Whilst there are standards with which all aviation fuels must be compliant, as mentioned above, different aviation fuels have different compositions, for example depending on their source (e.g. different petroleum sources, biofuels or other synthetic aviation fuels (often described as sustainable aviation fuels-SAFs), and/or mixtures of petroleum-based fuels, and other fuels) and on any additives included (e.g. such as antioxidants and metal deactivators, biocides, static reducers, icing inhibitors, corrosion inhibitors) and any impurities. As well as varying between airports and fuel suppliers, fuel composition of the available aviation fuel may vary between batches even for a given airport or fuel supplier. Further, fuel tanks 50, 53 of aircraft 1 are usually not emptied before being topped up for a subsequent flight, resulting in mixtures of different fuels within the tanks-effectively a fuel with a different composition resulting from the mixture.

The inventors appreciated that, as different fuels can have different properties, whilst still conforming to the standards, knowledge of the fuel(s) available to an aircraft 1 can allow more efficient, tailored, control of the aircraft 1, and more specifically of the aircraft's propulsion system 2 (i.e. the one or more gas turbine engines 10 of the aircraft 1, and associated controls and components). Knowledge of the fuel can therefore be used as a tool to improve aircraft performance, so determining or monitoring fuel composition can provide benefits. In particular, determining one or more fuel characteristics of the fuel to be supplied to the combustor 16—be that a fuel from a single fuel source, or a mixture of one or more fuels from different fuel sources, is therefore important in determining engine operation. A key feature of engine operation is heat management-engine heat management is primarily performed using heat transfer to and from oil and fuel in the engine, so control of a heat exchange system 3000—for example by controlling oil flow, controlling fuel flow, and/or controlling one or more heat exchangers 1004, 1006, 2020, 2030 or other heat exchange components in other ways—may allow the performance of the engine 10 to be optimised for a fuel with particular fuel characteristics.

As used herein, the term "fuel characteristics" refers to intrinsic or inherent fuel properties such as fuel composition, not variable properties such as volume or temperature. One or more fuel characteristics may be determined, and that data used in adjusting control of the engine 10, and in particular of the heat exchange system 3000. Examples of fuel characteristics include one or more of:

i. the percentage of sustainable aviation fuel (SAF) in the fuel, or an indication that the fuel is a fossil fuel, for example fossil kerosene, or that the fuel is a pure SAF fuel;

ii. parameters of a hydrocarbon distribution of the fuel, such as:
   the aromatic hydrocarbon content of the fuel, and optionally also/alternatively the multi-aromatic hydrocarbon content of the fuel;
   the hydrogen to carbon ratio (H/C) of the fuel;
   % composition information for some or all hydrocarbons present;

iii. the presence or percentage of a particular element or species, such as:
   the percentage of nitrogen-containing species in the fuel;
   the presence or percentage of a tracer species or trace element in the fuel;
   naphthalene content of the fuel;
   sulphur content of the fuel;
   cycloparaffin content of the fuel;
   oxygen content of the fuel;

iv. one or more properties of the fuel in use in a gas turbine engine 10, such as:
   level of non-volatile particulate matter (nvPM) emissions or $CO_2$ emissions on combustion;
   level of coking of the fuel;

v. one or more properties of the fuel itself, independent of use in an engine 10 or combustion, such as:
   thermal stability of the fuel (e.g. thermal breakdown temperature; thermal stability may be assigned a numerical value at any temperature by taking the inverse of a fuel breakdown product deposition rate at the given temperature); and
   one or more physical properties such as density, viscosity, calorific value, freeze temperature, and/or heat capacity.

The fuel characteristic(s) to be determined may be selected based on which properties of the fuel are most relevant to changes which may be made to the heat exchange system 3000. The determination of fuel characteristics may include obtaining fuel characteristics of any fuel already present in the fuel tank 50, 53 prior to refuelling and an indication of the amount of fuel remaining, and then combining that information with information regarding a new fuel added to the tank 50, 53 on refuelling.

The obtaining fuel characteristics of any fuel already present in the fuel tank 50, 53 prior to refuelling, and/or obtaining fuel characteristics of a fuel provided on refuelling, may comprise one or more of:

(i) physically and/or chemically detecting one or more features or parameters of the composition of the fuel (this may allow direct detection of the fuel characteristics, and/or may allow the fuel characteristics to be determined using the detection results), and/or detecting one or more tracer elements or compounds added to the fuel to facilitate its identification (e.g. a dye);

(ii) retrieving fuel characteristic information from an onboard memory/data store; and/or (iii) receiving data, for example from an input provided at a user interface, or data transmitted to the aircraft 1.

In some examples, one or more fuel characteristics may be determined in operation of the gas turbine engine 10, for example by inferring fuel characteristics of fuel provided to the combustor 16 in operation from engine performance metrics, or by performing on-wing detection.

In some examples, multiple different methods may be performed to obtain the fuel characteristics—for example, different methods may be used for different characteristics, and/or different methods may be used for the same characteristic as a check. For example, stored or otherwise provided fuel characteristic data may be compared against the results of chemically or physically detecting one or more parameters of the fuel. If there is a mis-match between the stored fuel characteristic and the corresponding detected parameter, an alert may be provided.

Fuel characteristics may be determined by physically and/or chemically detecting one or more features of the composition of the fuel (e.g. in a testing unit off-wing, or as the fuel is transported to a fuel tank on-wing, or indeed in use in the gas turbine engine 10), so allowing direct detection of the fuel characteristics or providing data from which they can be determined, as mentioned above, and/or detecting one or more tracer elements or compounds added to the fuel to facilitate its identification (e.g. a dye); or by receiving data, for example from an input provided at a user interface, or data transmitted to the aircraft, e.g. by scanning a barcode associated with the fuel delivery.

When physical and/or chemical determination is used, fuel characteristics may be detected in various ways, both direct (e.g. from sensor data corresponding to the fuel characteristic in question) and indirect (e.g. by inference or calculation from other characteristics or measurements, or by reference to data for a specific detected tracer in the fuel). The characteristics may be determined as relative values as compared to another fuel, or as absolute values. For example, one or more of the following detection methods may be used:

The aromatic or cycloparaffin content of the fuel can be determined based on measurements of the swell of a sensor component made from a seal material such as a nitrile seal material.

Trace substances or species, either present naturally in the fuel or added to act as a tracer, may be used to determine fuel characteristics such as the percentage of sustainable aviation fuel in the fuel or whether the fuel is kerosene.

Measurements of the vibrational mode of a piezoelectric crystal exposed to the fuel can be used as the basis for the determination of various fuel characteristics including the aromatic content of the fuel, the oxygen content of the fuel, and the thermal stability or the coking level of the fuel—for example by measuring the build-up of surface deposits on the piezoelectric crystal which will result in a change in vibrational mode.

Various fuel characteristics may be determined by collecting performance parameters of the gas turbine engine 10 during a first period of operation (such as during take-off), and optionally also during a second period of operation (e.g. during cruise), and comparing these collected parameters to expected values if using fuel of known properties.

Various fuel characteristics including the aromatic hydrocarbon content of the fuel can be determined based on sensor measurements of the presence, absence, or degree of formation of a contrail by the gas turbine 10 during its operation.

Fuel characteristics including the aromatic hydrocarbon content can be determined based on a UV-Vis spectroscopy measurement performed on the fuel.

Various fuel characteristics including the sulphur content, naphthalene content, aromatic hydrogen content and hydrogen to carbon ratio may be determined by measurement of substances present in the exhaust gases emitted by the gas turbine engine 10 during its use.

Calorific value of the fuel may be determined in operation of the aircraft 1 based on measurements taken as the fuel is being burned—for example using fuel flow rate and shaft speed or change in temperature across the combustor 16.

Various fuel characteristics may be determined by making an operational change arranged to affect operation of the gas turbine engine 10, sensing a response to the operational change; and determining the one or more fuel characteristics of the fuel based on the response to the operational change.

Various fuel characteristics may be determined in relation to fuel characteristics of a first fuel by changing a fuel supplied to the gas turbine engine 10 from the first fuel to a second fuel, and determining the one or more fuel characteristics of the second fuel based on a change in a relationship between T30 and one of T40 and T41 (the relationship being indicative of the temperature rise across the combustor 16). The characteristics may be determined as relative values as compared to the first fuel, or as absolute values, e.g. by reference to known values for the first fuel.

As used herein, T30, T40 and T41, and any other numbered pressures and temperatures, are defined using the station numbering listed in standard SAE AS755, in particular:

T30=High Pressure Compressor (HPC) Outlet Total Temperature;
T40=Combustion Exit Total Temperature;
T41=High Pressure Turbine (HPT) Rotor Entry Total Temperature.

Any suitable approach known in the art may be used, and fuel characteristic determination will not be discussed further herein.

Figure 4:
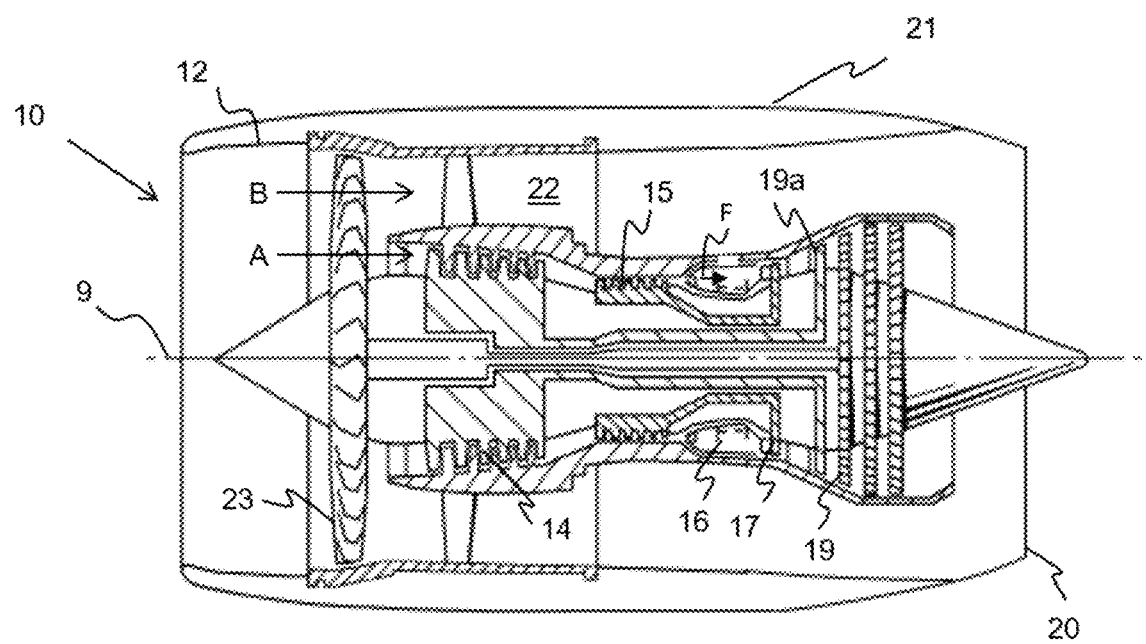
FIG. 4 is a close up sectional side view of an upstream portion of a direct drive gas turbine engine.

The aircraft 1 may therefore comprise a fuel composition determination module 57 arranged to determine at least one fuel characteristic of the fuel. The determination may be performed by obtaining a value from a data store (e.g. from data provided to the aircraft 1 on refuelling), or by performing one or more calculations based on data provided by one or more sensors or other engine components, using any of the methods described above. In the example shown in FIG. 4, one fuel composition determination module 57 is provided as part of each engine 10, where the fuel enters the engine 10. In other implementations, the module 57 may be differently-located within the engine 10, or located elsewhere on the aircraft 1, e.g. in, on, or adjacent to a fuel tank 50, 53. In implementations with a fuel composition determination module 57, the module 57 may be arranged to provide an output to an Electronic Engine Controller (EEC), or the module 57 may be provided as part of an EEC. The one or more fuel characteristics determined by the fuel composition determination module 57 may therefore be used to influence control of the engine 10. A dedicated controller 58 may be provided to process output of the a fuel composition determination module 57 and provide control instructions to controllable engine components based on the fuel characteristic information. In other implementations, the control functionality 58 may be provided by the EEC and no separate unit or module may be provided.

Figure 6:
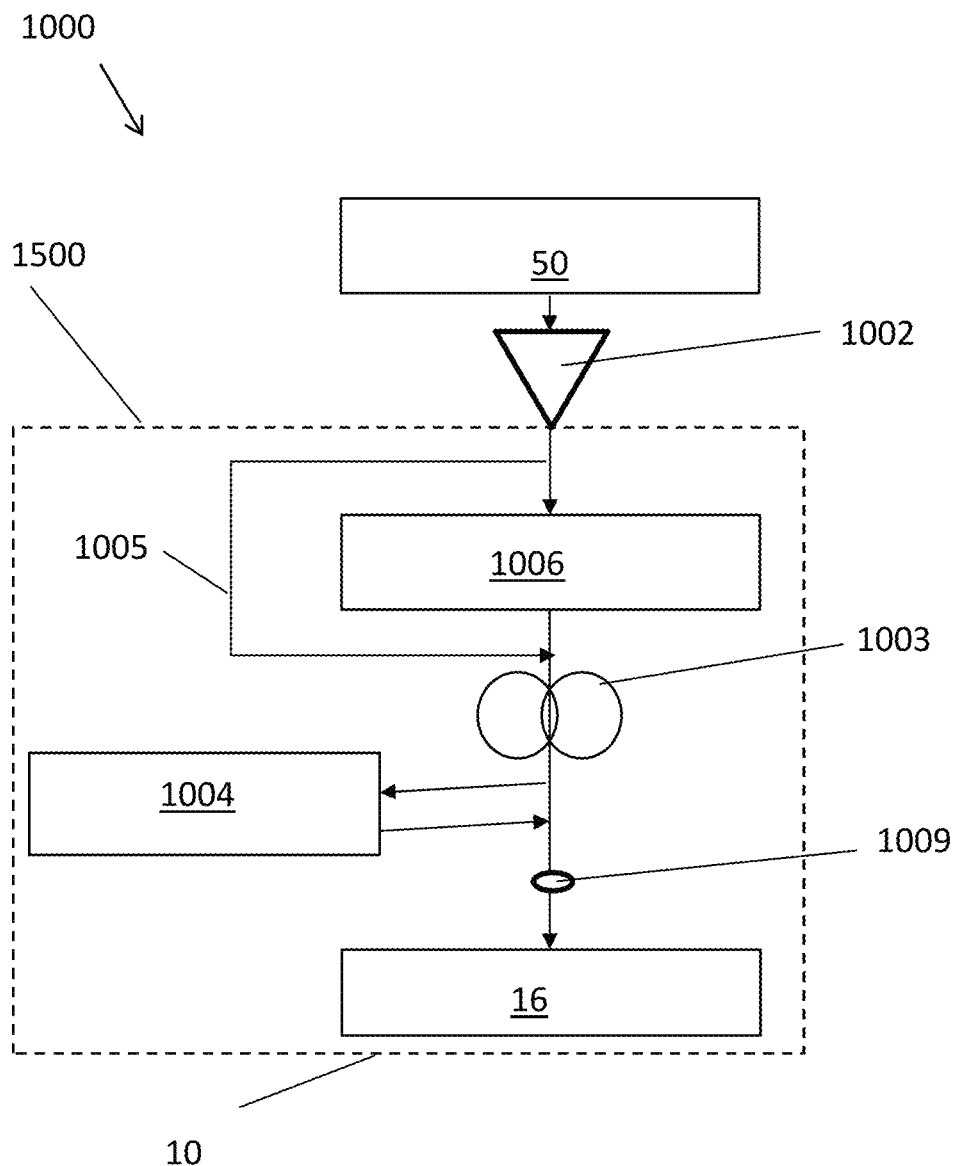
FIG. 6 is a schematic representation of an example fuel system.

An example fuel system 1000 for a direct drive gas turbine engine 10, the fuel system 1000 comprising a fuel flow path from the fuel tank 50 to the combustor 16 of the gas turbine engine 10 of the aircraft 1, is shown schematically in FIG. 6. Fuel system 1000 comprises both the fuel supply system 50, 1002 (which supplies fuel to the engine 10) and the fuel management system 1500 (which operates within the engine 10) of the aircraft 1. The fuel management system 1500 has a role in managing fuel temperature as well as fuel flow, directing the fuel via one or more heat exchangers 1004, 1006 of the engine's heat exchange system 3000. The heat exchange system 3000 comprises parts of the fuel management system 1500, and also the recirculating oil system 2000 (which is described in more detail below). The heat exchange system 3000 is the general term used for the systems and components used to transfer heat between fluids (in particular, oil and fuel) within the engine 10, and comprises heat exchangers, valves, connecting pipework, and associated components, e.g. pumps, refrigeration apparatus, etc. . . .

Returning to the fuel system 1000, fuel is pumped from the fuel tank 50 to the gas turbine engine 10 by a low pressure fuel supply pump 1002. The fuel then flows through a primary fuel-oil heat exchanger 1006 and a secondary fuel-oil heat exchanger 1004. The primary fuel-oil heat exchanger 1006 may be described as a main fuel-oil heat exchanger as the fuel flowing therethrough may be the main fuel flow path from the fuel tank 50 to the combustor 16. The secondary fuel-oil heat exchanger 1004 may be described as an auxiliary fuel-oil heat exchanger, or a servo fuel-oil heat-exchanger because the fuel flowing therethrough may be supplied to the auxiliary systems or servo mechanisms 33 of the aircraft 1. Such auxiliary systems/servo mechanisms may include, but are not limited to, fueldraulic actuation; heating; a nacelle anti-icing system; engine actuators; and/or a Turbine Case Cooling (TCC) servo valve. Only fuel which has passed through the secondary fuel-oil heat exchanger may be used in these auxiliary systems. The fuel used in these auxiliary systems may be returned to a fuel tank for later re-circulation, or may be recombined with other fuel leaving the main fuel-oil heat exchanger 1006 and enter the combustor. The fuel which passes through the secondary fuel-oil heat exchanger 1004 therefore may not be provided to the combustor in some implementations, but instead returned to an aircraft fuel tank 50, optionally after use in auxiliary systems such as fueldraulic actuators. The fuel which passes through the secondary fuel-oil heat exchanger 1004 may instead be returned along the main fuel flow path between the fuel tank 50 and the engine fuel pump 1003. More or fewer fuel-oil heat exchangers may be provided in other implementations. The fuel management system 1500 pictured is arranged so that the fuel reaches the primary fuel-oil heat exchanger 1006 before the secondary fuel-oil heat exchanger 1004. After leaving the primary fuel-oil heat exchanger 1006, the fuel then passes through an engine fuel pump 1003, and travels on to the combustor 16. The engine fuel pump 1003 may be described as a main fuel pump, and in fuel management system 1500 is position upstream of the secondary fuel-oil heat exchanger 1004.

The primary fuel-oil heat exchanger 1006 and the secondary fuel-oil heat exchanger 1004 are configured such that a flow of oil is conveyed through each in addition to the flow of fuel therethrough. The primary fuel-oil heat exchanger 1006 and secondary fuel-oil heat exchanger 1004 are configured such that heat may be transferred between the oil and the fuel flowing therethrough. In standard operation of the engine 10, for example at cruise conditions, the average temperature of the flow of oil entering the primary fuel-oil heat exchanger 1006 is higher than the average temperature of the fuel entering the primary fuel-oil heat exchanger 1006, and the average temperature of the flow of oil entering the secondary fuel-oil heat exchanger 1004 is higher than the average temperature of the fuel entering the secondary fuel-oil heat exchanger 1004. In this way, the primary fuel-oil heat exchanger 1006 and the secondary fuel-oil heat exchanger 1004 are each configured to transfer thermal energy from a flow of oil to a flow of fuel flowing therethrough in operation.

In general, at least the majority of the fuel passes through the primary fuel-oil heat exchanger 1006, and at least a portion of the fuel that passes through the primary fuel-oil heat exchanger 1006 also passes through the secondary fuel-oil heat exchanger 1004. The two heat exchangers 1004, 1006 may therefore be described as being in series with each other, with respect to fuel flow, and as being along a main fuel flow path from the tank 50 to the combustor 16. However, either, or each, heat exchanger 1004, 1006 may be provided with a bypass to allow some of the fuel to avoid passing through the respective heat exchanger, for example in the form of a fuel bypass pipe 1005 as shown in FIG. 6. A valve (not shown) may determine what proportion of the fuel passes through the heat exchanger 1004 and what proportion through the bypass pipe 1005. In various implementations, a bypass pipe may be provided for each heat exchanger 1004, 1006, allowing a portion of the fuel to avoid either or both heat exchangers. Additionally or alternatively, one or more bypass pipes 2005, 2005a may be provided for the oil for either or both fuel-oil heat exchangers 1004, 1006, allowing a portion of the oil to avoid one or more heat exchangers. A valve arranged to control the flow of a fluid through a bypass pipe 1005 may be referred to as a bypass valve.

The secondary fuel-oil heat exchanger 1004 and the main fuel-oil heat exchanger 1006 are therefore configured such that a flow of oil is conveyed through each in addition to the flow of fuel—the same oil is flowing through one and then the other in the implementation being described, although it will be appreciated that the different oil loop systems may supply each heat exchanger in other implementations, and so different oil may flow through one fuel-oil heat exchanger to the other fuel-oil heat exchanger.

In the example shown in FIG. 6, the fuel system 1000 further comprises a temperature sensor 1009 arranged to sense the temperature of the fuel approaching or reaching the combustor 16. The temperature sensor 1009 is shown adjacent to an inlet of the combustor 16 in the example pictured, but in various examples the sensor 1009 can be located anywhere downstream of the primary fuel-oil heat exchanger 1006 or the secondary fuel-oil heat exchanger on the fuel side, so as to provide a measure of fuel temperature at different points along the flow path. In gas turbine engines 10 such as that described herein, the fuel passes through fuel spray nozzles before entering the combustion chamber itself—these nozzles can be very susceptible to fuel thermal breakdown leading to blockages in the relatively narrow passages (e.g. metering slots); placing the sensor 1009 as close as reasonably possible to the inlet to the nozzles is therefore advised in some implementations. Multiple temperature sensors 1009 may be used in some implementations. The one or more temperature sensors 1009 are arranged to provide an output (temperature data) to a controller 58.

Figure 7A:
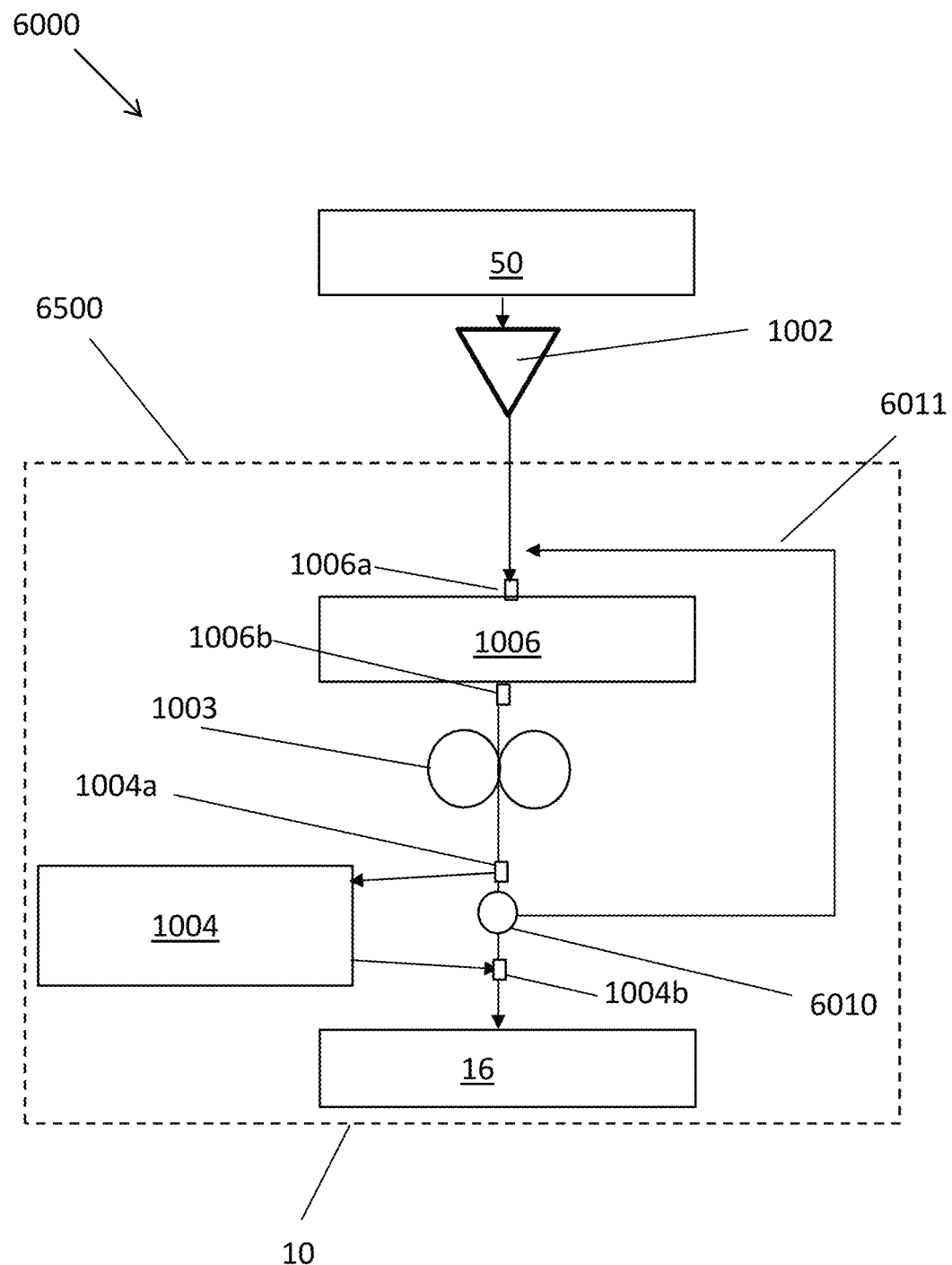
FIG. 7A is a schematic representation of an alternative example fuel system comprising a recirculation loop.

FIG. 7A shows an alternative example fuel system 6000, comprising a fuel supply system and fuel management system 6500 comprising a fuel flow path from the fuel tank 50 to the combustor 16 of the gas turbine engine 10 of the aircraft 1. As with fuel system 1000, fuel is pumped from the fuel tank 50 by the low pressure fuel supply pump 1002. The fuel then flows through a primary fuel-oil heat exchanger 1006 before reaching an engine fuel pump 1003, which pumps the fuel along its flow path to the combustor 16, optionally via a secondary fuel-oil heat exchanger 1004. Control of the flow of fuel through the secondary fuel-oil heat exchanger 1004 may be controlled with valve 1004a. Fuel system 6000 differs from fuel system 1000 in that fuel system 6000 comprises a recirculation valve 6010 located downstream of the primary fuel-oil heat exchanger 1006 and arranged to recirculate at least a portion of the fuel which has left the primary fuel-oil heat exchanger back to the inlet 1006a of the primary fuel-oil heat exchanger 1006, allowing further heat transfer between the oil of the primary loop system and the fuel. The recirculation valve 6010 may determine what proportion of the fuel is recirculated, via the recirculation pipe 6011, and what proportion continues more directly to the combustor 16. In the illustrated example, the recirculation valve 6010 is located downstream of the primary fuel-oil heat exchanger 1006. In the illustrated example, the recirculation valve 6010 is positioned downstream of the engine fuel pump 1003. An additional recirculation pump (not shown) may be provided in some implementations in which the recirculation valve 6010 is positioned upstream of the engine fuel pump 1003, to provide a positive pressure gradient. A fuel return to tank (FRTT) line may be present and also assist in the recirculation in some implementations. The recirculation valve 6010 is arranged to allow a controlled amount of fuel to be returned to the inlet 1006a of the primary heat exchanger 1006, so flowing through the primary heat exchanger 1006 multiple times before reaching the combustor 16. It is envisaged that the recirculation valve could be positioned upstream of the engine fuel pump 1003 in alternative implementations. In such implementations, the recirculation valve 6010 would be arranged to allow a controlled amount of fuel to be returned to the inlet 1006a of the primary heat exchanger 1006, so flowing through the primary heat exchanger 1006 and multiple times before reaching the pump 1003. This recirculation provides a mechanism for controlling the fuel flow within the fuel management system 6500, and also within the heat exchange system 3000, without changing fuel flow from the tank 50 to the engine 10. The recirculation may be used to control the heat transfer ratio.

A pipe 6011, which may be referred to as a recirculation pipe as it transports fuel from one point along the main flow-path through the engine 10 to an earlier point along that flow-path so the fuel has to pass through the portion of the flow-path in between again, may therefore be provided, leading from the recirculation valve to a point on the flow-path upstream of the inlet 1006a to the primary heat exchanger 1006. In some implementations, a recirculation pipe 6011 and a bypass pipe 1005 may be provided for any given heat exchanger 1004, 1006. In some implementations, the same pipe 1005, 6011 may serve as both a recirculation pipe and a bypass pipe-one or more valves may be used to control the direction of fluid flow therethrough.

Controlling the fuel flow in the fuel system 6000—by recirculation through and/or bypassing of one or more heat exchangers—can assist in heat management (such as influencing fuel temperature on entry to the combustor 16 or pump 1003, or amount of heat transferred to the fuel). Part of control of the heat exchange system 3000 may therefore be control of one or more valves controlling oil and/or fuel flow through one or more recirculation and/or bypass pipes 6011, 1005.

Control of fuel flow through the recirculation pipe 6011 pathways may be based on fuel temperature measurement (e.g. using a temperature sensor at a location downstream of the primary fuel-oil heat exchanger 1006, potentially also using a temperature measurement upstream of the primary fuel-oil heat exchanger 1006). A return of the recirculated fuel upstream of the primary fuel-oil heat exchanger 1006 may allow for a reduced heat transfer from the oil to fuel hence damping a transient overshoot that might otherwise occur at the beginning of the descent phase, for example, where for the same amount of heat is generated within the oil system, but fuel flow is reduced, so typically resulting in a temperature spike. The adjustment of fuel flow through recirculation pipe 6011, for example, can also be useful to reduce icing, by circulating fuel that has been previously heated to warm the system. The recirculation pipe 6011 may therefore be used in multiple ways to improve engine thermal management.

Figure 7B:
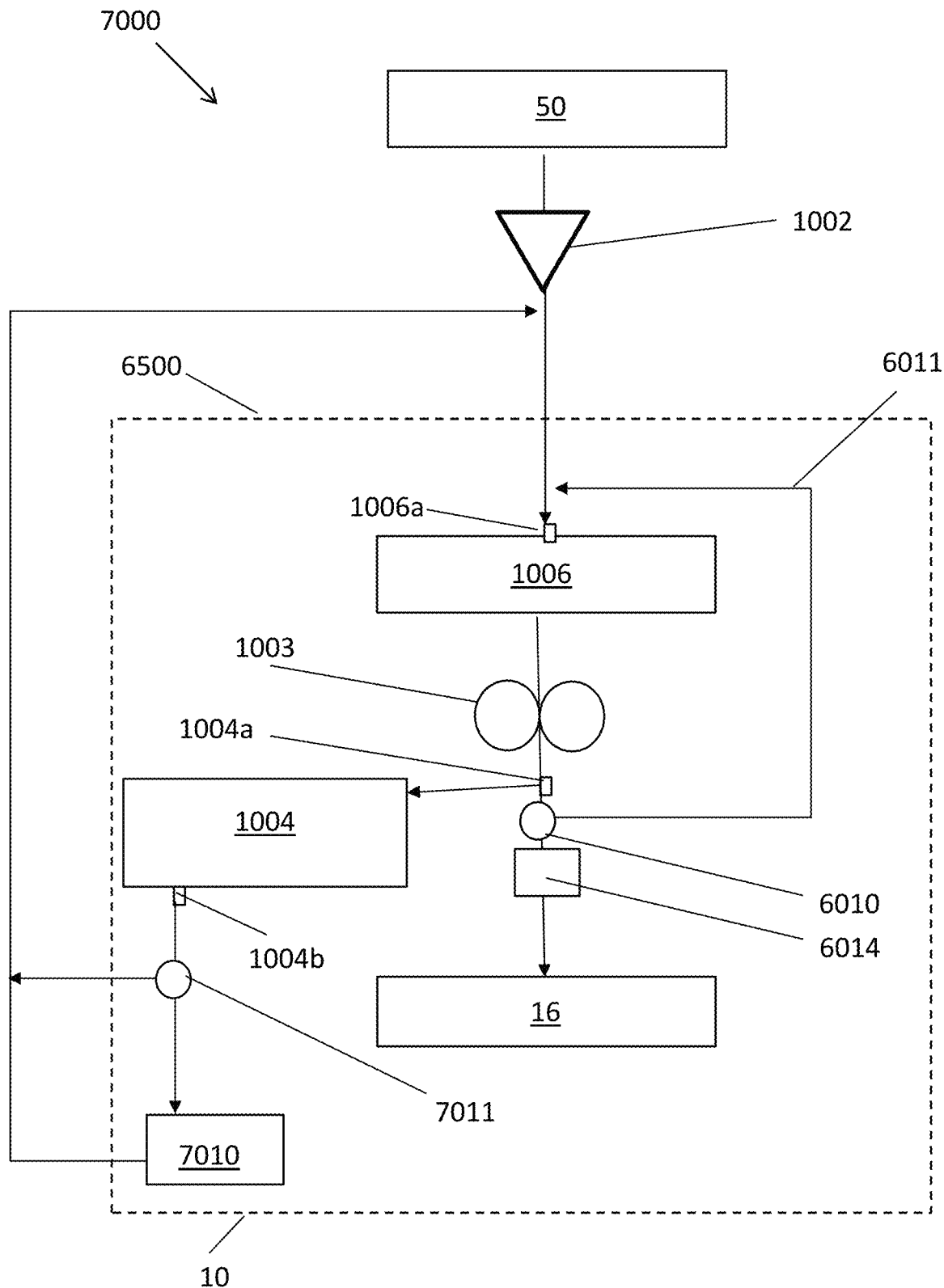
FIG. 7B is a schematic representation of a further alternative example fuel system comprising a recirculation loop and use of fuel for auxiliary systems.

FIG. 7B illustrates an alternative example fuel system 7000 from that shown in FIG. 7A. The fuel system 7000 is similar to the fuel system 6000 shown in FIG. 7A but differs in that at least a portion of the fuel exiting the secondary fuel-oil heat exchanger 1004 is supplied to additional engine and/or aircraft mechanisms 7010, rather than to the combustor 16. These mechanisms 7010 may include one or more of a nacelle anti-icing system, actuators, and/or turbine case cooling (TCC) systems. At least a portion of the fuel exiting the secondary fuel-oil heat exchanger 1004 is returned to the fuel supply system (i.e. the fuel tank 50 or the fuel supply pump 1002) or downstream of the supply system for redistribution (i.e., upstream of the primary fuel-oil heat exchanger 1006). The portion of fuel returned to/downstream of the fuel supply system may be controlled by valve 7011. No fuel passing through the secondary fuel-oil heat exchanger 1004 is sent to the combustor 16 in the example of FIG. 7B (at least not directly—it will be appreciated that the fuel returned to the fuel tank 50 may re-enter the engine 10 later, and may then be passed to the combustor 16).

Figure 7C:
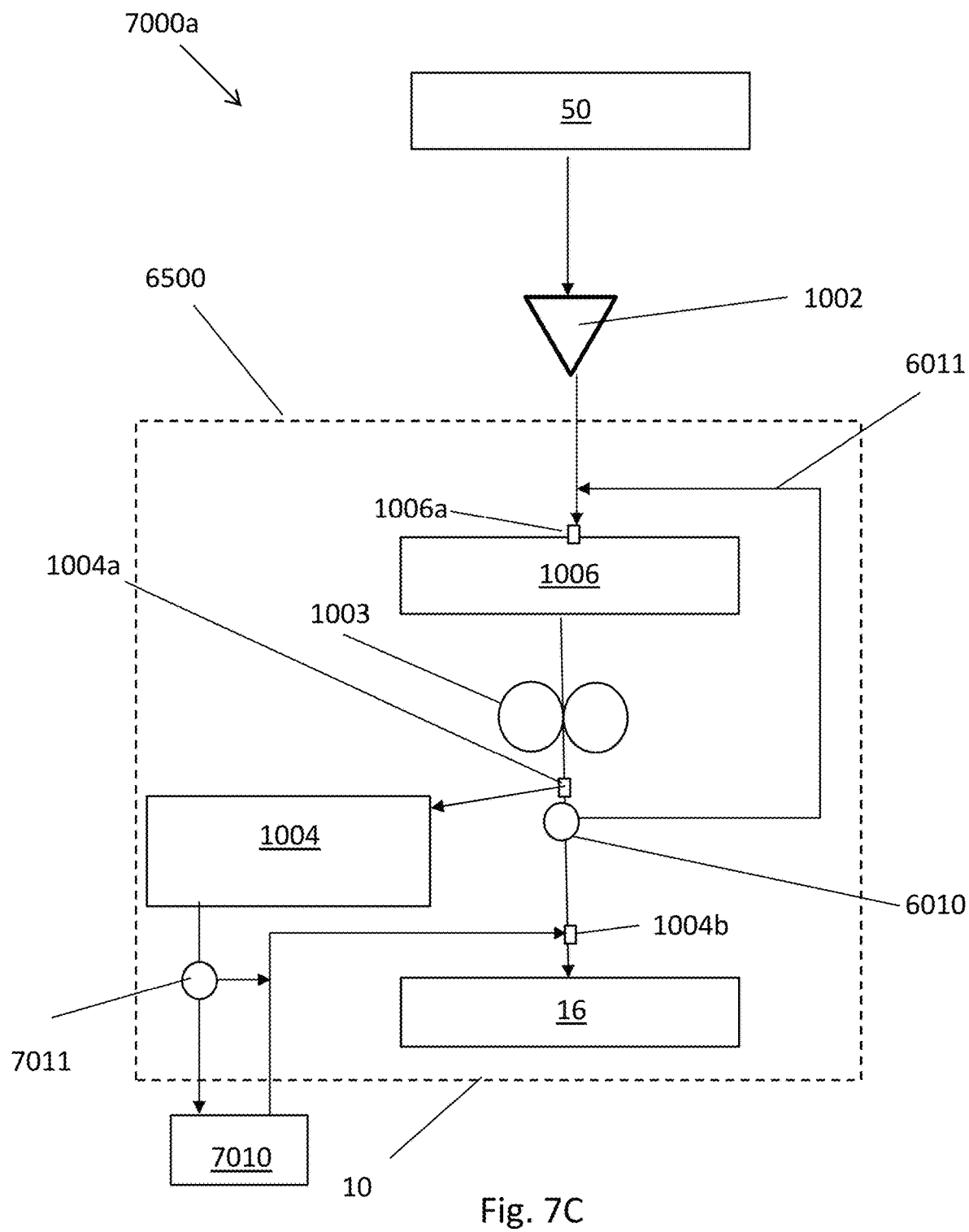
FIG. 7C is a schematic representation of a further alternative example fuel system similar to that shown in FIG. 7B but in which fuel passing through the secondary heat exchanger is returned to the combustor optionally after being used in one or more auxiliary systems.

FIG. 7C illustrates a further alternative example fuel system 7000a. The fuel system 7000a is similar to the fuel system 7000 shown in FIG. 7B and differs in that the portion of the fuel exiting the secondary fuel-oil heat exchanger 1004 returned to join the main fuel flow on its approach to the combustor 16 after optionally being supplied to one or more additional engine and/or aircraft mechanisms 7010 (which may be as described above). Any fuel not needed for these auxiliary systems 7010 may be returned straight to the main fuel flow path/combustor 16. At least a portion of the fuel exiting the secondary fuel-oil heat exchanger 1004 may be returned to the main fuel flow path without passing through the auxiliary systems 7010—the proportion directed to the auxiliary systems 7010 may be adjusted based on need and controlled with valve 7011. In other implementations, fuel used in one or more such additional aircraft mechanisms 7010 may then be returned to a tank 50 rather than sent to the combustor 16.

The gas turbine engine 10 of the aircraft 1 being described comprises a recirculating oil system arranged to supply oil to lubricate and to remove heat from a plurality of components. In the implementation being described, and illustrated in FIG. 8A, the recirculating oil system comprises a single closed oil loop system 2000. In other implementations, the recirculating oil system may comprise a primary oil loop system 2000 and a secondary oil loop system (not pictured), each of which is a closed loop oil system. The secondary oil loop system may supply oil to one or both of the primary fuel-oil heat exchanger 1006 and the secondary fuel-oil heat exchanger and possibly additional heat exchangers such as an air-oil heat exchanger.

In the illustrated implementation, the closed loop oil system 2000 comprises an oil tank 2002 suitable for containing a volume of oil. In some implementations, gasses are removed from oil within the oil tank 2002 by a de-aerator.

A feed pump 2004 is configured to pump oil from the oil tank 2002 to the secondary fuel-oil heat exchanger 1006. The average temperature of the oil entering the secondary fuel-oil heat exchanger 1006, at cruise conditions, is higher than the average temperature of fuel entering the secondary fuel-oil heat exchanger 1006. In the secondary fuel-oil heat exchanger 1006, thermal energy is transferred from the flow of oil to the flow of fuel. In this way, the average temperature of the flow of oil leaving the secondary fuel-oil heat exchanger 1004 is lower than the average temperature of the flow of oil entering the secondary fuel-oil heat exchanger 1006. Also in this way, the average temperature of the fuel leaving the secondary fuel-oil heat exchanger 1004 is higher than the average temperature of fuel entering the secondary fuel-oil heat exchanger 1006.

From the secondary fuel-oil heat exchanger 1004 the oil then flows to the primary fuel-oil heat exchanger 1006. In some implementations, the oil may flow through an air-oil heat exchanger (not shown) between the secondary fuel-oil heat exchanger 1004 and the primary fuel-oil heat exchanger 1006.

In the primary fuel-oil heat exchanger 1006, thermal energy is transferred from the flow of oil to the flow of fuel. In this way, the average temperature of the flow of oil leaving the primary fuel-oil heat exchanger 1006 is lower than the average temperature of the flow of oil entering the primary fuel-oil heat exchanger 1006. Also in this way, the average temperature of the fuel leaving the primary fuel-oil heat exchanger 1006 is higher than the average temperature of fuel entering the primary fuel-oil heat exchanger 1006.

From the primary fuel-oil heat exchanger 1006, the flow of oil is then conveyed through the engine components 2006 that the oil is intended to cool and/or lubricate. The oil acts as a lubricant and a coolant within the engine components 2006 and gains heat from the engine components 2006 during the process. The engine components 2006 may comprise one or more bearing chambers.

From the engine components 2006, the oil collects in the sump 2008. A scavenge pump 2010 is configured to pump oil from the sump 2008 back into the oil tank 2002.

Figure 8A:
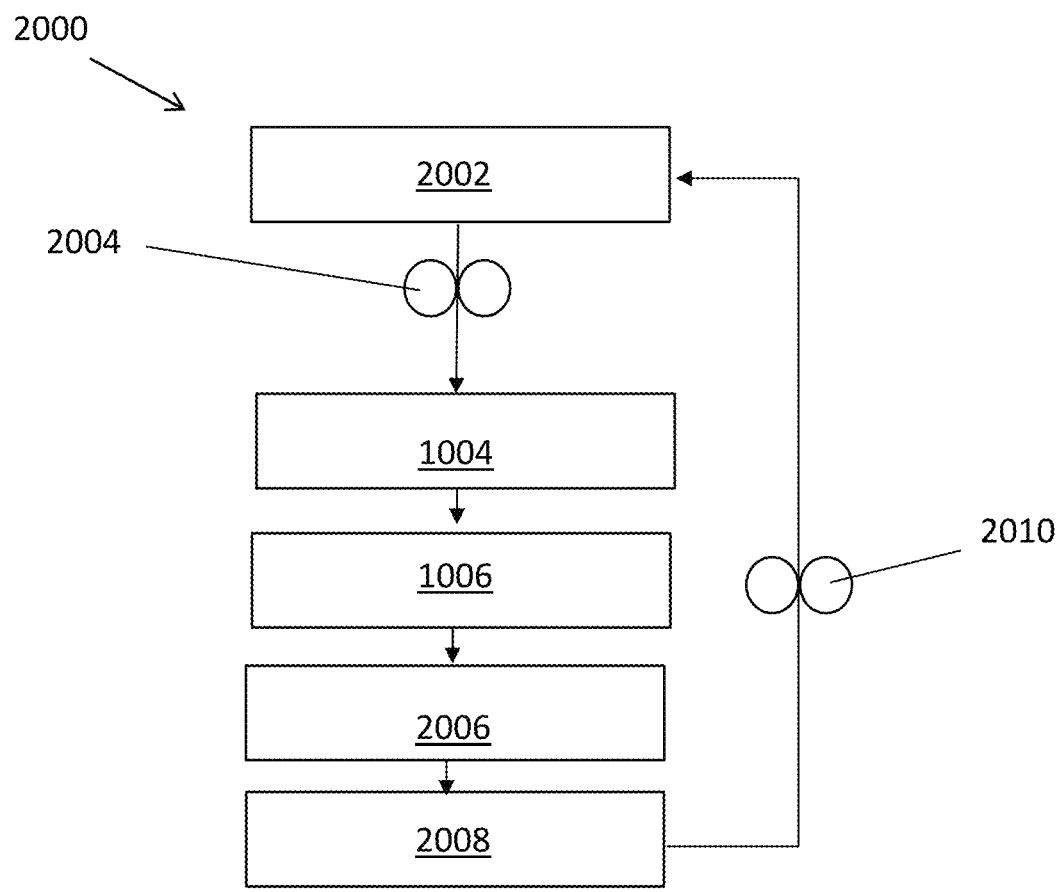
FIG. 8A is a schematic representation of a portion of an example recirculating oil system.
Figure 8B:
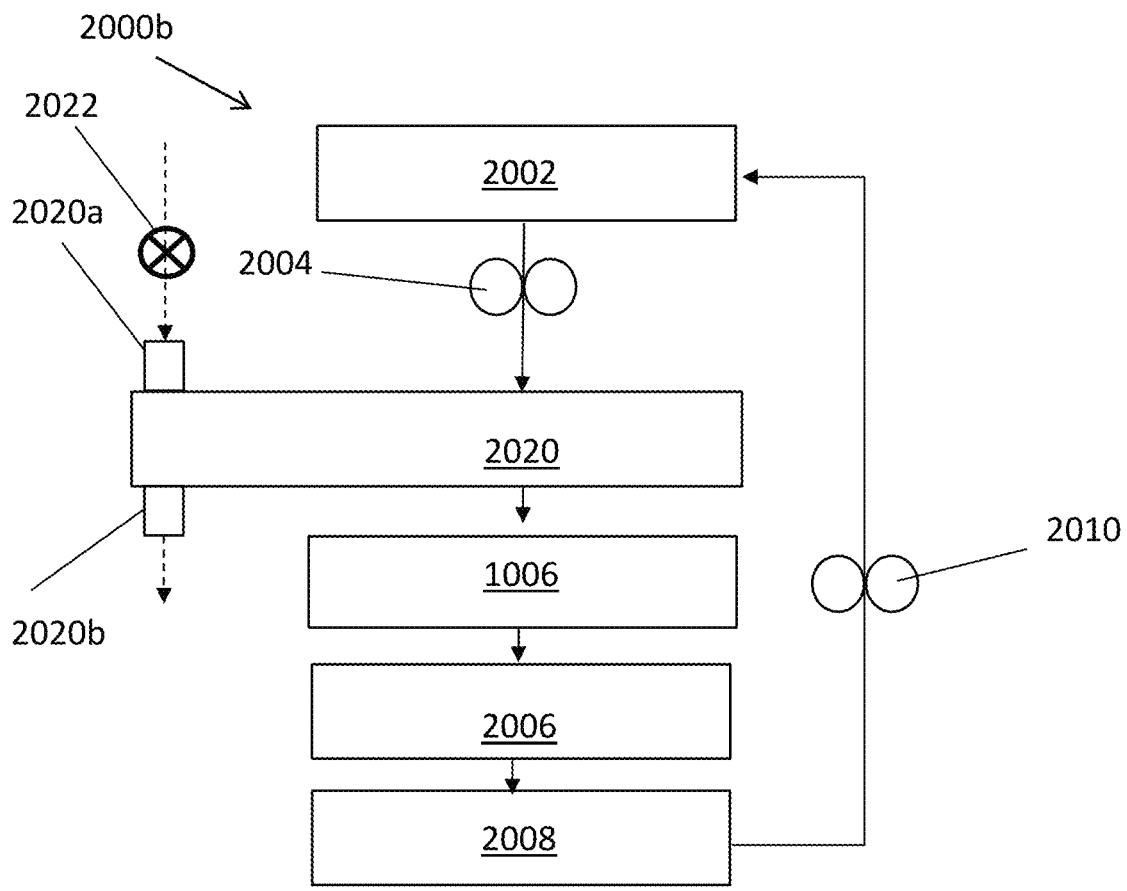
FIG. 8B is a schematic representation of a portion of an example recirculating oil system.
Figure 8C:
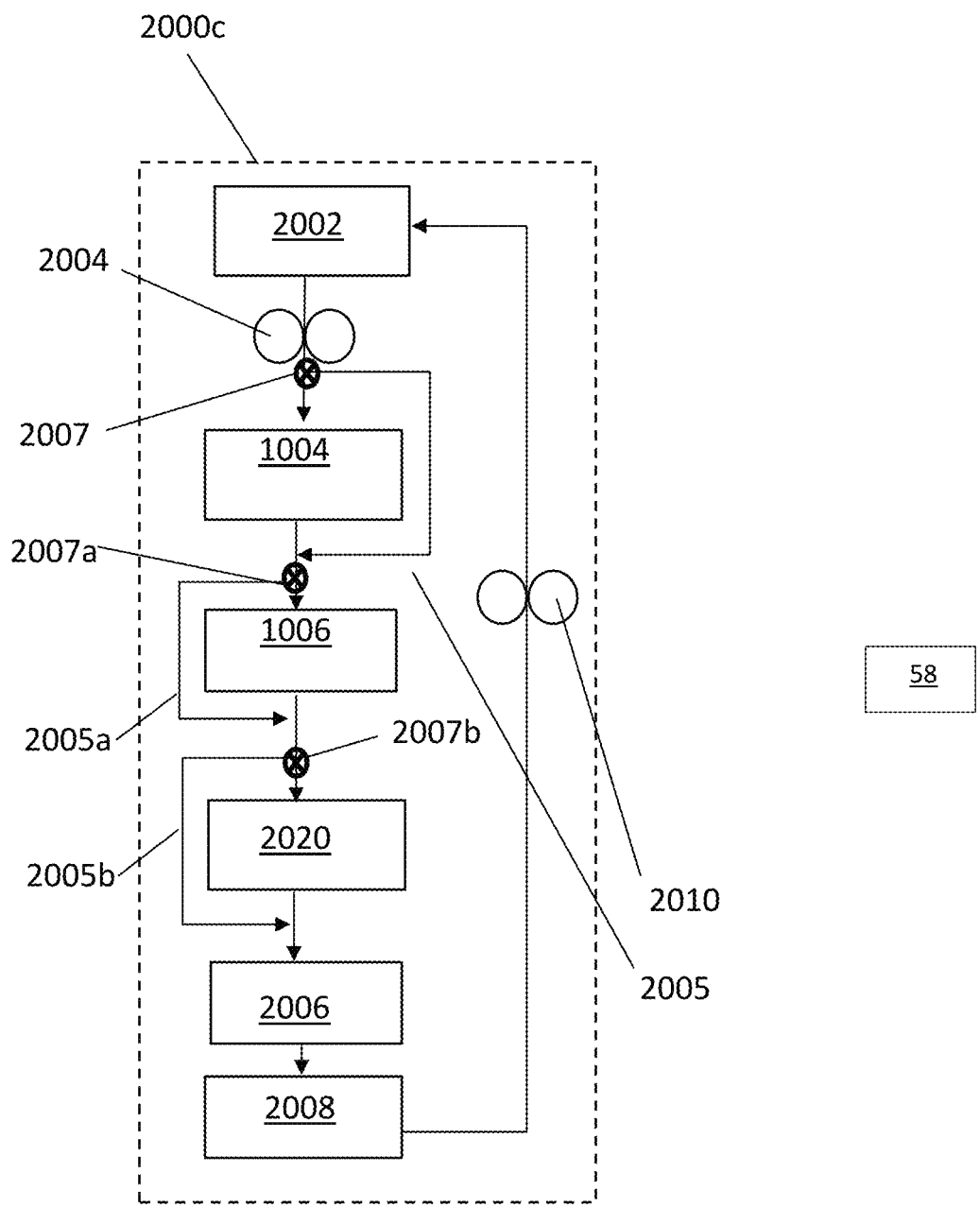
FIG. 8C is a schematic representation of a portion of an example recirculating oil system.

FIGS. 8B and 8C illustrate alternative oil loop systems 2000b, 2000c. In oil loop system 2000b of FIG. 8B, the oil flows through an air-oil heat exchanger for cooling prior to the primary fuel-oil heat exchanger 1006. The secondary fuel-oil heat exchanger is not present in this alternative oil loop system 2000b.

FIG. 8B also illustrates details of the air-oil heat exchanger 2020 which are not shown in other figures for clarity, in particular indicating airflow with dashed arrows. The air-oil heat exchanger 2020 has an air inlet 2020a and an air outlet 2020b. The air inlet, or intake, 2020a may be arranged to capture air in the engine's bypass duct 22, downstream from an outlet guide vane of the fan 23. The heat exchanger exhaust/air outlet 2020b may be arranged to output air back into the bypass duct 22, downstream of the inlet 2020a, or directly to the external atmosphere (e.g. if provided with a dedicated outlet nozzle).

A valve 2022, referred to as an air valve, is used to control the flow rate of air through the air-oil heat exchanger 2020. In the example pictured, the air valve 2022 is provided at or near the inlet 2020a to the heat exchanger 2020, and may therefore be referred to as an air inlet valve 2022. In other implementations, the air valve 2022 may be provided at or near the outlet 2020b from the heat exchanger 2020, and may therefore be referred to as an air outlet valve. Any suitable position for the valve 2022 may be selected, provided that the valve 2022 can be adjusted to control airflow through the air-oil heat exchanger 2020. In the example being described, the air valve 2022 is continuously adjustable between a fully-closed position (no air flow through the heat exchanger) and a fully-open position (maximum air flow through the heat exchanger). In other examples, the air valve 2022 may be adjustable between a plurality of discrete positions rather than being continuously adjustable—for example, six, five, four, three, or two different positions. In implementations with only two valve positions for the air valve 2022, these positions may be "open" and "closed"—the valve 2022 may be repeatedly opened and closed to provide a pulsing airflow when an intermediate level of cooling is desired in some such implementations.

FIG. 8C shows a recirculating oil system comprising a oil loop system 2000c. A main oil flow pathway passes through all heat exchangers 1004, 1006, 2020 in that loop. To adjust oil flow through the heat exchangers, one or more bypass pipes 2005, 2005a, 2005b are provided, with bypass valves 2007, 2007a, 2007b used to vary flow through said bypass pipes. A controller 58 may be used to actively manage fuel and/or oil flows through and around the heat exchangers 1004, 1006, 2020. The controller 58 may be a part of, or provided by, an EEC, or may be a separate unit. The control may be automated, for example by an EEC.

In other implementations, branching paths to different heat exchangers could instead be used. It will be appreciated that whilst a bypass pipe technically provides a parallel, alternative, flow path, a branching path as described here with reference to parallel flows is different in that each branching route of a parallel arrangement of heat exchangers comprises a heat exchanger, whereas the bypass pipe is simply a pipe with no (significant) heat exchange or other component thereon.

It will be appreciated that a combination of arrangements of heat exchangers and bypass pipes may be used in some implementations, and that FIG. 8C (all heat exchangers in series, multiple bypass pipes) can be thought of as showing one end of a design spectrum. In an alternative implementation, one or more of the heat exchangers may be part of a secondary oil loop system. In an alternative implementation, the heat exchangers may be arranged in parallel, whereby the oil loop system 2000 branches into separate branches with two or more separate branches each comprising a heat exchanger.

The oil loop system 2000 pictured in FIG. 8C provides a series oil flow pathway from a tank 2002, through an oil pump 2004, onwards through the secondary fuel-oil heat exchanger 1004, the primary fuel-oil heat exchanger 1006 and then the air-oil heat exchanger 2020, before entering the engine components 2006 to be cooled and/or lubricated and then being collected in a sump 2008 and then pumped back to the tank 2002 by oil pump 2010. The heat exchangers 1004, 1006, 2020 are therefore in a series arrangement. The order of the heat exchangers 1004, 1006, 2020 may be reversed such that, for example, the primary fuel-oil heat exchanger 1006 is after the air-oil heat exchanger 2020 in alternative implementations.

The oil loop system 2000c pictured in FIG. 8C comprises three oil bypass pipes 2005, 2005a, 2005b. The first bypass pipe 2005 is arranged to allow a portion of the oil to bypass the secondary fuel-oil heat exchanger 1004, and is controlled by a first bypass valve 2007. The first bypass pipe 2005 takes oil from upstream of the inlet to the secondary heat exchanger 1004, and returns it to the main oil flow pathway downstream of the secondary heat exchanger 1004 and before the primary fuel-oil heat exchanger 1006 and the air-oil heat exchanger 2020. The second bypass pipe 2005a is arranged to allow a portion of the oil to bypass the primary fuel-oil heat exchanger 1006, and is controlled by a second bypass valve 2007a. The second bypass pipe 2005a takes oil from upstream of the inlet to the primary fuel-oil heat exchanger 2020, and returns it to the main oil flow pathway downstream of the primary fuel-oil heat exchanger 2020, before the path reaches the air-oil heat exchanger 2020. The third bypass pipe 2005b takes oil from upstream of the inlet to the air-oil heat exchanger 2020, and returns it to the main oil flow pathway downstream of the air-oil heat exchanger 2020, before the path reaches engine components 2006. In implementations of the primary oil loop system 2000 with only one oil bypass pipe 2005, the position chosen may be that of the third bypass pipe 2005b, such that there is a bypass for the air-oil heat exchanger 2020 and not for the fuel-oil heat exchanger 1006. This may facilitate sinking as much heat as safely possible from the oil into the fuel, and keeping the thermal efficiency of the engine high by reducing heat loss to the environment. Having a bypass pipe 2005a on the primary fuel-oil heat exchanger 1006 may facilitate rapid adjustment of the heat transfer ratio if there is a risk of this dropping lower than desired (for example, depending on determined fuel characteristics, a lower limit for the ratio significantly above zero may be set). Set temperature limits may be strict for some fuels, depending on their characteristics. Having a bypass pipe 2005, 2005a, 2020 on all heat exchangers 1004, 1006, 2020 may protect the oil from getting too cold under certain conditions, to avoid a risk of congealing of oil—it will be appreciated that this may be more of a concern under idle conditions (e.g., at start-up or ground idle, or during descent) on a cold day than at cruise.

The inventors appreciated that the use of fuels different from the traditional kerosene-based jet fuels, such as sustainable aviation fuels, may result in different fuel properties, and that heat transfer parameters in operation may be adjusted to make use of the different fuel properties. In particular, in implementations that lack parallel arrangements of heat exchangers (as are used in the methods described with respect to FIGS. 14 and 15), the introduction of one or more oil bypass pipes with controllable valves, and implementing careful control of those valves, may allow for a method providing improved oil cooling (as the fuel may be able to take more heat) and may also improve the overall thermal efficiency of the engine, with less heat being lost to the surroundings. The controllable heat exchange system 3000, and in particular one or more controllable bypass valves 2007, 2007', 2007a, have a key role to play in managing the heat transfer ratio in such engines 10.

Further, whilst cruise conditions generally make up a much larger proportion of an aircraft engine's time in operation, the inventors appreciated that operation at idle is also significant—as the fuel mass flow rate is much lower at idle than at cruise, even a relatively small heat load to the fuel can result in a high temperature increase—the use of non-traditional fuels may therefore have an even greater effect on optimal approaches to heat management under idle conditions. Methods addressing these two scenarios of aircraft operation are discussed in more detail with relation to FIGS. 14 and 15.

Figure 9:
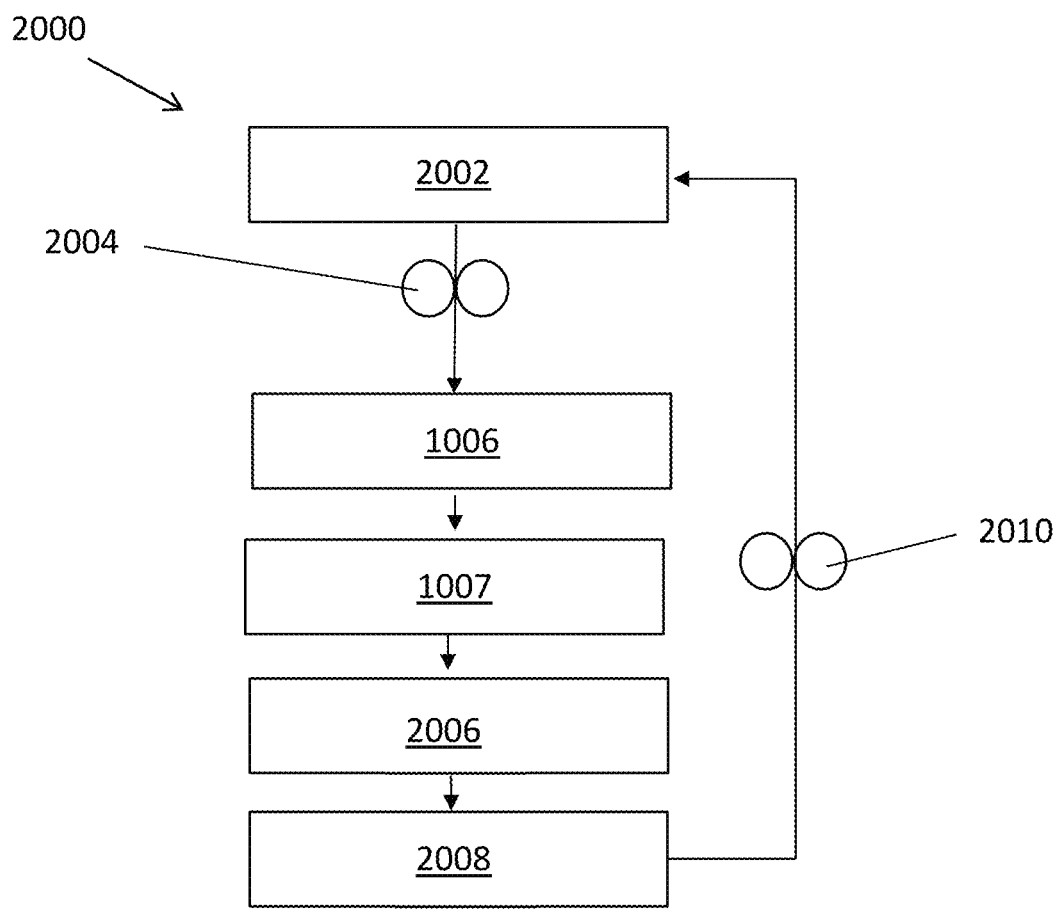
FIG. 9 is a schematic representation of a portion of an example recirculating oil system.

In a standard heat exchanger 1006, the fundamental limiting factor on the level of cooling provided is the temperature of the coolant (in this case, the fuel)—the oil's temperature on leaving the heat exchanger 1006 cannot be lowered below the temperature of the fuel entering the heat exchanger 1006 (and nor can the fuel's temperature be raised higher than that of the oil entering the heat exchanger) even if an effectively infinite flow rate of fuel or oil were used. Equilibration of temperatures is the limit, as defined in the second law of thermodynamics. In some implementations, as illustrated in FIG. 9, a refrigeration cycle apparatus 1007 is therefore provided. The refrigeration cycle apparatus 1007 is arranged to provide thermal lift by transferring further heat from the oil to the fuel such that the fuel temperature is raised by more than it would be on simply passing through the heat exchanger, and in some cases to above the oil temperature. The refrigeration cycle apparatus 1007 may take the form of an additional closed-loop circuit with a refrigerant fluid, with an evaporator between oil and the refrigerant (to transfer heat from the oil to the refrigerant) and a condenser between fuel and refrigerant (to transfer heat from the refrigerant to the fuel. The refrigeration cycle apparatus 1007 may additionally comprise a pump, a compressor, and/or an expansion valve/meter, and may be made to any suitable design known in the art. An oil valve may control how much oil flows through the refrigeration cycle apparatus 1007, and a fuel valve may control how much fuel flows through the refrigeration cycle apparatus 1007. The refrigeration cycle apparatus 1007 (and more specifically its pump and/or compressor, and optionally also the expansion valve or meter) is powered, generally electrically or mechanically (e.g. via a linkage to a rotating shaft), to provide this further, forced, heat transfer. The refrigeration cycle apparatus 1007 is shown in association with the main (primary) fuel-oil heat exchanger 1006 in the implementation pictured, so providing a boost to the fuel temperature after the fuel has passed through both fuel-oil heat exchangers 1004, 1006, and further cooling the oil of the oil system 2000 before it is returned to the engine components 2006. A bypass or recirculation pipe for the oil and/or for the fuel may be provided around the refrigeration cycle apparatus 1007 in various implementations.

Figure 10:
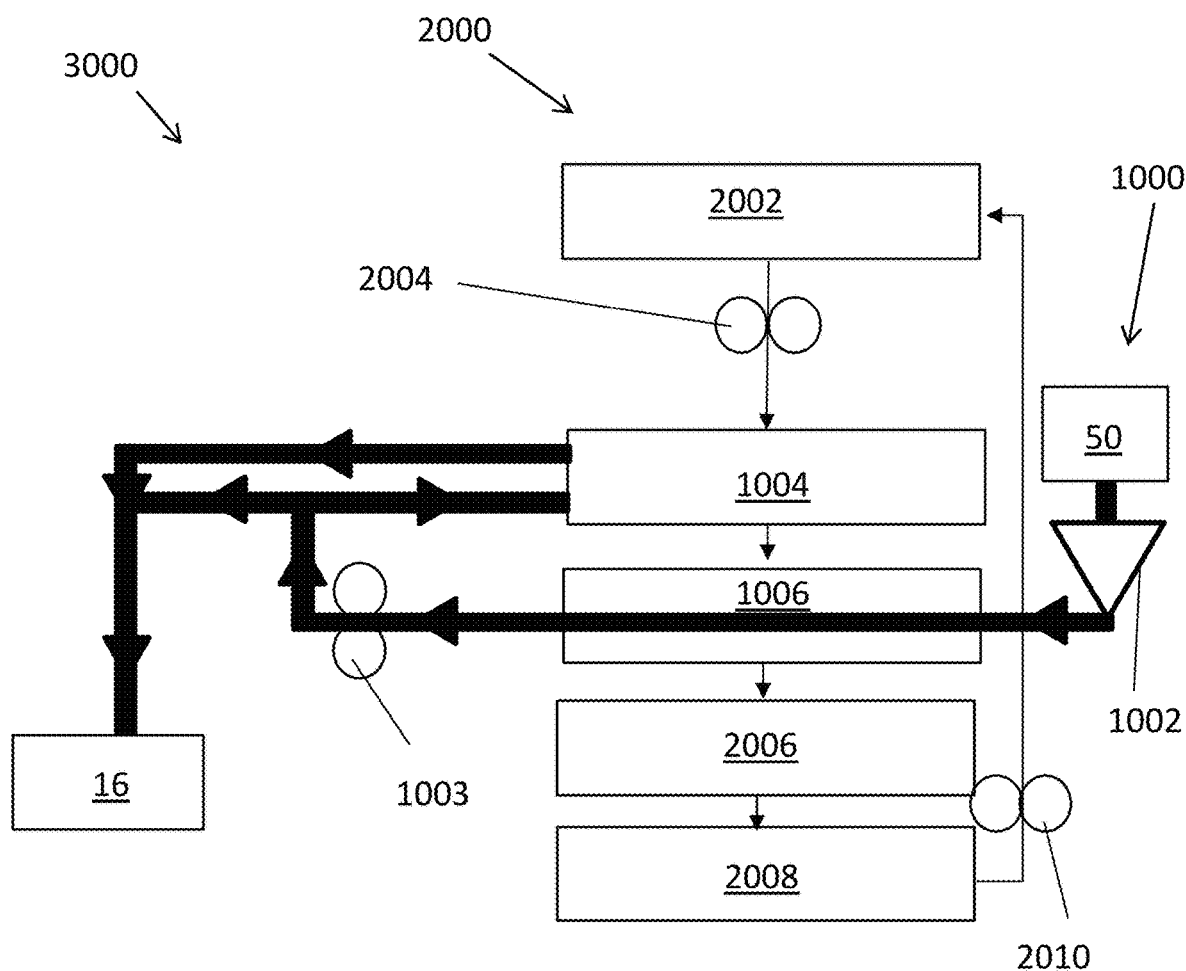
FIG. 10 is a schematic representation of a portion of the example fuel system of FIG. 6 and the example recirculating oil system of FIG. 8A.

FIG. 10 shows schematically an example heat exchange system 3000 comprising the closed loop oil system 2000 of FIG. 8A and the fuel system 1000 of FIG. 6. The two systems 1000, 2000 are pictured together to illustrate the interactions between the fuel and oil flows within the gas turbine engine 10. The fuel flow is shown with thick black arrows and the oil flow with thin black arrows.

Figure 11:
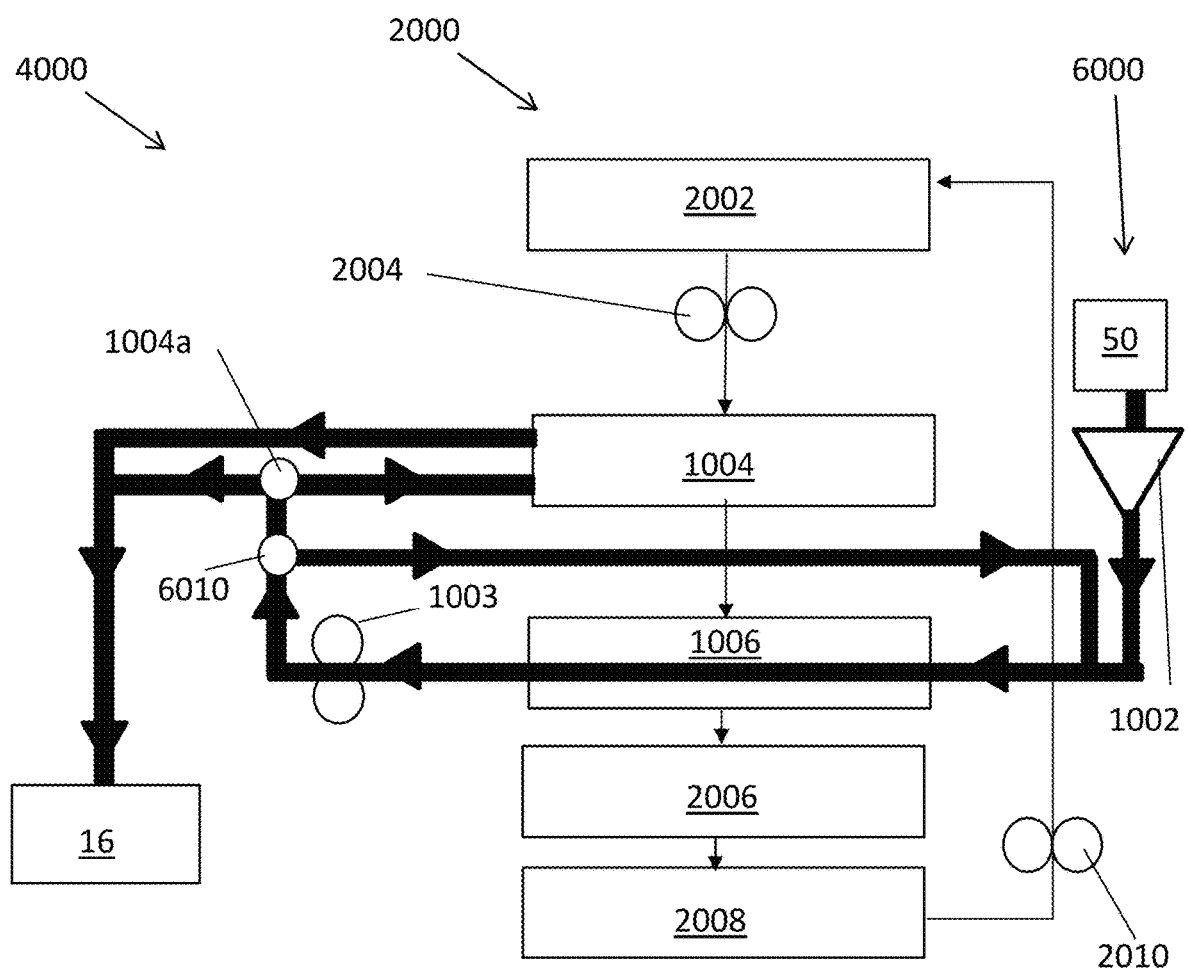
FIG. 11 is a schematic representation of a portion of the example fuel system of FIG. 7A and the example recirculating oil system of FIG. 8A.

FIG. 11 shows schematically an alternative example heat exchange system 4000, comprising the closed loop oil system 2000 of FIG. 8A and the fuel delivery system 7000a of FIG. 7A. The systems 7000a, 2000 are substantially the same as those illustrated in FIGS. 8A and 7A respectively, with the fuel flow again shown with thick black arrows and the oil flow with thin black arrows. However, the recirculating valve 6010 is located slightly differently from in FIG. 7A, namely being upstream of the fork in the fuel flow path to the secondary heat exchanger 1006, rather than being between the inlet to 1006a and outlet from 1006b that heat exchanger 1006. Thus in the implementation shown in FIG. 11, all of the fuel exiting the pump 1003 flows through the recirculation valve 6010, unlike in the embodiment shown in FIG. 7A. The proportion of fuel flowing through the secondary fuel-oil heat exchanger 1004 may be controlled with valve 1004a. Control methodology for the valves 1004a, 6010 may be adjusted as appropriate.

It will be appreciated that in implementations such as that shown in FIG. 7A, in which fuel flowing through the secondary fuel-oil heat exchanger 1004 is used as a working fluid in auxiliary systems and then returned to a tank 50, 53 instead of passed to the combustor 16, the fuel flow line from the secondary heat exchanger 1006 to the combustor 16 may be replaced with a fuel flow line back to the tank 50.

The inventors appreciated that the use of fuels different from the traditional kerosene-based jet fuels, such as sustainable aviation fuels, may result in different fuel properties, and that engine operation can be optimised for these different fuel properties. Fuels with a higher calorific value as claimed may also have a greater thermal stability, allowing the fuel to take in more heat, so providing improved oil cooling and/or improved combustion properties in the combustor. Recirculating the fuel through the primary fuel-oil heat exchanger 1006 may allow the fuel to receive more heat from the oil, increasing the fuel temperature and improving oil cooling.

A recirculation valve 6010 may be located downstream of the fuel pump 1003, and may therefore provide improved flexibility of the fuel flow. A lower flow rate of fuel to the combustor 16 may therefore be provided for a higher calorific value fuel, without changing pump speed, by instead increasing the amount of recirculation.

Figure 12:
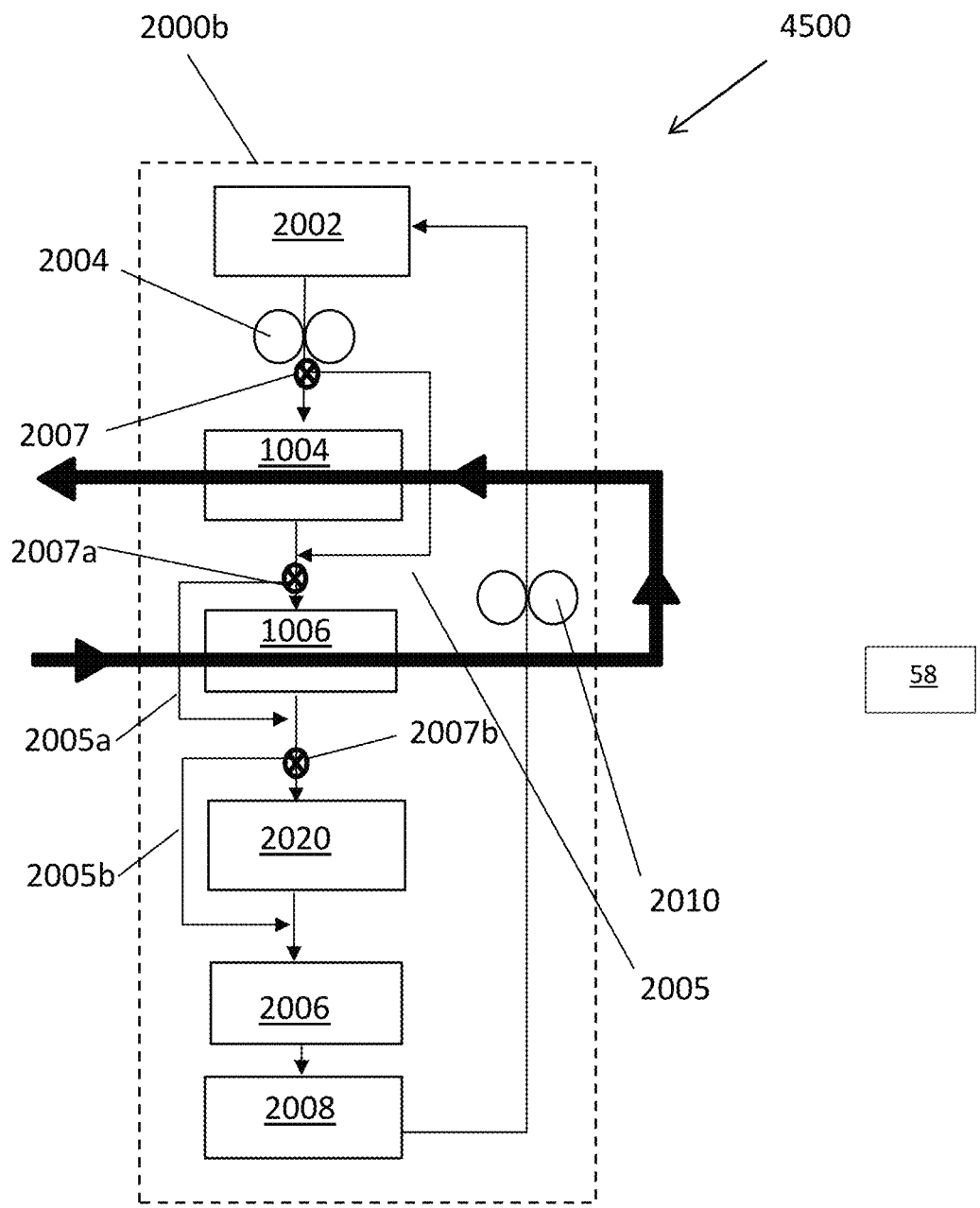
FIG. 12 is a schematic representation of a portion of the example fuel system of FIG. 7A and the example recirculating oil system of FIG. 8C.

FIG. 12 shows schematically an alternative example heat exchange system 4500, comprising the closed loop oil system 2000 of FIG. 8C and the a portion of the fuel delivery system 7000a of FIG. 7A. For the purposes of clarity, only the fuel flow through the primary fuel-oil heat exchanger 1006 and secondary fuel-oil heat exchanger 1004 is shown.

In the above implementations, one or more temperature sensors may be provided, for example arranged to sense fuel temperature on approach to the fuel pump 1003 or the combustor 16. Data from the one or more sensors, optionally in combination with other data (e.g. fuel characteristics as described above) may be used by a controller 58 of the heat exchange system 3000 to manage fuel and/or oil flows through and around the heat exchangers 1004, 1006, 2020. The controller 58 may be a part of, or provided by, an EEC, or may be a separate unit. The control may be automated, for example by an EEC.

The inventors appreciated that, in various implementations, knowledge of one or more fuel characteristics can be used to tailor operation of the heat exchange system 3000 so as to improve performance of the engine 10, taking advantage of properties that vary between aviation fuels.

For clarity and brevity, a single bypass valve 2007 and corresponding bypass pipe 2005 is referred to in the methods described herein. As indicated by the implementation of FIG. 12, implementations may in fact include multiple bypass valves 2007, 2007a, 2007b, each having an associated bypass pipe 2005, 2005a, 2005b to enable the flow of oil to bypass one or more of the secondary fuel-oil heat exchanger 1004, the primary fuel-oil heat exchanger 1006, and/or the air-oil heat exchanger 2020. Where reference is made to "the bypass valve 2007" or "the bypass pipe 2005" in the discussion of the methods illustrated in FIGS. 13 to 17 it is intended to refer to one or more of the plurality of bypass valves 2007, 2007a, 2007b and associated bypass pipes 2005, 2005a, 2005b, dependent on which combination of heat exchangers may be being discussed.

Figure 13:
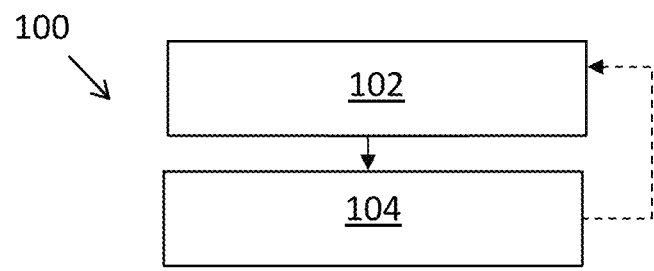
FIG. 13 illustrates an example method of operating a gas turbine engine.

FIG. 13 illustrates a first method 100 involving using knowledge of fuel characteristics to determine control of the heat exchange system 3000. The method 100 comprises determining 102 at least one fuel characteristic of the fuel arranged to be combusted by the combustor 16. This determination 102 may be performed by any of the methods outlined above, optionally using a fuel composition determination module 57.

The engine 10 used to implement the method 100 comprises an air-oil heat exchanger 2020 and a fuel-oil heat exchanger 1006, a bypass pipe 2005 arranged to allow a proportion of the oil to flow past one of the air-oil heat exchanger and the fuel-oil heat exchanger; and a bypass valve 2007 arranged to allow the proportion of the oil sent through the bypass pipe to be varied, and the method 100 comprises controlling 104 the bypass valve 2007 based on the at least one fuel characteristic so as to adjust the proportion of the oil sent via each heat exchanger at cruise conditions.

More specifically, for the implementations described with respect to FIGS. 5 to 12 above, the method 100 comprises controlling 104 the bypass valve 2007, of the oil system 2000 at cruise conditions based on the at least one fuel characteristic so as to adjust the proportion of the oil sent via each bypass pipe 2005 of the oil loop system 2000, so controlling how much oil goes bypasses the primary fuel-oil heat exchanger 1006, and how much bypasses the air-oil heat exchanger 2020 and optionally how much bypasses the secondary fuel-oil heat exchanger 1004. In implementations with different arrangements of heat exchangers, for example a parallel arrangement of heat exchangers rather than a series arrangement, the bypass valve 2007 may be a replaced by or act as a modulation valve directing oil flow along one or more branches of the parallel split arrangement, so allowing the proportion of the oil sent via each heat exchanger to be varied in that way.

As indicated by the dashed line in FIG. 13, this method 100 may optionally be repeated. In some implementations, for example in implementations with only one fuel onboard the aircraft 1, the method 100 may be performed only once over a flight cycle—e.g. on refuelling. In other implementations, however, for example in implementations with multiple fuel sources, the fuel supplied to the combustor 16 may vary over time during a flight. The determination 102 may therefore be performed more than once—e.g.:

(i) once for each fuel source 50, 53 on refuelling/at the start of a flight in implementations with multiple fuel sources of which only one or the other is ever used at any given time (and knowledge of from which fuel source fuel is being drawn may prompt selection of the appropriate stored fuel characteristic); or (ii) frequently during a flight, e.g. in response to a change in from which fuel source(s) fuel is being drawn (noting that the fuel provided to the combustor 16 may be a mixture of fuels from different sources, in some implementations), or at regular intervals.

The bypass valve 2007 may therefore be arranged to divert a fixed portion of the flow of oil through the bypass pipe 2005 during operation of the engine 10, the fixed portion being determined at start-up of the engine 10 based on the at least one determined fuel characteristic (option (i) above). Alternatively, the bypass valve 2007 may be arranged to divert a variable portion of the flow of oil through the bypass pipe 2005 during operation of the engine 10 during a single flight (option (ii) above). The bypass valve 2007 may therefore be actively controlled to vary the proportion of oil sent through the bypass pipe 2005 (and so through each heat exchanger 1004, 1006, 2020), especially in implementations in which the aircraft 1 carries multiple different fuels in different tanks, and may change which fuel (or fuel mixture) is in use in flight. Active control of the bypass valve 2007 may be automated and implemented by a controller 58 of the heat exchange system 3000, which may be a dedicated controller or a part of a more general EEC. In various implementations, the control of the bypass valve 2007 may be closed-loop or open-loop, based on availability of in-line measurements—in particular, a closed-loop approach to control may be preferred when feedback data (e.g. from oil flow rate sensors) are available.

The inventors appreciated that fuels with certain fuel characteristics can accept more heat than others without decomposing, e.g. due to having a higher heat capacity and/or higher thermal stability, or may otherwise benefit from being at a higher temperature (e.g. for fuel burn efficiency). Adaptively controlling the heat exchange system 3000 based on the fuel characteristic(s) determined therefore allows for more efficient use of different fuels, and more efficient engine operation and oil cooling.

The fuel characteristic(s) may not be the only data considered in adjusting the bypass valve 2007—for example, the temperature of the fuel leaving the fuel-oil heat exchanger 1006, or entering the combustor 16 may also be considered, as well as the heat tolerance of fuel system components downstream of the heat exchanger 1006 (and optionally also of the refrigeration cycle apparatus 1007, where present). Where a refrigeration cycle apparatus 1007 is present, the bypass valve 2007, or another oil valve, may control how much oil flows through the refrigeration cycle apparatus 1007. In some implementations, all oil passing through the main fuel-oil heat exchanger 1006, and optionally also all fuel passing through that heat exchanger 1006, may also pass through the refrigeration cycle apparatus 1007—the refrigeration cycle apparatus 1007 may however be unpowered/non-operational for some of that time, so not providing any temperature lift.

Subject to suitability of the at least one determined fuel characteristic, the method 100 may comprise using the bypass valve 2007 to do one or more of the following:

send all of the oil via the primary fuel-oil heat exchanger 1006 (none via the air-oil heat exchanger 2020) for one or more periods of at least 30 minutes at cruise, such that no heat is lost to the environment via the air-oil heat exchanger for at least some periods of operation at cruise;

send all of the oil via the primary fuel-oil heat exchanger 1006 (none via the air-oil heat exchanger 2020) for at least 15% of the total time spent at cruise, and optionally for at least 20% of the time spent at cruise;

send at least 95% of the oil via the primary fuel-oil heat exchanger 1006 (not more than 5% via the air-oil heat exchanger 2020) for at least 90% of time spent at cruise, such that very little heat, if any, is lost to the environment via the air-oil heat exchanger for at least 90% of operation at cruise;

control oil flow such that at least 80% of the heat transferred away from the oil at cruise is transferred to the fuel; and/or control oil flow such that all of the heat transferred away from the oil at cruise is transferred to the fuel over at least 90% of time spent at cruise; and/or.

control oil flow such that between 200 and 600 kJ, and optionally 200-500 kJ, of heat from the oil is transferred to the fuel in the heat exchange system 3000 at cruise conditions, per kilogram of fuel. In some implementations, the heat transferred may be in the range from 350 to 450 KJ/kg of fuel.

Suitability of the at least one determined fuel characteristic may be determined by comparing one of more fuel characteristics to a threshold value set for the respective fuel characteristics. For example, a fuel with a SAF content (% SAF) of over 60%, 65%, 70%, 75%, or 80% may be deemed suitable for a reduction in oil flow rate through the air-oil heat exchanger 2020 as compared to traditional aviation fuels. Multiple fuel characteristics may be reviewed in conjunction in some implementations—for example with a lower threshold for one fuel characteristic being used when another fuel characteristic is within a specific range. The fuel characteristics may be considered independently/in isolation in other implementations.

The at least one fuel characteristic may be or comprise one or more of thermal stability, aromatic hydrocarbon content of the fuel, or percentage of sustainable aviation fuel in the fuel, and modulation valve control decisions may be made based on knowledge of that at least one fuel characteristic. For example, provided that the thermal stability data indicate that the fuel is stable in operation at temperatures above 160° C. or 170° C., the bypass valve 2007 may be controlled 104 such that at least 80%, and optionally 90-100% of the heat transferred away from the oil at cruise may be transferred to the fuel. By way of further example, provided that the molar percentage of aromatic hydrocarbons in the fuel is below 12%, and optionally below 10% or below 5%, at least 80%, and optionally 90-100% of the heat transferred away from the oil at cruise may be transferred to the fuel. By way of further example, provided that the SAF content of the fuel is over 50%, and optionally over 75%, the bypass valve 2007 may be controlled such that at least 80%, and optionally 90-100% of the heat transferred away from the oil at cruise may be transferred to the fuel. By way of further example, provided that the calorific value of the fuel is at least 43.5 MJ/kg, at least 80%, and optionally 90-100% of the heat transferred away from the oil at cruise may be transferred to the fuel. Typically, less heat may be transferred to a traditional fuel if the fuel calorific value exceeds a threshold, because, for higher calorific value fuels, the flow rate is generally reduced to achieve the same level of thrust—the fuel in the primary fuel-oil heat exchanger 1006 may therefore undergo an increased temperature rise due to its reduced flow rate if the amount of oil passing through the heat exchanger 1006 is not reduced. However, newer fuels (e.g. SAF) with higher thermal stabilities also have higher calorific values in many cases—the increased fuel temperature rise due to the lower flow rate may therefore be acceptable in some scenarios, and indeed further eat addition beyond that may also be possible. This demonstrates the utility of considering multiple fuel characteristics in conjunction in some implementations, rather than a single fuel characteristic alone.

Any one implementation may use only one, or multiple, fuel characteristics. A processing module may be provided, optionally as part of the fuel characteristic determination module 57, and/or as part of a general engine EEC, to make decisions on control of the modulation valve 2016 based on the fuel characteristic data, and optionally also on other data.

A gas turbine engine 10 for an aircraft implementing this method 100 comprises a bearing 2006 arranged to support the fan shaft, and an oil loop system 2000 arranged to supply oil to the bearing 2006. The heat exchange system 300 of the engine 10 comprises an air-oil heat exchanger 2020 through which the oil in the oil loop system 2000 flows, and a fuel-oil heat exchanger 1006 through which the oil in the oil loop system and the fuel flow such that heat is transferred between the oil and the fuel. A bypass valve 2007 is provided, the valve 2007 being arranged to allow the proportion of the oil sent via a bypass pipe 2005 and so bypass one or more of the heat exchangers 1006, 2020 to be varied. The engine 10 also comprises a fuel composition determination module 57 arranged to determine at least one fuel characteristic of the fuel arranged to be combusted by the combustor 16. The bypass valve 2007 is arranged to be controlled based on the at least one fuel characteristic, as determined by the fuel composition determination module 57, so as to adjust the proportion of the oil sent via the bypass pipe 2005 (and so the proportion of oil flowing through each heat exchanger 1006, 2020) at cruise conditions. A controller 58 may be provided to make and implement decisions based on the output from the fuel composition determination module 57.

The inventors also appreciated that the use of fuels different from the traditional kerosene-based jet fuels, such as sustainable aviation fuels, may result in different fuel properties, and that heat transfer parameters in operation may be adjusted to make use of the different fuel properties. In particular, some fuels may be heated to higher temperatures in one or more fuel-oil heat exchangers than traditional fuels, without significantly increasing coking. This may allow for a method providing improved oil cooling (as the fuel is able to take more heat) and may also improve the overall thermal efficiency of the engine, with less heat being lost to the surroundings. The controllable heat exchange system 3000 has a key role to play in managing the heat transfer ratio.

Further, whilst cruise conditions generally make up a much larger proportion of an aircraft engine's time in operation, the inventors appreciated that operation at idle is also significant—as the fuel mass flow rate is much lower at idle than at cruise, even a relatively small heat load to the fuel can result in a high temperature increase—the use of non-traditional fuels may therefore have an even greater effect on optimal approaches to heat management under idle conditions. The methods 200, 300 of FIGS. 14 and 15 address these two scenarios of aircraft operation.

Figure 14:
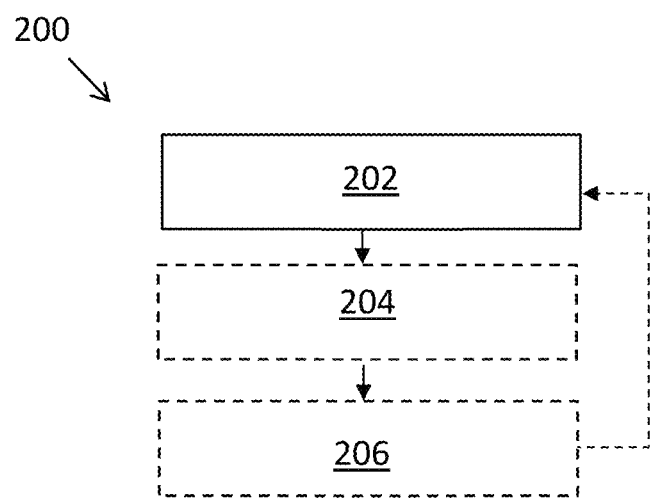
FIG. 14 illustrates a further example method of operating a gas turbine engine.
Figure 15:
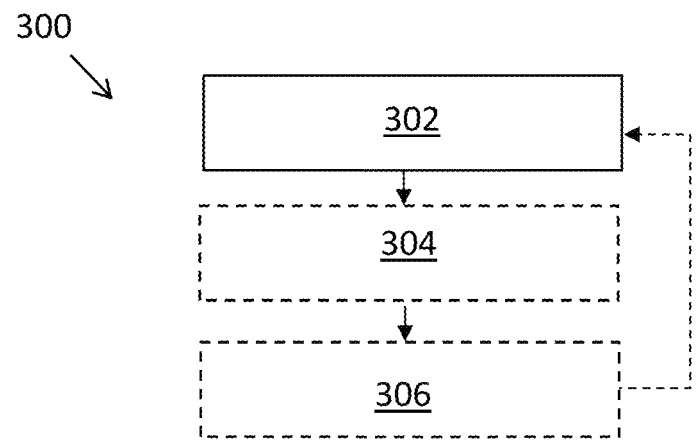
FIG. 15 illustrates a further example method of operating a gas turbine engine.

FIG. 14 illustrates a method 200 implementing these considerations at cruise conditions, and FIG. 15 illustrates a method 300 implementing these considerations at idle, e.g. whilst the aircraft is starting up, running whilst stationary during boarding, and taxiing (towards a runway or hangar, or between other ground-based locations), or at some periods during flight (e.g. descent).

Looking first at the method 200 to be performed at cruise, the method 200 is arranged to be performed in a direct drive gas turbine engine 10 comprising an oil loop system 2000 arranged to supply oil to the engine components 2006; and a heat exchange system 3000 comprising an air-oil heat exchanger 2020 through which the oil in the oil loop system flows; and a primary fuel-oil heat exchanger 1006 through which the oil in the oil loop system and the fuel flow such that heat is transferred between the oil and the fuel. A bypass pipe 2005 is provided, the bypass pipe 2005 arranged to allow a proportion of the oil to flow past one of the air-oil heat exchanger 2020 or the fuel-oil heat exchanger 1006; and a bypass valve 2007 arranged to allow the proportion of the oil sent through the bypass pipe 2005 to be varied. The method 200 comprises controlling 202 the heat exchange system 3000 such that, under cruise conditions, a heat transfer ratio of:

$$\frac{\text{rate of heat transfer from oil to air } (kJkg^{-1})}{\text{rate of heat transfer from oil to fuel } (kJkg^{-1})}$$

is in the range from 0 to 0.67, and optionally in the range from 0 to 0.60, from 0 to 0.50, from 0 to 0.40, from 0 to 0.30, from 0 to 0.20, or from 0 to 0.10 . . . . A controller 58 may be provided to implement this control.

It will be appreciated that even for one specific engine 10 operating on a set fuel, it is usual to have a range of values for this ratio at cruise due to varying conditions—for example, an upper bound of the range may apply on a cold day (ISA-30 conditions) at low altitude (cruise: 35,000 ft), with low oil system heat generation, and a lower bound may apply on a hot day (ISA+40 conditions) at high altitude (cruise: 39,000 ft), with high oil system heat generation.

The method 200 may further comprise receiving data 204 to allow calculation or inference of the heat transfer ratio, e.g. temperature data (of the oil and/or the fuel, at one or more points around an oil loop system 2000 or fuel flow pathway, and/or optionally a fuel tank temperature or oil tank temperature), and fuel flow rate data. Such data may be received 204 by a controller 58 and used 206 to adjust the control 202 of the heat exchange system 3000 at cruise, so as to maintain the heat transfer ratio at a desired level or within desired bounds. This checking and adjustment/correction 206 may be performed at regular intervals, or in response to predetermined stimuli (e.g. a change in temperature or flow rate, or a change in engine operation or altitude). These steps 204, 206 may alternatively be considered as part of the controlling 202 of the heat exchange system 3000 (i.e., not as separate steps). The method 200 may also be arranged to make use of other information, e.g. temperature data (of oil, fuel, and/or ambient temperature of an environment around the aircraft 1), flow rate data (of oil and/or fuel), and/or one or more fuel characteristics, in determining 206 what control actions to take.

The step of controlling 202 the heat exchange system 3000 may comprise any, or any combination, of the examples provided for the control step 104 of the method 100 of FIG. 13, for example, by decreasing the amount of oil sent via the at least one air-oil heat exchanger 2020 by increasing the amount of oil sent via bypass pipe 2005 when the heat transfer ratio is too high, or by adjusting the proportion of oil and/or fuel sent via a respective bypass pipe 1005 or recirculation pipe 6011.

In implementations in which the engine 10 comprises a refrigeration cycle apparatus 1007, the step of controlling 202 the heat exchange system 3000 may comprise using the refrigeration cycle apparatus 1007 to provide thermal lift by transferring further heat from the oil to the fuel beyond that transferred on passing through the fuel-oil heat exchanger(s) 1004, 1006, in some cases such that the fuel temperature is raised above the oil temperature. In such implementations, a lower value for the heat transfer ratio may be obtained than in implementations without a refrigeration cycle apparatus 1007—for example, the heat transfer ratio at cruise may be no more than 0.40 and optionally no more than 0.38, and further optionally no more than 0.10 or 0.05. In implementations in which there is no refrigeration cycle apparatus 1007, or in which such an apparatus is present but not in use, a higher value of the heat transfer ratio at cruise may be maintained, for example being greater than 0.38, and optionally greater than 0.40 or 0.50.

Fuel temperature on reaching the combustor 16 may also be taken into account. The method 200 may comprise controlling 202 the heat exchange system 2000 under cruise conditions such that the heat transfer ratio is in the range from 0 to 0.2 provided that the fuel temperature on entry to the combustor 16 is at least 160° C., or in the range from 0 to 0.1 provided that the fuel temperature on entry to the combustor 16 is at least 180° C., or in the range from 0 to 0.45 provided that the fuel temperature on entry to the combustor is at least 140° C. One or more temperature sensors 1009 may therefore be used, and their output(s) may be taken into account when setting the control 202 of the heat exchange system 2000.

The method 200 may also take into account the nature of the fuel—for example whether the fuel is or comprises a sustainable aviation fuel (SAF). For example, the heat transfer ratio at cruise may be maintained in the range from 0 to 0.2 provided that the fuel is at least 70% SAF, or from 0 to 0.1 provided that the fuel is at least 80% SAF. One or more fuel characteristics-optionally determined by a fuel characteristic determination module 57 as described above—may therefore also be used; the information may be taken into account when setting the control 202 of the heat exchange system 2000.

In some implementations, no more than 20% of the heat transferred away from the oil at cruise may be transferred to the air and the rate of heat transfer from oil to air may be maintained in the range from 0 to 100 kJ per kilogram of fuel at cruise conditions.

In some implementations, at least 80% of the heat transferred away from the oil at cruise may be transferred to the fuel and the rate of heat transfer from oil to fuel may be maintained in the range from 110 to 200 kJ per kilogram of fuel at cruise conditions.

Figure 18:
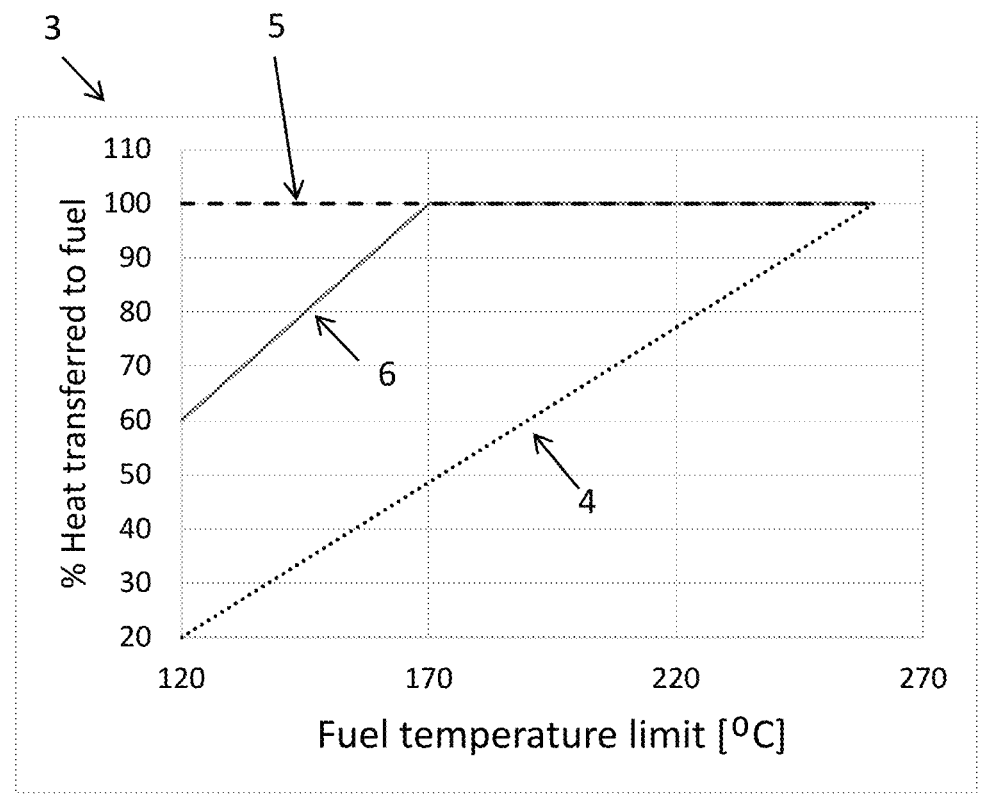
FIG. 18 illustrates a graph of heat transfer ranges at cruise for a direct drive gas turbine engine.

The percentages of the total heat transferred away from the oil in the heat exchange system 3000 which are transferred to the fuel (as opposed to being transferred to the air/environment) at cruise conditions for a particular direct drive engine 10 are plotted as a function of the fuel temperature limit in FIG. 18. The fuel temperature limit is the highest fuel temperature deemed safe for aircraft operation for that fuel, and that engine 10, and may depend on fuel characteristics such as thermal stability and also on heat tolerance of engine components. The plot 3 shows a lower bound 4 (black dotted line) and upper bound 5 (black dashed line) on % heat transferred to the fuel—the upper and lower bounds 4, 5 account for different cruise fuel flows (which will depend among others on altitude, rating, etc.), variability in engine heat generation, aircraft fuel temperature, atmospheric temperature, and other variables. Generally speaking, for the example engine 10 for which these data are provided, for a fuel with a temperature limit of 120° C., the lower bound may be 20% of the heat being transferred to the fuel, with an upper bound of all heat lost from the oil being transferred to the fuel (100%). The plot 3 also shows a line 6 (grey solid line) for a typical heat transfer to fuel with fuel temperature limit. A typical value of % Heat transferred to fuel for a fuel with a temperature limit of 120° C. may be 60%; this may increase to 100% for fuel temperature limits of 170° C. and above. One the fuel temperature limit is equal to or greater than 260° C., all heat may be transferred to the fuel at cruise throughout cruise, with no need for air cooling, giving a heat transfer ratio of zero.

Turning now to the method 300 to be performed at idle, the method 300 is again arranged to be performed in a direct drive gas turbine engine 10 comprising an oil loop system 2000 arranged to supply oil to engine components 2006; and a heat exchange system 3000 comprising an air-oil heat exchanger 2020 through which the oil in the oil loop system flows; and a fuel-oil heat exchanger 1006 through which the oil in the oil loop system and the fuel flow such that heat is transferred between the oil and the fuel. A modulation valve 2016 is again provided to control the proportion of the oil sent via each branch of the oil loop system 2000. A bypass pipe 2005 is provided, the bypass pipe 2005 arranged to allow a proportion of the oil to flow past one of the air-oil heat exchanger 2020 or the fuel-oil heat exchanger 1006; and a bypass valve 2007 arranged to allow the proportion of the oil sent through the bypass pipe 2005 to be varied. The method 300 comprises controlling 302 the heat exchange system 2000 such that, when the aircraft 1 is operating at idle conditions, a heat transfer ratio of:

$$\frac{\text{rate of heat transfer from oil to air } (kJkg^{-1})}{\text{rate of heat transfer from oil to fuel } (kJkg^{-1})}$$

is in the range from 0 to 1.5. The ratio may therefore be higher at idle than at cruise. The ratio may be higher at ground idle than at flight idle. Optionally, the method 300 may comprise maintaining the heat transfer ratio under idle conditions under idle conditions, below 1.0, in the range from 0 to 0.60, from 0 to 0.50, from 0 to 0.40, from 0 to 0.30, from 0 to 0.20, or from 0 to 0.10.

The method 300 may further comprise receiving data 304 to allow calculation or inference of the heat transfer ratio, e.g. temperature data (of the oil and/or the fuel, at one or more points around an oil loop system 2000, 2000' or fuel flow pathway, and/or optionally a fuel tank temperature or oil tank temperature), and fuel flow rate data. Such data may be received 304 by a controller 58 and used 206 to adjust the modulation 202 of the heat exchange system 2000 at idle, so as to maintain the heat transfer ratio at a desired level or within desired bounds. This checking and adjustment/correction 206 may be performed at regular intervals, or in response to predetermined stimuli (e.g. a change in fuel or oil temperature or flow rate, or a change in aircraft operation, such as commencing taxi). These steps 304, 206 may alternatively be considered as part of the controlling 302 of the heat exchange system 2000. The method 300 may also be arranged to make use of other information, e.g. temperature data (of oil, fuel, and/or ambient temperature of an environment around the aircraft 1), flow rate data (of oil and/or fuel), and/or one or more fuel characteristics, in determining 206 what control actions to take.

The step of controlling 302 the heat exchange system 2000 may comprise any, or any combination, of the examples provided for the modulation step 204 of the method 200 of FIG. 14, for example, by increasing the amount of oil sent via the at least one air-oil heat exchanger 2020 when the heat transfer ratio is too low, or by adjusting the proportion of oil and/or fuel sent via a respective bypass pipe 1005 or recirculation pipe 6011.

In implementations in which the engine 10 comprises a refrigeration cycle apparatus 1007, the step of controlling 302 the heat exchange system 2000 at idle may comprise using the refrigeration cycle apparatus 1007 to provide thermal lift by transferring further heat from the oil to the fuel beyond that transferred on passing through the fuel-oil heat exchanger(s) 1006, in some cases such that the fuel temperature is raised above the oil temperature. In such implementations, a lower value for the heat transfer ratio may be obtained than in implementations without a refrigeration cycle apparatus 1007—for example, the heat transfer ratio at idle may be no more than 0.40, and optionally no more than 0.30, 0.20, and further optionally no more than 0.10 or 0.05. In implementations in which there is no refrigeration cycle apparatus 1007, or in which such an apparatus is present but not in use, a higher value of the heat transfer ratio may be maintained, for example being in the range from 0.38 to 1.2.

Fuel temperature on reaching the combustor 16 may also be taken into account. The method 300 may comprise controlling 302 the heat exchange system 2000 during operations at idle such that the heat transfer ratio is in the range from 0.3 to 1.5 provided that the fuel temperature on entry to the combustor 16 is below 180° C., or in the range from 0 to 0.3 provided that the fuel temperature on entry to the combustor 16 is at or above 180° C. One or more temperature sensors may therefore be used, and their output(s) may be taken into account when setting the control 202 of the heat exchange system 3000.

The method 300 may, additionally or alternatively, take into account the nature of the fuel—for example whether the fuel is or comprises a sustainable aviation fuel (SAF). One or more fuel characteristics—optionally determined by a fuel characteristic determination module 57 as described above—may therefore also be used; the information may be taken into account when setting the control 302 of the heat exchange system 3000.

In some implementations, no more than 20% of the heat transferred away from the oil at cruise may be transferred to the air and the rate of heat transfer from oil to air may be maintained in the range from 0 to 180 KJ per kilogram of fuel at cruise conditions.

In some implementations, at least 80% of the heat transferred away from the oil at cruise may be transferred to the fuel and the rate of heat transfer from oil to fuel may be maintained in the range from 100 to 300 kJ per kilogram of fuel at cruise conditions. At idle, a higher % of heat rejection to air is generally used than at cruise and other higher power engine conditions.

As for the method 200 described with respect to FIG. 14, in some implementations, the heat exchange system 3000 further comprises branching fuel return pathways and at least one valve controlling a split of fuel flow, the branching pathways being arranged to return fuel from the heat exchange system 3000 to at least one different place along a main fuel path from where fuel enters the gas turbine engine 10 to the combustor 16. The valve may be controlled based on feedback from one or more temperature sensors, and/or based on fuel characteristics. The method 300 may comprise adjusting the fuel flow along each branch based on the heat transfer ratio and/or on the fuel temperature on leaving the heat exchanger(s) 1004, 1006.

The inventors also appreciated that the use of fuels different from the traditional kerosene-based jet fuels, such as sustainable aviation fuels, may result in different fuel properties, and that parameters at cruise conditions may be adjusted to make use of the different fuel properties. In particular, some fuels may be heated to higher temperatures in the fuel-oil heat exchangers 1004, 1006 than traditional fuels. This may improve the cooling of the oil before it is returned to the rest of the turbine engine, and/or may improve combustion efficiency of the fuel. Using the fuel to take more heat from the oil, rather than relying on heat transfer from the oil to the environment/air (e.g., in an oil-air heat exchanger) provides a more thermally efficient turbine engine. Additionally, the improved cooling of the oil may in turn improve the cooling effect of the oil on the components of the engine through which it flows.

Figure 16:
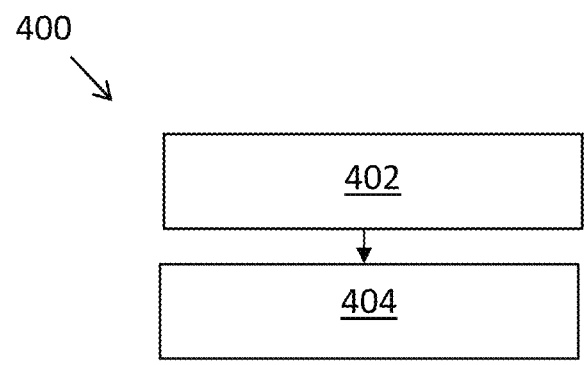
FIG. 16 illustrates a further example method of operating a gas turbine engine.

FIG. 16 illustrates an example method 400 of operating a gas turbine engine 10. The method 400 comprises the steps of:

Step 402: Providing a fuel to the gas turbine engine 10 via the fuel management system 1500.

As discussed with respect to FIG. 6C, the fuel management system 1500 comprises a primary fuel-oil heat exchanger 1006 and a secondary fuel-oil heat exchanger 1004 arranged to transfer heat to or from the fuel, and comprises part of heat exchange system 3000. An engine fuel pump 1003 is positioned downstream of the primary fuel-oil-heat exchanger 1004 and upstream of the secondary fuel-oil heat exchanger 1006. The fuel management system 1500 is arranged so that the fuel reaches the primary fuel-oil heat exchanger 1006 before the secondary fuel-oil heat exchanger 1004.

Step 404: Controlling the heat exchange system 3000 so as to raise the fuel temperature to at least 120° C. on leaving the secondary fuel-oil heat exchanger 1004 at cruise conditions.

The controlling 404 the heat exchange system 3000 may comprise controlling fuel flow through the heat exchangers—for example recirculating a variable proportion of the fuel through the primary fuel-oil heat exchanger 1006, and/or allowing a variable proportion of the fuel to bypass the primary fuel-oil heat exchanger 1006. Whilst FIG. 6 shows an implementation with a bypass pipe 1005 but no recirculation, and FIGS. 7A-7C show implementations with no bypass pipe (at least not for the primary heat exchanger—FIGS. 6A and 6C do provide a route for some of the fuel reaching the combustor 16 to bypass the secondary heat exchanger whilst the rest of the fuel passes through it) but with a recirculation pipe 6011, it will be appreciated that one or more bypass pipes and/or one or more recirculation pipes may be provided together in various implementations. Further, in some systems, the direction of flow within the same pipe may be reversible such that it can be used as a bypass pipe 1005 or a recirculation pipe 6011. It will be appreciated that the Figures are provided by way of example only, and are not intended to be limiting.

The controlling 404 the heat exchange system 3000 may comprise controlling fuel flow through the heat exchangers—for example allowing a variable proportion of the fuel to bypass the primary fuel-oil heat exchanger 1006 or the secondary fuel-oil heat exchanger 1006. One or more controllable valves or pumps, and optionally one or more sensors, may be provided accordingly to facilitate fuel flow control.

Additionally or alternatively, as for fuel flow, oil flow may be controlled using one or more bypass valves 2007 configured to control flow through one or more bypass pipes 2005, where present, allowing oil to bypass one or more heat exchangers 1004, 1006, 2020 instead of flowing therethrough. Oil may also be recirculated in some implementations, and/or oil flow rate may be adjusted by controlling one or more oil pumps. One or more controllable valves and/or pumps, and optionally one or more sensors, may be provided accordingly to facilitate oil flow control.

A controller 58 may be used to actively manage fuel and/or oil flows through and around the heat exchangers 1004, 1006, 2020. The controller 58 may be a part of, or provided by, an EEC, or may be a separate unit. The control may be automated, for example by an EEC. The controller may receive inputs from one or more temperature sensors 1009, and may control one or more valves (e.g. recirculation valve 6010 or bypass valve 2007), and/or the pump 1003, based on the received data. One or more oil feed pumps and/or scavenge pumps may also be controlled by the controller.

Fuel flow may be controlled using a recirculation valve 6010, as described above. Alternatively or additionally, fuel flow may be controlled by using one or more bypass pipes 1005 (as shown in FIG. 5) arranged to allow a proportion of the fuel to avoid passing through either or both heat exchangers, and/or by adjusting the split in % fuel which flows straight to the combustor 16 from the primary fuel-oil heat exchanger 1006 as opposed to % fuel which flows from the primary fuel-oil heat exchanger into the secondary fuel-oil heat exchanger 1004 (and optionally then back to re-join the fuel flowing into the combustor 16, depending on the implementation).

Heating the fuel to higher temperatures than previously used may improve the cooling of the oil before it is returned to the rest of the turbine engine, and/or may improve combustion efficiency of the fuel. The positioning of the secondary fuel-oil heat exchanger 1004 after the engine fuel pump 1003 may facilitate obtaining higher fuel temperatures without compromising fuel pump longevity.

The auxiliary system 7010 supplied by the secondary fuel-oil heat exchanger 1004 may benefit from higher fuel temperatures than is suitable for use in the combustor 16 or components which the main fuel flow path passes through. As such, it may be desirable for the temperature of the fuel on exiting the secondary fuel-oil heat exchanger 1004 to be higher than that of the temperature of the fuel on entry to the combustor 16. Further, as illustrated by FIG. 8, for example, oil may flow through the secondary fuel-oil heat exchanger 1004 prior to flowing through the other heat exchangers 1006, 2020 of the heat exchange system 3000. As such, oil temperature may be higher when passing through the secondary fuel-oil heat exchanger 1004 than the other heat exchangers 1006, 2020. Controlling 404 the heat exchange system 3000 may comprise controlling a fuel bypass valve so as to adjust the proportion of the fuel sent via a fuel bypass pipe 1005 and as such control the flow of fuel through each of the primary fuel-oil heat exchanger 1006 and secondary fuel-oil heat exchanger 1004 at cruise conditions.

Controlling 404 the heat exchange system may comprise controlling the oil bypass valve 2007 so as to adjust the proportion of the oil sent through via an oil bypass pipe 2005 and as such control the flow of oil through each of the primary fuel-oil heat exchanger 1006 and secondary fuel-oil heat exchanger 1004 at cruise conditions.

The controlling 404 the heat exchange system 3000 may comprise controlling the heat exchange system 3000 so as to raise the temperature of the fuel such that the fuel temperature on leaving the secondary heat exchanger is in the range from 120° C. to 180° C., in the range from 135° C. to 200° C., 135° C. to 180° C., 150° C. to 200° C., 150° C. to 180° C., 150° C. to 170° C. or approximately 120° C., 130° C., 140° C., 150° C., 160° C. or up to 200° C.

The inventors appreciated that allowing unsuitable fuels to reach these higher temperatures could be deleterious to engine performance, however, and potentially even dangerous-excessive thermal decomposition of a fuel/deposition can cause safety issues by blocking passages and causing malfunction of components (e.g. valve sticking, and blocked nozzles, orifices, valves, etc.) which could result in loss of thrust control. The method 500 shown in FIG. 17 is therefore provided as a safety precaution.

Figure 17:
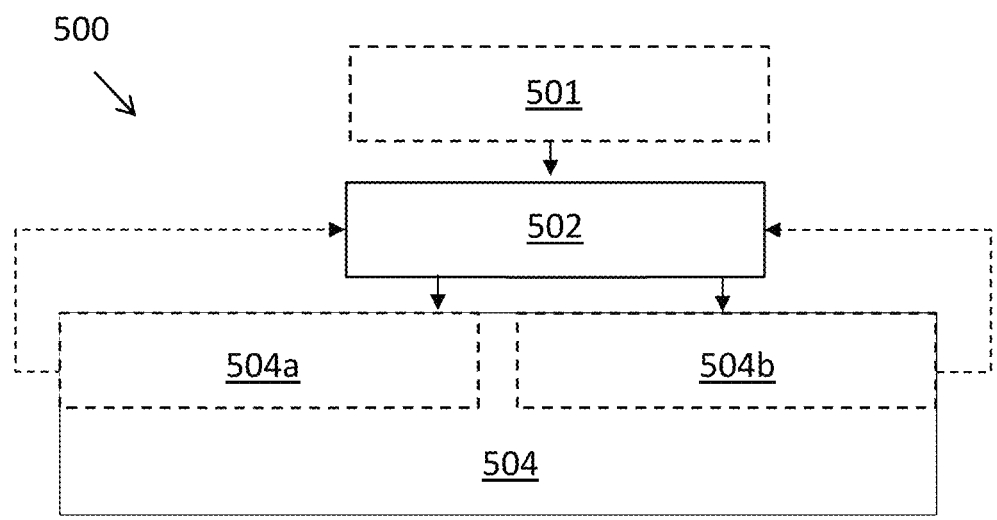
FIG. 17 illustrates a further example method of operating a gas turbine engine.

The method 500 shown in FIG. 17 may be performed in a gas turbine engine 10 substantially as described for the preceding methods regarding oil flow, but the one or more controllable oil valve(s) 2007, 2007a, arranged to allow a proportion of the oil to bypass (and by extension sent via) at least one of the air-oil heat exchanger 2020, the primary fuel-oil heat exchanger 1006 and the secondary fuel-oil heat exchanger to be varied are replaced by at least one controllable oil or air valve 2007, 2007a, 2007b, 2022 arranged to allow at least one of oil flow rate and air flow rate through at least one of the air-oil heat exchanger 2020 and the fuel-oil heat exchanger 1006 to be varied. Air flow control, or oil flow control, or both, may therefore be provided. In implementations in which a controllable air valve 2022 is provided (optionally in addition to a controllable oil valve 2007, 2007a, 2007b), the engine may require a temperature sensor 1009 arranged to provide an indication of fuel temperature-optionally on entry to the combustor 16. More generally, the sensor 1009 can be located anywhere downstream of the primary fuel-oil heat exchanger 1006 on the fuel side. This temperature sensor 1009 is generally located at or near an entrance to the combustor 16, and more specifically near a nozzle inlet of the combustor 16 so as to sense fuel temperature on entry to the combustor directly, although it will be appreciated that variations in fuel temperature between the outlet of the primary fuel-oil heat exchanger 1006 and the combustor 16 are likely to be small if the secondary fuel-oil heat exchanger 1004 is bypassed and calculable from knowledge of the engine 10 if the fuel temperature at a different location from the sensor 1009 is wanted. In some implementations in which the fuel temperature on entry to the combustor 16 is used, the sensor 1009 may be differently located and the fuel temperature on entry to the combustor may be calculated based on the temperature output and knowledge of the engine 10.

The method 500 comprises determining 502 if the fuel temperature has increased above a set threshold at cruise conditions, based on an output from the temperature sensor 1009. For example, a direct comparison may be made between data received from the temperature sensor 1009 and one or more temperature thresholds saved in memory. This determination 502 may therefore be performed automatically, optionally by a controller 58 (which may be or comprise a dedicated processing module, or may be provided by a more general EEC).

The method 500 further comprises, in response to determining that the fuel temperature has increased above the set threshold at cruise conditions, controlling 504 the at least one valve 2007, 2007a, 2022 so as to change the at least one flow rate (air or oil flow rate) through the at least one heat exchanger 1004, 1006, 2020 as appropriate to reduce the fuel temperature. For example, adjusting an oil valve 2007, 2007a may send a greater proportion of oil via bypass pipes 2005, 2005a to pass the primary fuel-oil heat exchanger 1006 and/or the secondary fuel-oil heat exchanger 1004 and recombine with the remaining oil that did go through the fuel-oil heat exchanger(s) 1004, 1006 at or downstream of the oil exit from that heat exchanger 1006, 1004 as shown in FIG. 12. In a parallel configuration (not shown), reducing oil flow through the fuel-oil heat exchanger 1006 by control of a modulation valve may automatically increase oil flow through the air-oil heat exchanger 2020 (unless a bypass pipe around the air-oil heat exchanger 2020 is present and used to compensate).

As indicated by the dashed line in FIG. 17, this method 500 may be repeated-frequent checks may be favoured for the sake of safety, optionally on a regular schedule, and/or when triggered by a change in engine operation (e.g. a change in altitude or thrust demand). The oil valve 2007, 2007a, or air valve 2022 may therefore be actively controlled 504 to vary the oil or air flow rate through the respective heat exchanger 1006, 2020. Active control of the valve 2007, 2007a, 2022 may be automated and implemented by the controller 58. For example, active control of the bypass valve 2007 associated with the secondary fuel-oil heat exchanger 1004 may be automated and implemented by a controller 58 of the heat exchange system 3000, which may be a dedicated controller or a part of a more general EEC. In various implementations, the control of one or more of the valves 2007, 2007a, 2022 may be closed-loop or open-loop, based on availability of in-line measurements—in particular, a closed-loop approach to control may be preferred when feedback data (e.g. from oil flow rate sensors) are available.

In implementations with both an air valve 2022 and an oil valve 2007, 2007a, air flow through the air-oil heat exchanger 2020 may be increased when more oil is sent via the air-oil heat exchanger 2020; the increase may be linear with increasing oil flow rate. In terms of % of air flow, the increase may be large—for example going from the air valve 2022 being fully-closed to fully open, or from a first position with 10% of the maximum air flow rate up to 90% or 100% of the maximum air flow rate when the fuel temperature is deemed to be too high. The method 500 may comprise, in response to determining 502 that the fuel temperature has increased above a set threshold at cruise conditions, controlling 504a the air valve 2022 so as to send more air through the air-oil heat exchanger 2020 as well as controlling 504b the oil valve 2016, 2007 to send less oil via the fuel-oil heat exchanger 1006. The control/adjustment 504a of the air valve 2022 may be performed simultaneously with the control/adjustment 504b of the oil valve 2016, 2007.

In some implementations, the airflow through the air-oil heat exchanger 2020 may not be actively controlled. In such implementations, the airflow is likely to naturally change at different operating conditions based on the pressure ratio between the heat exchanger air intake 2020a and the heat exchanger exhaust/air outlet 2020b. In this configuration, air will still flow through the air passages of the air-oil heat exchanger 2020 even when the air-oil heat exchanger 2020 is completely bypassed on the oil side/when the oil flow rate through the heat exchanger 2020 is zero. In alternative implementations, active control of the air flow through the air-oil heat exchanger 2020 is provided. For example, the air-oil heat exchanger 2020 and the fuel-oil heat exchanger(s) 1004, 1006 may be in series, with no bypass on the oil side of the air-oil heat exchanger 2020 but an air valve 2022 on the air side that controls the airflow (both an oil bypass valve 2007b and an air flow valve 2022 may be provided in other implementations). In such a series arrangement, the air-oil heat exchanger 2020 may be upstream or downstream of fuel-oil heat exchanger 1006 with respect to oil flow. In implementations with a series arrangement, having the air-oil heat exchanger 2020 upstream of the fuel-oil heat exchanger(s) 1004, 1006 with respect to oil flow (unlike in FIG. 12) may assist in not overheating the fuel—the oil may be cooled as much as desired by increasing airflow to a predetermined threshold. It can be appreciated that without a dedicated mechanism to actively drive airflow, such as a gas-gas ejector or dedicated fan, there is a limit to how much the oil can be cooled in a single pass through the air-oil heat exchanger (i.e., once the air valve 2022 is fully open, no further control adjustments can be made to increase cooling in a single pass through the air-oil heat exchanger 2020). The oil may be cooled further by recirculating oil through the air-oil heat exchanger 2020 before it reaches the fuel-oil heat exchanger 1006.

In some implementations, an oil bypass pipe 2005*b* and corresponding control valve 2007*b* may be implemented for the air-oil heat exchanger 2020 only. Optionally, only oil flow rate through the air-oil heat exchanger 2020 may be actively controlled in the method 500 being described.

In various implementations:

- A bypass pipe 2005*b* is provided on the oil side of the air-oil heat exchanger 2020 only (no oil bypass of the fuel-oil heat exchanger and no active air flow control);
- A bypass pipe 2005, 2005*a*, 2005*b* may be provided for both the air-oil heat exchanger 2020, the primary fuel-oil heat exchanger 1006 and the secondary fuel-oil heat exchanger 1004 (no active air flow control); or
- Air flow rate through the air-oil heat exchanger 2020 may be controllable, and there may be no oil bypass pipes.

In general, having control of at least one flow through the air-oil heat exchanger 2020 may be deemed more important than having control of either flow through the fuel-oil heat exchanger(s) 1004, 1006. One or more oil bypass pipes 2005, 2005*a* and/or fuel bypass pipe 1005 (and a corresponding control valve) may however be provided for the fuel-oil heat exchanger(s) 1004, 1006 in some implementations, optionally in addition to one or more further controllable valves.

A combination of airflow control and oil flow control may be implemented in both parallel and series arrangements, but it will be appreciated that whilst all of the various control options may be used together, the increase complexity and number of components, and hence increased weight of the overall heat exchange system 3000, may not be desirable. A selection of a subset of the control options may therefore be preferred in many implementations—for example, either control of the airflow or control of the oil flow can be used to adjust heat transfer within the air-oil heat exchanger 2020, so control of both for a given heat exchanger 2020 may be deemed superfluous. Similarly, in implementation in which the oil flows through the air-oil heat exchanger 2020 before the fuel-oil heat exchanger 1006, oil temperature adjustment in the air-oil heat exchanger 2020 (by control of air- and/or oil-flow in that heat exchanger) may be used as an alternative to oil flow adjustment through one or more of the primary fuel-oil heat exchanger 1006 or secondary fuel-oil heat exchanger 1004 to change the amount of heat transferred to the fuel in said fuel-oil heat exchanger(s) 1004, 1006.

Additionally or alternatively, in implementations in which the heat exchange system 3000 comprises a refrigeration cycle apparatus 1007 arranged to transfer additional heat from the oil to the fuel beyond that transferred by the primary fuel-oil heat exchanger 1006 and secondary fuel-oil heat exchanger 1004, the method 500 may further comprise controlling the refrigeration cycle apparatus 1007 so as to reduce the amount of additional heat transferred to the fuel in response to determining 502 that the fuel temperature has increased above the set threshold at cruise conditions. This control may be performed by reducing the oil flow through the refrigeration cycle apparatus 1007, or by reducing power to the refrigeration cycle apparatus 1007 (e.g. by reducing the flow rate of the refrigerant fluid), or by deactivating the refrigeration cycle apparatus 1007. The set threshold for deactivation of the refrigeration cycle apparatus 1007 may be lower than the set threshold for changing a flow rate of oil and/or air through a heat exchanger 1006, 2020.

The set threshold for the controlling step 504 may be in the range from 140° C. to 300° C., and optionally from 200° C. to 300° C., and further optionally from 250° C. to 300° C. For example, the set threshold may be 140° C., 150° C., 160° C., 170° C., 180° C., 190° C., 200° C., 210° C., 220° C., 230° C., 240° C., 250° C., 260° C., 270° C., 280° C., 290° C., or 300° C.

The method 500 of some implementations further comprises determining 501 the set threshold, against which the temperature sensor output is compared. This determining 501 may be performed on-wing, and optionally in flight. The determination 501 may be or comprise calculating a threshold value, or identifying a suitable threshold value from a pre-stored set of threshold values stored in memory.

The inventors appreciated that knowledge of one or more fuel characteristics can be used in the determination 501 to ensure safety whilst still taking advantage of properties that vary between aviation fuels. The determination 501 may therefore be based on at least one fuel characteristic of the fuel. The at least one fuel characteristic may be or comprise any of the examples discussed above, for example thermal stability of the fuel, nitrogen content of the fuel, sulphur content of the fuel, and/or sustainable aviation fuel-SAF-content of the fuel (% SAF). The at least one fuel characteristic may be determined by any one or more of the approaches discussed above.

The step of determining 501 the set threshold may comprise increasing the set threshold, optionally linearly, with increasing thermal stability of the fuel. The set threshold used to control the heat modulation may therefore be increased linearly with the fuel thermal stability. Thermal stability is the temperature at which the fuel will start to breakdown and form deposits that can cause blockages and malfunction of components—it will be appreciated that this is generally not an instantaneous change on reaching a particular temperature; aviation fuels comprise various components that are liable to break down at different temperatures, and time spent at the high temperature is also a factor in fuel breakdown. The threshold value may be set based on comparing a maximum allowed deposition rate from fuel breakdown to the thermal stability of the fuel in use. A fuel may be classed as stable at a given temperature if its rate of decomposition is below a certain threshold at that temperature. The method 500 may also comprise use of a clock or timer, or a fuel flow rate sensor—a higher fuel temperature may be acceptable at a higher pumping rate, for example, as the faster-moving fuel will spend less time at that temperature before being combusted. Alternatively, or additionally, the method 500 may comprise use of one or more pressure sensors to determine fuel flow rate. By measuring a pressure drop through a known orifice size, flow rate can be determined.

Alternatively or additionally, the step of determining 501 the set threshold may comprise increasing the set threshold with increasing SAF content of the fuel (optionally linearly), for fuels with a SAF content of above 70%. As discussed above, an increase in % SAF mixed with a fossil-based aviation fuel was found to increase thermal stability, but in a non-linear way. Pre-set, discrete, thresholds based on % SAF may therefore be favoured rather than continuously changing the set threshold in proportion to SAF content, or a more complex (non-linear) but continuous relationship may be established.

Alternatively or additionally, the step of determining 501 the set threshold may comprise decreasing the set threshold with increasing heteroatomic species content of the fuel (optionally linearly). For example, the thermal stability of Jet-A was found to decrease with increasing nitrogen content (nitrogen content being a measure of the amount of nitrogen-containing species present). It is known that the interaction of sulphur-containing and nitrogen-containing species in fuel can be an important contributor to fuel decomposition rates, so consideration of the fuel composition with respect to multiple heteroatomic species may be implemented to take account of these interactions.

In some implementations, particularly in implementations in which a direct measure of thermal stability of the fuel is not available, multiple fuel characteristics may be determined and used in decisions on valve control. The one or more determined fuel characteristics may be in effect translated into a measure of thermal stability.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of operating a gas turbine engine of an aircraft, the gas turbine engine comprising:
    an engine core comprising a turbine, a compressor, a combustor arranged to combust a fuel, and a core shaft connecting the turbine to the compressor;
    a fan located upstream of the engine core;
    a fan shaft;
    at least one bearing arranged to support the fan shaft;
    an oil loop system arranged to supply oil to the at least one bearing; and
    a heat exchange system comprising:
        an air-oil heat exchanger through which the oil in the oil loop system flows; and
        a fuel-oil heat exchanger through which the oil in the oil loop system and the fuel flow such that heat is transferred between the oil and the fuel; and
        a bypass pipe arranged to allow a proportion of the oil to flow past one of the air-oil heat exchanger and the fuel-oil heat exchanger; and
    a bypass valve arranged to allow the proportion of the oil sent through the bypass pipe to be varied and ensure that no less than 70% of the oil is sent via the fuel-oil heat exchanger at cruise,
    the method comprising:
    determining at least one fuel characteristic of the fuel arranged to be combusted by the combustor; and
    controlling the bypass valve based on the at least one fuel characteristic so as to adjust the proportion of the oil sent via each heat exchanger at cruise conditions.

2. The method of claim 1, wherein:
    the bypass pipe is arranged to allow a proportion of the oil to flow past the air-oil heat exchanger, such that oil flowing through the bypass pipe flows through the fuel-oil heat exchanger without flowing through the air-oil heat exchanger.

3. The method of claim 1, wherein the at least one fuel characteristic of the fuel comprises at least one of:
    i. percentage of sustainable aviation fuel in the fuel;
    ii. heteroatomic species concentration of the fuel;
    iii. aromatic hydrocarbon content of the fuel;
    iv. multi-aromatic hydrocarbon content of the fuel;
    v. percentage of nitrogen-containing species in the fuel;
    vi. presence or percentage of a tracer species or trace element in the fuel;
    vii. hydrogen to carbon ratio of the fuel;
    viii. hydrocarbon distribution of the fuel;
    ix. level of non-volatile particulate matter emissions on combustion;
    x. naphthalene content of the fuel;
    xi. sulphur content of the fuel;
    xii. cycloparaffin content of the fuel;
    xiii. oxygen content of the fuel;
    xiv. thermal stability of the fuel;
    xv. level of coking of the fuel;
    xvi. an indication that the fuel is a fossil fuel; and
    xvii. at least one of density, viscosity, calorific value, and heat capacity.

4. The method claim 1, wherein the determining at least one fuel characteristic of the fuel comprises:
    obtaining at least one fuel characteristic of any fuel already present in a fuel tank prior to refuelling, the fuel tank configured to supply fuel to the combustor via the heat exchange system;
    determining at least one fuel characteristic of a fuel added to the fuel tank on refuelling; and
    calculating at least one fuel characteristic of the resultant fuel in the fuel tank after refuelling.

5. The method of claim 1, wherein the determining the at least one fuel characteristic is performed based on detection of at least one fuel property.

6. The method of claim 1, wherein the determining the at least one fuel characteristic is performed based on received fuel composition data.

7. The method of claim 1, wherein at least one fuel characteristic is inferred from performance of the gas turbine engine during at least one of taxi, take-off and climb of the aircraft.

8. The method of claim 1, wherein the heat exchange system further comprises a refrigeration cycle apparatus, and the method comprises using the refrigeration cycle apparatus to provide thermal lift by transferring further heat from the oil to the fuel such that the fuel temperature is raised above the oil temperature.

9. The method of claim 1, wherein, subject to suitability of the at least one determined fuel characteristic, the method comprises sending all of the oil via the fuel-oil heat exchanger for periods of at least 30 minutes at cruise, such that no heat is lost to the environment via the air-oil heat exchanger for at least some periods of operation at cruise.

10. The method of claim 1, wherein, subject to suitability of the at least one determined fuel characteristic, the method comprises sending at least 95% of the oil via the fuel-oil heat exchanger for at least 90% of time spent at cruise.

11. The method of claim 1, wherein, subject to suitability of the at least one determined fuel characteristic, the method comprises transferring at least 80% of the heat transferred away from the oil at cruise to the fuel.

12. The method of claim 1, wherein the at least one fuel characteristic is or comprises thermal stability, and wherein at least 80% of the heat transferred away from the oil at cruise is transferred to the fuel provided that the fuel is stable in operation at temperatures above 160° C.

13. The method of claim 1, wherein the at least one fuel characteristic is or comprises aromatic hydrocarbon content of the fuel, and wherein at least 80% of the heat transferred away from the oil at cruise is transferred to the fuel provided that the fuel has a molar percentage of aromatic hydrocarbons below 12%.

14. The method of claim 1, wherein the at least one fuel characteristic is or comprises percentage of sustainable aviation fuel—% SAF—in the fuel, and wherein at least 80% of the heat transferred away from the oil at cruise is transferred to the fuel provided that the fuel has a SAF content above 50%.

15. The method of claim 1, wherein the at least one fuel characteristic is or comprises calorific value of the fuel, and wherein at least 80% of the heat transferred away from the oil at cruise is transferred to the fuel provided that the fuel has a calorific value of at least 43.5 MJ/kg.

16. A gas turbine engine for an aircraft comprising:
an engine core comprising a turbine, a compressor, and a core shaft connecting the turbine to the compressor;
a fan located upstream of the engine core; and
a gearbox that receives an input from the core shaft and outputs drive to the fan so as to drive the fan at a lower rotational speed than the core shaft;
an oil loop system arranged to supply oil to the gearbox; and
a heat exchange system comprising:
  an air-oil heat exchanger through which the oil in the oil loop system flows; and
  a fuel-oil heat exchanger through which the oil in the oil loop system and the fuel flow such that heat is transferred between the oil and the fuel;
  a bypass pipe arranged to allow a proportion of the oil to flow past one of the air-oil heat exchanger and the fuel-oil heat exchanger;
a bypass valve arranged to allow the proportion of the oil sent through the bypass pipe to be varied and ensure that no less than 70% of the oil is sent via the fuel-oil heat exchanger at cruise; and
a fuel composition determination module arranged to determine at least one fuel characteristic of the fuel arranged to be combusted by a combustor,
wherein the bypass valve is arranged to be controlled based on the at least one fuel characteristic so as to adjust the proportion of the oil sent via each heat exchanger at cruise conditions.

17. The gas turbine engine according to claim 16, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

18. The gas turbine engine according to claim 16, wherein:
the bypass pipe is arranged to allow a proportion of the oil to flow past the air-oil heat exchanger, such that oil flowing through the bypass pipe flows through the fuel-oil heat exchanger without flowing through the air-oil heat exchanger.

19. The gas turbine engine according to claim 17, wherein the core shaft outputs drive to the fan directly so as to drive the fan at the same rotation speed as the core shaft, such that the engine is a direct drive engine.

20. A method of operating a gas turbine engine of an aircraft, the gas turbine engine comprising:
an engine core comprising a turbine, a compressor, a combustor arranged to combust a fuel, and a core shaft connecting the turbine to the compressor;
a fan located upstream of the engine core;
a fan shaft;
at least one bearing arranged to support the fan shaft;
an oil loop system arranged to supply oil to the at least one bearing; and
a heat exchange system comprising:
  an air-oil heat exchanger through which the oil in the oil loop system flows; and
  a fuel-oil heat exchanger through which the oil in the oil loop system and the fuel flow such that heat is transferred between the oil and the fuel; and
  a bypass pipe arranged to allow a proportion of the oil to flow past one of the air-oil heat exchanger and the fuel-oil heat exchanger; and
a bypass valve arranged to allow the proportion of the oil sent through the bypass pipe to be varied,
the method comprising:
determining at least one fuel characteristic of the fuel arranged to be combusted by the combustor, wherein the determining at least one fuel characteristic of the fuel comprises:
  obtaining at least one fuel characteristic of any fuel already present in a fuel tank prior to refuelling, the fuel tank configured to supply fuel to the combustor via the heat exchange system;
  determining at least one fuel characteristic of a fuel added to the fuel tank on refuelling; and
  calculating at least one fuel characteristic of the resultant fuel in the fuel tank after refuelling; and
controlling the bypass valve based on the at least one fuel characteristic so as to adjust the proportion of the oil sent via each heat exchanger at cruise conditions.

* * * * *